(12) United States Patent
Ishimoto et al.

(10) Patent No.: US 7,738,143 B2
(45) Date of Patent: Jun. 15, 2010

(54) COPY-FORGERY-INHIBITED PATTERN OR STAMP IMAGE COMBINED WITH IMAGE DATA BASED ON USER ACTIONS

(75) Inventors: Koichi Ishimoto, Kawasaki (JP); Masaki Kashiwagi, Hiratsuka (JP); Nobuaki Miyahara, Yokohama (JP); Takayuki Hirata, Tokyo (JP); Yousuke Aoki, Zama (JP); Asami Horiuchi, Funabashi (JP); Kenji Nagai, Tokyo (JP); Shuuko Kikuchi, Tokyo (JP)

(73) Assignee: Canon Kabushiki Kaisha (JP)

( * ) Notice: Subject to any disclaimer, the term of this patent is extended or adjusted under 35 U.S.C. 154(b) by 776 days.

(21) Appl. No.: 11/610,660

(22) Filed: Dec. 14, 2006

(65) Prior Publication Data

US 2007/0147929 A1 Jun. 28, 2007

(30) Foreign Application Priority Data

Dec. 15, 2005 (JP) ............................. 2005-362420
Dec. 1, 2006 (JP) ............................. 2006-325801

(51) Int. Cl.
*H04N 1/00* (2006.01)
*H04N 1/387* (2006.01)
*B41M 3/14* (2006.01)

(52) U.S. Cl. .................... 358/3.28; 358/1.14; 358/1.15

(58) Field of Classification Search ................ 358/1.9, 358/3.28, 1.13, 1.14, 1.15, 1.18, 468; 382/100, 382/135, 137, 306; 283/113, 902; 235/375, 235/487, 494; 340/5.86; 399/366; 726/26, 726/32, 33; 713/176
See application file for complete search history.

(56) References Cited

U.S. PATENT DOCUMENTS 6,930,803 B1 * 8/2005 Suzuki ....................... 382/306

(Continued)

FOREIGN PATENT DOCUMENTS

CN 1305175 A 7/2001

(Continued)

OTHER PUBLICATIONS

Office Action issued in corresponding Japanese application No. 2005-370894, dated Mar. 31, 2008.

(Continued)

*Primary Examiner*—Scott A Rogers
(74) *Attorney, Agent, or Firm*—Rossi, Kimms & McDowell LLP

(57) ABSTRACT

The image data with the copy-forgery-inhibited pattern image added and an image area flag signal stored in the hard disk drive are inputted into a thinning filter. A thinning circuit does not perform thinning processing on these pieces of data and outputs the inputted image, as it is. The filter performs processing so that an image of a copy-forgery-inhibited pattern background part may be deleted. A selector selects an image signal not passing through the filter for a latent mark of the copy-forgery-inhibited pattern whose image area flag is set as "Character," and select an image signal subjected to the processing by the filter for a copy-forgery-inhibited pattern background part whose image area flag is set as "Photograph." By doing so, it is possible to perform low pass processing on only the copy-forgery-inhibited pattern background part and perform processing of making a latent-mark part emerge.

6 Claims, 64 Drawing Sheets

U.S. PATENT DOCUMENTS

| | | | |
|---|---|---|---|
| 7,571,323 B2 * | 8/2009 | Iwamura et al. | 713/176 |
| 2004/0148507 A1 * | 7/2004 | Iwamura et al. | 713/176 |
| 2007/0133038 A1 * | 6/2007 | Otake et al. | 358/1.14 |
| 2007/0157827 A1 * | 7/2007 | Mikami | 101/2 |
| 2008/0260397 A1 * | 10/2008 | Itagaki | 399/39 |

FOREIGN PATENT DOCUMENTS

| | | |
|---|---|---|
| CN | 1517231 A | 8/2004 |
| JP | 4-247561 A | 9/1992 |
| JP | 2001-197297 A | 7/2001 |
| JP | 2002-232617 A | 8/2002 |
| JP | 2005-111957 A | 4/2005 |
| JP | 2005-210538 A | 8/2005 |
| JP | 2005-271500 A | 10/2005 |

OTHER PUBLICATIONS

First office action issued in corresponding Chinese application No. 2006101670646, dated Jun. 6, 2008.

* cited by examiner

VISUALIZATION

IMAGE AFTER COPY-FORGERY-
INHIBITED PATTERN PRINTING

RELIEF RENDERING

BLANK RENDERING

COPY-FORGERY-INHIBITED PATTERN OR STAMP IMAGE COMBINED WITH IMAGE DATA BASED ON USER ACTIONS

BACKGROUND OF THE INVENTION

1. Field of the Invention

The present invention relates to an image processing apparatus and an image processing method. More specifically, the invention relates to processing of image data temporarily stored in a hard disk of an multi-function combined machine so that duplication and alteration thereof may be inhibited using a copy-forgery-inhibited pattern.

2. Description of the Related Art

Conventionally, in order to inhibit or restrain copying of a document, a resident card, and the like, contents of them have been printed on a paper that has been subjected to special printing, called a forgery prevention paper. This forgery prevention paper is a kind of paper such that, in the case where the paper after printing is copied using a copier or the like, characters "Copy inhibited" or the like will emerge on the paper, although the characters on the original are hard for humans to recognize with an eye. The paper gives rise to an effect that may make people who copies hesitate to use its duplication or doing similar things. Further, the paper also gives rise to an effect that copying itself is inhibited or restrained because such a document etc. is printed on the forgery prevention paper.

However, such forgery prevention paper comes with a problem of being high cost as compared with normal papers. Moreover, the forgery prevention paper can makes only characters that were set at the time of manufacturing emerge, which accordingly limits applications of that paper, and the like; therefore, such paper lacks in flexibility in terms of usage.

On the other hand, while digitization of various contents the flow proceeds, contents of documents, the resident card, and the like are digitized similarly. However, digitization of these documents and the resident card themselves are still in a transition stage, and in many cases contents made by computes are outputted on papers using a printer and then used.

Under such a situation like this, there is known a technology of manufacturing the forgery prevention paper that has heretofore been created by plate making etc. using a computer and a printer (Japanese Patent Application Laid-open No. 2001-197297). This is a technology whereby, when contents created using a computer is printed out, image data called a copy-forgery-inhibited pattern is generated and this data in addition to data of the contents are superposed and outputted. The copy-forgery-inhibited pattern is occasionally called a copying restraining pattern. Although the copy-forgery-inhibited pattern image is seen as a simple pattern, a background image, or the like to an eye of a human in an original print (printed matter outputted from a printer), once it is copied, predetermined characters or an image will be visualized. This original can give the same restraining effect as the above-mentioned forgery prevention paper. This has been made possible thanks to remarkable improvement of the printer.

In the case where the copy-forgery-inhibited pattern image created using a computer is superposed on contents data and outputted, since naturally normal printing papers etc. can be used to output the contents, this case is advantageous in terms of cost as compared with the case of using the previously created forgery prevention paper. In addition, since the copy-forgery-inhibited pattern image can be created when contents are printed out, it becomes possible to freely determine characters to be visualized at the time of copying the original as well as a color of the copy-forgery-inhibited pattern image. Alternatively, this method also has an advantage that printing time and data, information specific to printing equipment or the like can be drawn as the copy-forgery-inhibited pattern image.

The copy-forgery-inhibited pattern image exerts an effect of, when copying an original, restraining the use of a duplication of the original by visualization of predetermined characters etc. that cannot be recognized before copying, as described above. In order to realize this effect, any copy-forgery-inhibited pattern image basically consists of two areas: one area where the same image as that of the original remains also in the duplication; and one area where an image disappears or becomes thin as compared with the image in the above-mentioned remaining image area, in the duplication. Regarding the copy-forgery-inhibited pattern image consisting of these two areas, what is suitable is one that the above-mentioned two areas are specified to have almost equal density when the copy-forgery-inhibited pattern has been printed out. That is, the copy-forgery-inhibited pattern image that is printed out is composed in such a way that in a macro sense, characters to be visualized on its duplication are hard to recognize visually by humans. In the following description, an image area that is hidden in a printed-out matter of this copy-forgery-inhibited pattern image but will be emerged visually recognizable by humans in the duplication that is copied from the printed-out matter is referred to as a "latent mark (or the latent-mark), while an image area that will disappear by copying or will become a low density as compared with the density of the latent mark having visualized on the duplication is referred to as a "background image (or the background)." Any copy-forgery-inhibited pattern image basically consists of these latent marks and background images. Note that the latent-mark is often called a foreground as a terminology used for the user interface.

The latent mark is so composed that dots are concentrated in a predetermined area. Contrarily, the background part is so composed that dots are dispersed in a predetermined area. Further, the copy-forgery-inhibited pattern image can be so composed that densities of the two areas are almost equal to each other, and consequently the latent-mark part and the background part are made hard to distinguish from each other in a printed-out matter of the copy-forgery-inhibited pattern image.

FIG. 1 is a diagram showing the states of dots in the two image areas, respectively. As shown in the figure, a copy-forgery-inhibited pattern image is constructed with the background part where dots are arranged being dispersed in a predetermined area and the latent-mark part where dots are arranged being concentrated. The dots in these two areas can be generated by mutually different halftone dot processing or mutually different dithering processing. For example, in the case of creating a copy-forgery-inhibited pattern image using the halftone dot processing, the latent-mark part is subjected to the halftone dot processing with a low number of lines. It is preferred that the background part is subjected to the halftone dot processing with a high number of lines. In the case where a copy-forgery-inhibited pattern image is created using dithering processing, the latent-mark part is subjected to the dither processing using a dot concentrated type dither matrix. It is preferred that the background part is subjected to dither processing using a dot dispersed type dither matrix.

Generally, the reading unit and the image forming unit of the copy machine has a limit level of reproduction capability that depends an input resolution whereby micro dots in a manuscript image is read and an output resolution whereby micro dots are reproduced. If the dot in the background part of the copy-forgery-inhibited pattern image is formed smaller than the limit level of dot reproducible by the copy machine and the dot in the latent-mark part is formed larger than the limit level, the dots of the latent-mark part are reproduced and the small dots in the background part are not reproduced on the duplication. By utilizing such property, the latent-mark is visualized on the duplication that inevitably copied the copy-forgery-inhibited pattern image. Hereafter, an image that is visualized on the duplication is called a visualized image. Note that even if the background part is reproduced by copying, but if the latent-mark part on the duplication is in an apparently recognizable level, the same effect as when the dots in the background part are not reproduced can be obtained, which is as described above.

FIGS. 2A and 2B are the diagrams showing this visualization. The figures indicate conceptually that when the dots are concentrated, the image is visualized also on the duplication, whereas when the dots are dispersed, the image is not reproduced on the duplication.

It should be noted that the copy-forgery-inhibited pattern printing is not restricted to the above-mentioned composition, but it may have any composition as long as a character string etc. is reproduced in a conceivable level on the duplication. That is, if a character string etc. is specified as the background part and will be shown in the state of a white character after copying, the purpose is attained as copy-forgery-inhibited pattern printing.

The copy-forgery-inhibited pattern image as described above finds its application in various environments. Usually, print data of a manuscript image with a copy-forgery-inhibited pattern image added thereon is created in a host computer and sent with a printing direction etc. to a printing apparatus, such as a printer, to perform printing. On the other hand, there is known a printing apparatus that temporarily stores image data being read by a scanner and image data sent from the host computer via a network in a storage device, such as a hard disk. Then, the printing apparatus reads arbitrary data from among pieces of the image data stored in this way and prints it out. Many of such printing equipment are known as forms of the multi-function combined machine. Larger capacity of hard disk makes it possible for this combined machine to accumulate therein a large amount of the image data, which makes it practical to use the digital combined machine as the so-called image server. For example, a single multi-function combined machine performs editing processing of image date, such as copying the image data saved in the hard disk and deleting unnecessary pages of data consisting of two or more pages, without using a computer. Moreover, it is commonly done to display the image data on a display unit of the multi-function combined machine and to send the image data to other device via a network and print it there (Japanese Patent Application Laid-open No. 2005-111957).

However, copy-forgery-inhibited pattern image data or processing regarding it is done assuming a case where the copy-forgery-inhibited pattern image data is printed, as it is, and it exerts a function of the copy-forgery-inhibited pattern image when it is copied. For this reason, the conventional processing does not take into consideration existence of possibility that the function of the copy-forgery-inhibited pattern image is not fully exerted, such as damaging of the copy-forgery-inhibited pattern image or lowering of guaranteed level of the original, in the case when the image data temporarily stored in the hard disk etc. is first used for processing other than printing.

For example, in the case where image data with a copy-forgery-inhibited pattern image added therein is read from a hard disk and sent to other equipment, processing of decreasing data quantity for reduction of network load and/or that of adjusting the image data to be transmitted to a capacity of equipment at a transmission destination site is performed. For this purpose, image processing, such as resolution transformation, may be performed on the image data. In this case, it may occur that a pattern constituting the copy-forgery-inhibited pattern image is collapsed to become an abnormal image, such as generating jaggy. Even when the image does not become an abnormal image, the image may be printed with no copy-forgery-inhibited pattern emerged in equipment at the transmission destination site. In such cases, the effect of restraining illegal duplication by addition of a copy-forgery-inhibited pattern will be lost. Moreover, not a case where the image data is sent to other equipment, there is a case where in the multi function combined machine saving the image data, the image with a copy-forgery-inhibited pattern added is displayed on a display that is provided therein. Even in this case, the stored image data for printing is altered to data for displaying, whereby a function of a copy-forgery-inhibited pattern is impaired similarly.

Further, there is also a case where image data with a copy-forgery-inhibited pattern image added thereon stored in a hard disk etc. is duplicated, falsified, or processed in other way in the multi-function combined machine. To stand against this, countermeasures of protecting any access to the multi-function combined machine by password, protecting accesses to respective accumulated data by pass word, and the like are being taken. However, it is generally difficult to prevent illegal duplication, falsification, etc. of an image without asking a user for troublesome operations, such as entering a password. Moreover, there is a case where although access to image data with a copy-forgery-inhibited pattern image added in an multi-function combined machine is protected, any restriction is not imposed on document editing functions (document duplication, document merging, document insertion, page deletion, etc.) that the multi-function combined machine is equipped with. In this case, if image data with a copy-forgery-inhibited pattern image added is duplicated, or falsified, or processed using the editing function, it becomes difficult to determine whether the document is a duplicated one. That is, it becomes difficult to guarantee that the image data with a copy-forgery-inhibited pattern image added is the original.

In addition, even in the case where the image data stored in a hard disk etc. of an multi-function combined machine is not image data with a copy-forgery-inhibited pattern image added but the normal image data, it is not desirable to allow it to be duplicated and falsified. Therefore, it is necessary to prevent duplication, falsification, etc. also for the normal image data.

SUMMARY OF THE INVENTION

The object of the present invention is to provide an image processing apparatus and an image processing method that, when image data with a copy-forgery-inhibited pattern image added therein is subjected to specific processing that is different from printing processing, can makes it possible to prevent lowering a security of the image data by comparatively increasing a density level of a latent-mark part in a copy-forgery-inhibited pattern of image data outputted by a specific process than a density level of the background part.

Other objects of this invention are to provide an image processing apparatus and an image processing method whereby duplication and falsification of the image data with a copy-forgery-inhibited pattern image added and the normal image data stored in a storage device can be prevented effectively.

In a first aspect of the present invention, there is provided an image processing apparatus comprising: storage unit which stores an image data that is to be combined with a copy-forgery-inhibited pattern image before being printed out; and transmission outputting unit which combines a stamp image with the image data stored in the storage unit and executes transmission outputting of the combined image data with the stamp image in the case that a transmission outputting direction is made for the image data stored in the storage means.

In a second aspect of the present invention, there is provided an image processing apparatus comprising: a storage unit for storing an image data that is to be combined with a copy-forgery-inhibited pattern image before being printed out; and a duplication unit which combines a stamp image with the image data stored in the storage unit and duplicates the combined image data when a duplication direction is made for the image data stored in the storage unit.

In a third aspect of the present invention, there is provided an image processing method comprising: a storing step for storing an image data that is to be combined with a copy-forgery-inhibited pattern image before being printed out into a storage unit; and a transmission outputting step for combining a stamp image with the image data stored in the storage unit and executing transmission outputting of the combined image data with the stamp image in the case that a transmission outputting direction is made for the image data stored in the storing step.

In a fourth aspect of the present invention, there is provided an image processing method comprising: a storing step for storing an image data that is to be combined with a copy-forgery-inhibited pattern image before being printed out; and a duplication step for combining a stamp image with the image data stored in the storing step and duplicating the combined image data when a duplication direction is made for the image data stored in the storing step.

With the above construction, in the case where the image data with a copy-forgery-inhibited pattern image added or the image data having information that it is the image data to which a copy-forgery-inhibited pattern image is to be added is used for specific output processing, such image processing that makes the latent-mark emerge from a background, for example, a character string of the latent-mark is added as a stamp image and the like, is applied. By this, a copy-forgery-inhibited pattern function, such as restraining an illegal usage of the data etc., may not be impaired.

In addition, processing of duplication of the above-mentioned image and the like is controlled and inhibited so that such processing is not used. By this control, duplication, falsification, etc. of the image data can be prevented effectively.

In addition, for the normal image data with no copy-forgery-inhibited pattern added, if security is intended to be secured, a copy-forgery-inhibited pattern is added to the image when duplication processing is instructed. This addition processing makes it possible to effectively prevent duplication, falsification, etc. also for the normal image data.

Further features of the present invention will become apparent from the following description of exemplary embodiments (with reference to the attached drawings).

BRIEF DESCRIPTION OF THE DRAWINGS

FIGS. 2A and 2B are diagrams showing visualization of a copy-forgery-inhibited pattern image, in which FIG. 2A shows a state before visualization, and FIG. 2B shows a state after visualization;

DESCRIPTION OF THE EMBODIMENTS

Hereafter, embodiments of the present invention will be described in detail with reference to the drawings.

In the embodiments described below, an area that will be visualized on a duplication obtained by copying a printed-out matter having a copy-forgery-inhibited pattern image thereon is called a latent-mark part or foreground part. An area that will disappear on the duplication or become a low density as compared with a density of the latent-mark part on the duplication is called a background part or disappearing part. Then, explanation will be done assuming that text information and image information are inputted into the latent-mark part as contents thereof and these text information and image information are reproduced in such high a density that can be recognized as compared with that of the background part on the duplication. However, the copy-forgery-inhibited pattern image in this invention is not restricted to this. For example, the latent mark may be of a form that text information and image information are expressed as blank on the duplication by setting text information or image information as a background part and setting an area surrounding the background part as a latent-mark part. Moreover, the present invention is not restricted in terms of kinds of copy-forgery-inhibited patterns, and their creation principals, colors, shapes, sizes etc.

Fundamental Configuration

Figure 3:
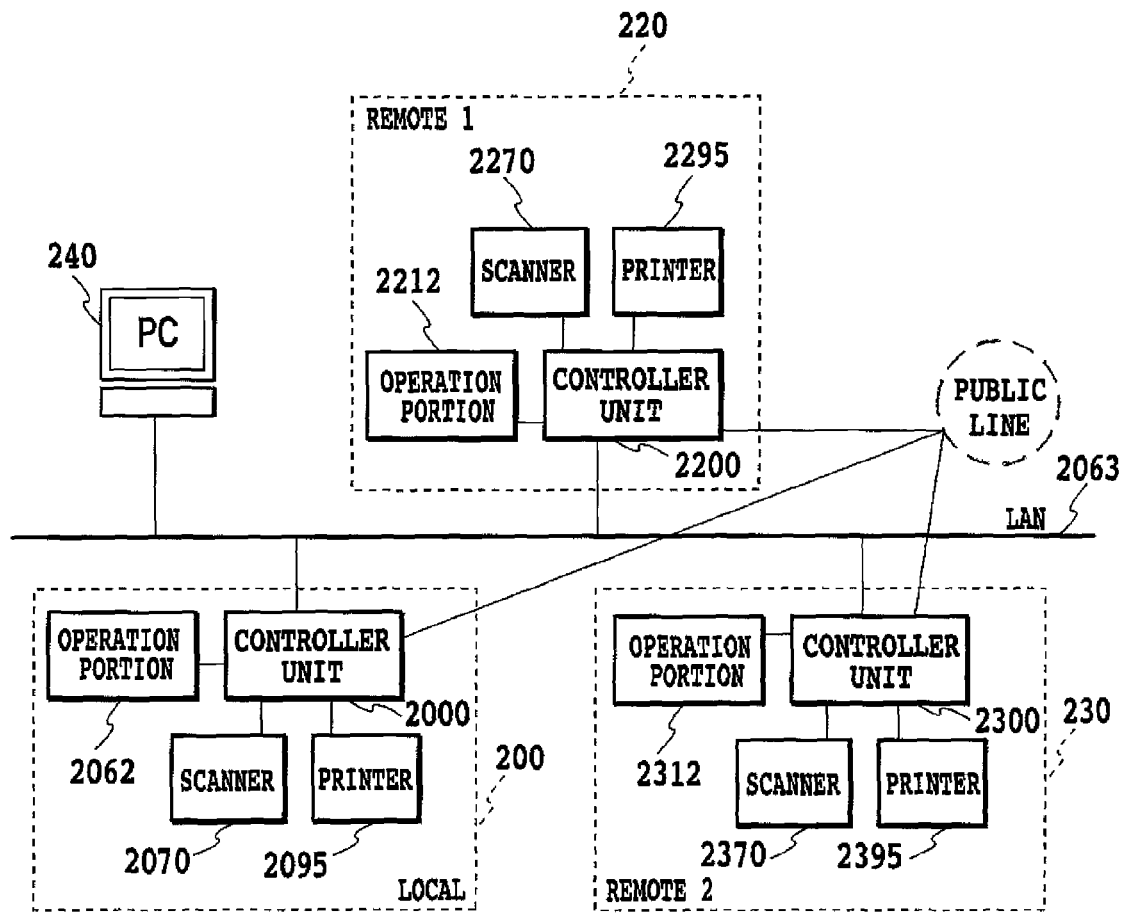
FIG. 3 is a block diagram showing a configuration of a printing system according to a first embodiment of this invention.

FIG. 3 is block diagram showing a configuration of a printing system according to one embodiment of the present invention. The printing system is constructed with a personal computer (PC) 240 serving as a host device and printers 200, 220, and 230 as multifunctional printing apparatuses (MFP's) that are connected with one another via a network 2063. Note that in the figure, only one PC 240 is shown as the host device, but other host device such as a PC is further connected to this system and performs processing about the same printing as that of the PC 240.

The printer 200 (220, 230) is partly constructed with a scanner unit 2070 (2270, 2370) and a printer unit 2095 (2295, 2395) serving as a printing apparatus. Moreover, the printer 200 is partly constructed with a controller unit 2000 (2200, 2300) that performs data processing and control regarding to this printer and an operation portion 2062 (2212, 2312) serving as a user interface. The scanner unit 2070, the printer unit 2095, and the operation portion 2062 are connected to the controller unit 2000, respectively, and the controller unit 2000 is connected to a network, such as the LAN 2063, and a public line. Transmission by G3 and G4 FAX including color image transmission can be done via the public line. This printer 200 and other printers 220, 230 with the same machine configuration as that of this printer 200 are connected with the LAN 2063. Each of these printers can transmit/receive a file using FTP and SMB protocols and transmit/receive electronic mails to/from the PC 240.

Figure 4:
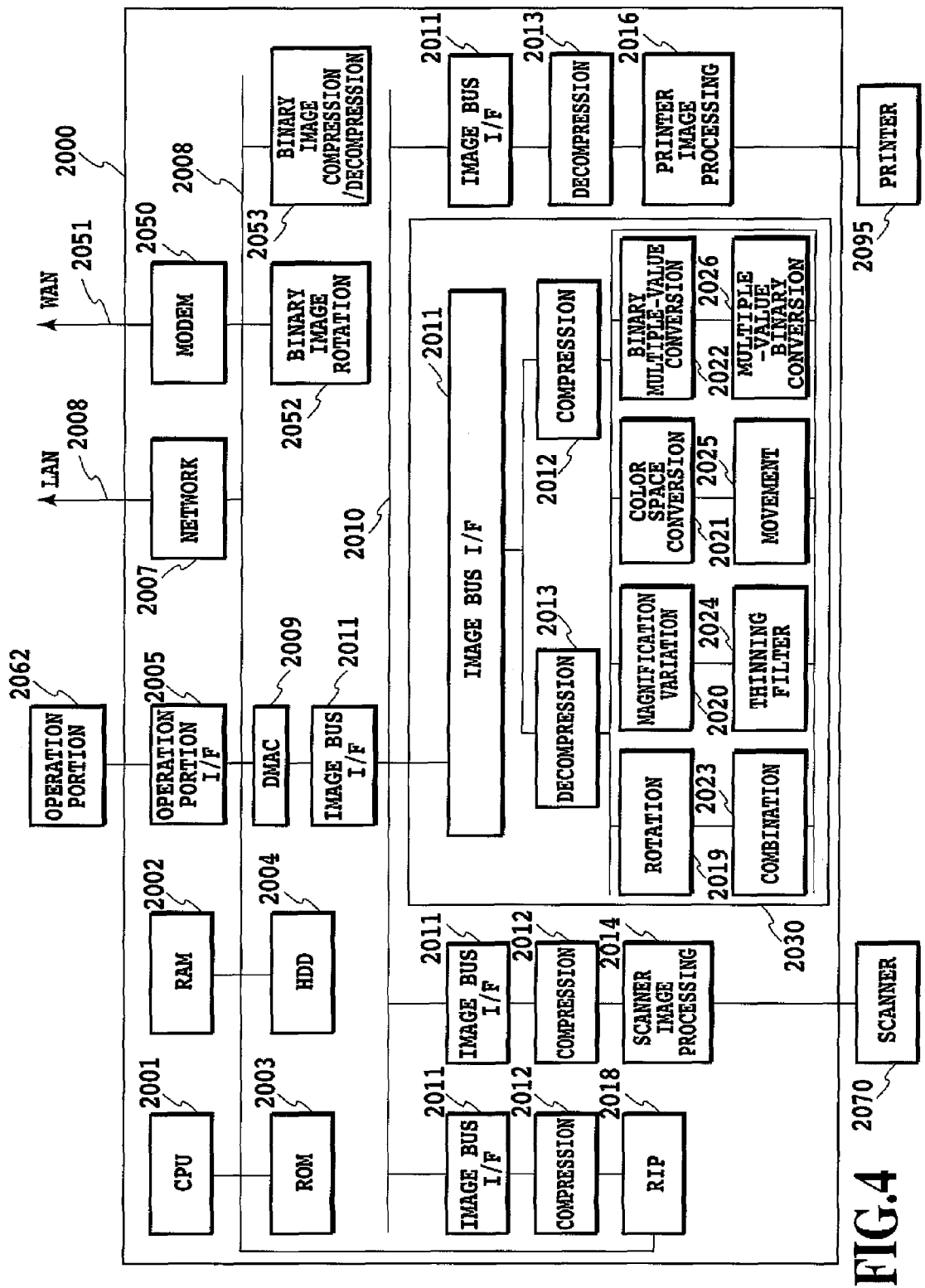
FIG. 4 is a block diagram showing a detailed configuration of a printer shown in FIG. 3, especially of its controller unit.

FIG. 4 is a block diagram showing detailed construction of, especially, the controller unit 2000 in the printer 200.

By the controller unit 2000, a CPU 2001 controls the whole system. RAM 2002 is system work memory for allowing the CPU 2001 to operate, temporarily storing the image data etc. ROM 2003 is boot ROM, storing a boot program of the system.

A HDD 2004 is a hard disk drive, in a hard desk of which system software, the image data, etc. are stored. As will be described later, the image data with a copy-forgery-inhibited pattern image added is also temporarily stored in the hard disk of the HDD 2004, and is read from the hard desk and used for various processing rather than printing.

An operation portion I/F 2005 is an interface unit with the operation portion (UI) 2062, being for outputting data to be displayed on a display screen of the operation portion 2062. Information that the user enters to this printer from the operation portion 2062 is transmitted to the CPU 2001. A network 2007 connects with a LAN 2063, inputting and outputting information. For example, the image data and information about the copy-forgery-inhibited pattern from the host PC are inputted. A modem 2050 allows connection to a public line 2051 and inputs/outputs image information. A binary image rotation unit 2052 and a binary image compression decompression unit 2053 perform processing of converting an orientation of an image before the modem 2050 transmits the binary image and converting it so that the image may have resolution matching with predetermined resolution or a capability of a transmission partner. The printer of this embodiment supports JBIG, MMR, MR, and MH for compression and decompression. A DMAC 2009 is a DMA controller, which reads an image stored in the RAM 2002 not via the CPU 2001 and transfers the image to an image bus I/F 2011. Moreover, the DMAC 2009 writes an image from the image bus in the RAM 2002 not via the CPU 2001. The above devices are connected to a system bus 2008.

The image bus 2011 is an interface for controlling fast input/output of an image via an image bus 2010. A compression unit 2012 is a compressor for performing JPEG compression in the unit of 32×32 pixels before sending the image to the image bus 2010. A decompression unit 2013 is an expander for decompressing an image sent thereto via the image bus 2010.

A raster image processor (RIP) 2018 receives a PDL code from a host device via the network 2007, and the CPU 2001 stores this code in the RAM 2002 via the system bus 2008. The CPU 2001 converts the PDL into an intermediate code, inputs it into the RIP 2018 via the system bus 2008 again, and spreads it as a bit-mapped image (multiple value). In doing so, the RIP 2018 spreads an image area flag corresponding to an attribute of each individual pixel of the bit-mapped image, like the scanner image processing 2014 that will be described later. An attribute of each pixel is written in the PDL code, which allows to determines an attribute of the pixel, for example, whether the pixel is a character, a non-character, or the like. The PDL code is spread as the image area flag, like the bit-mapped image.

The scanner image processing unit 2014 performs various suitable image processing (for example, correction, processing, editing) on a color image and a monochrome image inputted from the scanner 2070, and outputs the processed data (multiple value). Similarly, the printer image processing unit 2016 performs various suitable image processing (for example, correction, processing, editing) so as to create the image data to be used in the printer 2095. Since at the time of printing, the decompression unit 2013 performs binary multiple-value conversion, binary and multiple-value outputs are available.

An image conversion unit 2030 performs image conversion of an image in the RAM, and has various image conversion functions used when the image is drawn back in the RAM again. That is, a rotation unit 2019 can rotate an image in the unit of 32×32 pixels by a specified angle, supporting binary and multiple-value input/output. A magnification variation unit 2020 has a function of converting resolution of an image (for example, from 600 dpi to 200 dpi), and performing magnification variation (for example, from 25% to 400%). Before varying magnification, an image of 32×32 pixels is rearranged into an image in the unit of 32 lines.

A color space conversion unit 2021 converts an input multiple-value image (YUV image) in the memory into a Lab image by a matrix operation and an LUT, and stores it in the memory, for example. Moreover, this color space conversion includes a matrix operation of 3×8 and has a one-dimensional LUT, being capable of the well-known base removal processing and backside copy preventing processing. The converted image is outputted as with multiple-value. Moreover, this color space conversion unit 2021 also performs conversion for visualizing the latent mark using a specific LUT for the copy-forgery-inhibited pattern image data, that will be described later in FIG. 33 etc.

A binary multiple-value conversion unit 2022 converts a 1-bit binary image into a multiple-value image of 8 bits and 256 gradations. Conversely, a multiple-value binary conversion unit 2025 converts, for example, an image of 8 bits and 256 gradations existing in the memory into a 1-bit image of 2 gradations using a technique of error diffusion processing or the like and stores it in the memory. A synthesis unit 2023 has a function of combining two multiple-value images (or binary images) in the memory to form one multiple-value image (or binary image). For example, by combining an image of a company logo in the memory and the manuscript image, the company logo can easily be attached on the manuscript image. For a technique of synthesis, it is assumed that the well-known techniques as follows are used: averaging a pair of pixels; specifying a value of a pixel brighter in brightness level as a pixel value after synthesis, specifying a value of a pixel darker in brightness level as a pixel value after synthesis, and performing each bit on OR operation, AND operation, and EXCLUSIVE OR operation, etc.

A thinning unit filter 2024 is a unit that performs resolution conversion by thinning pixels of a multiple-value image, being capable of output of a multiple-valued image with a resolution reduced by a factor ½, ¼, and ⅛. Wide range enlargement and reduction can be performed by using this together with the magnification variation unit 2020. Moreover, it performs processing of edge enhancement and smoothing by the well-known filtering processing using, for example, a filter of 9×9 etc. A detailed configuration of this filter will be described in FIG. 33.

The move unit 2025 adds a margin portion to an inputted binary image and a multiple-value image, or deletes a margin portion, or does similar processing, and outputs it. The rotation unit 2019, the magnification variation unit 2020, the color space conversion unit 2021, the binary multiple-value unit 2022, the synthesis unit 2023, the thinning unit 2024, the move unit 2025, and a multiple-value binary conversion unit 2026 are capable of operating in conjunction with others, respectively. With this capability, for example when a multiple-value image in the memory is subjected to image rotation and resolution conversion, the both processing can be performed in combination, not via the memory.

Image processing functions of the controller unit 2000 of the printer 200 explained above performs processing regarding the copy-forgery-inhibited pattern image related to several embodiments of this invention that will be described later with reference to FIG. 33 etc.

Figure 5:
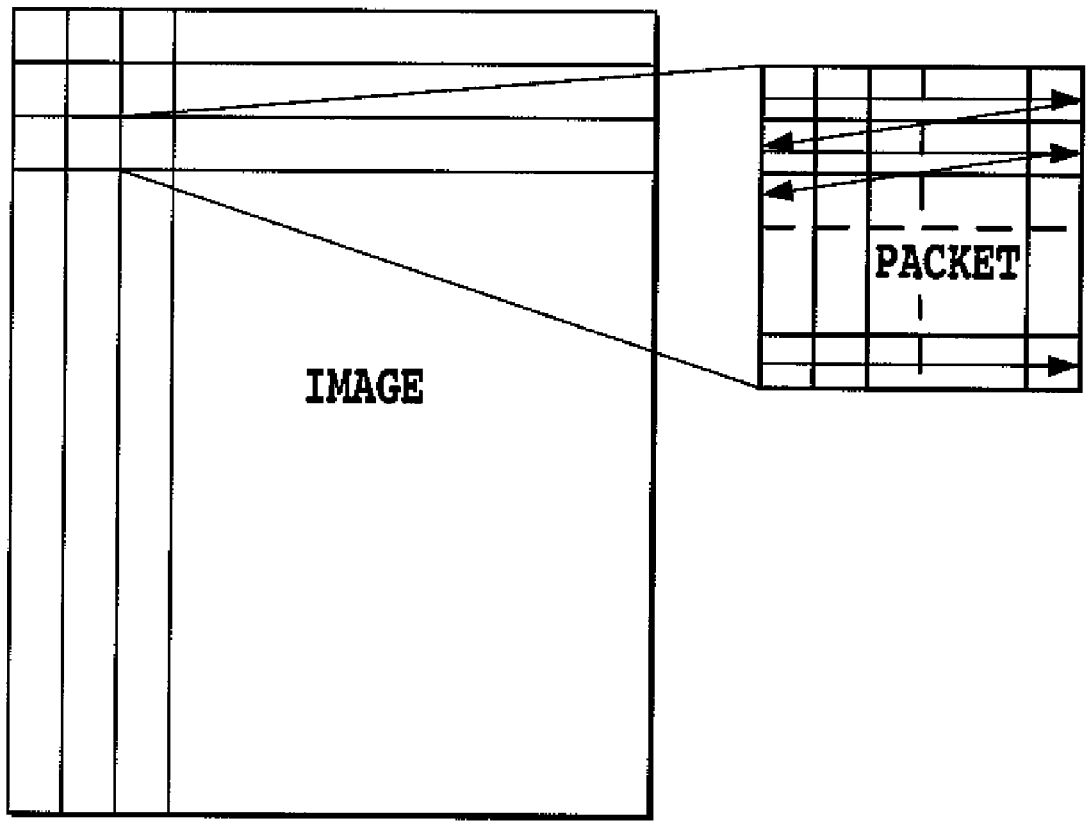
FIG. 5 is a schematic diagram showing a format of image data used in the system shown in FIG. 3.

FIG. 5 is a schematic diagram showing a format of the image data used in the system shown in FIG. 3. As for the format of the image data used in this embodiment, for example, an image packet structure described in Japanese Patent Application Laid-open No. 2001-103473 A can be sued. A compression unit 2012 rearranges an image in the raster form so as to become a packet in the unit of 32×32 pixels, as shown in FIG. 5, and performs JPEG compression in the unit of a packet. At the same time, information of an ID expressing a position of the packet, color space, a Q table ID, a data length, etc., is added to the packet as a header. Binary data (image area flag) expressing characters and photographs are similarly compressed and made to accompany the JPEG data in its behind.

Figure 6:
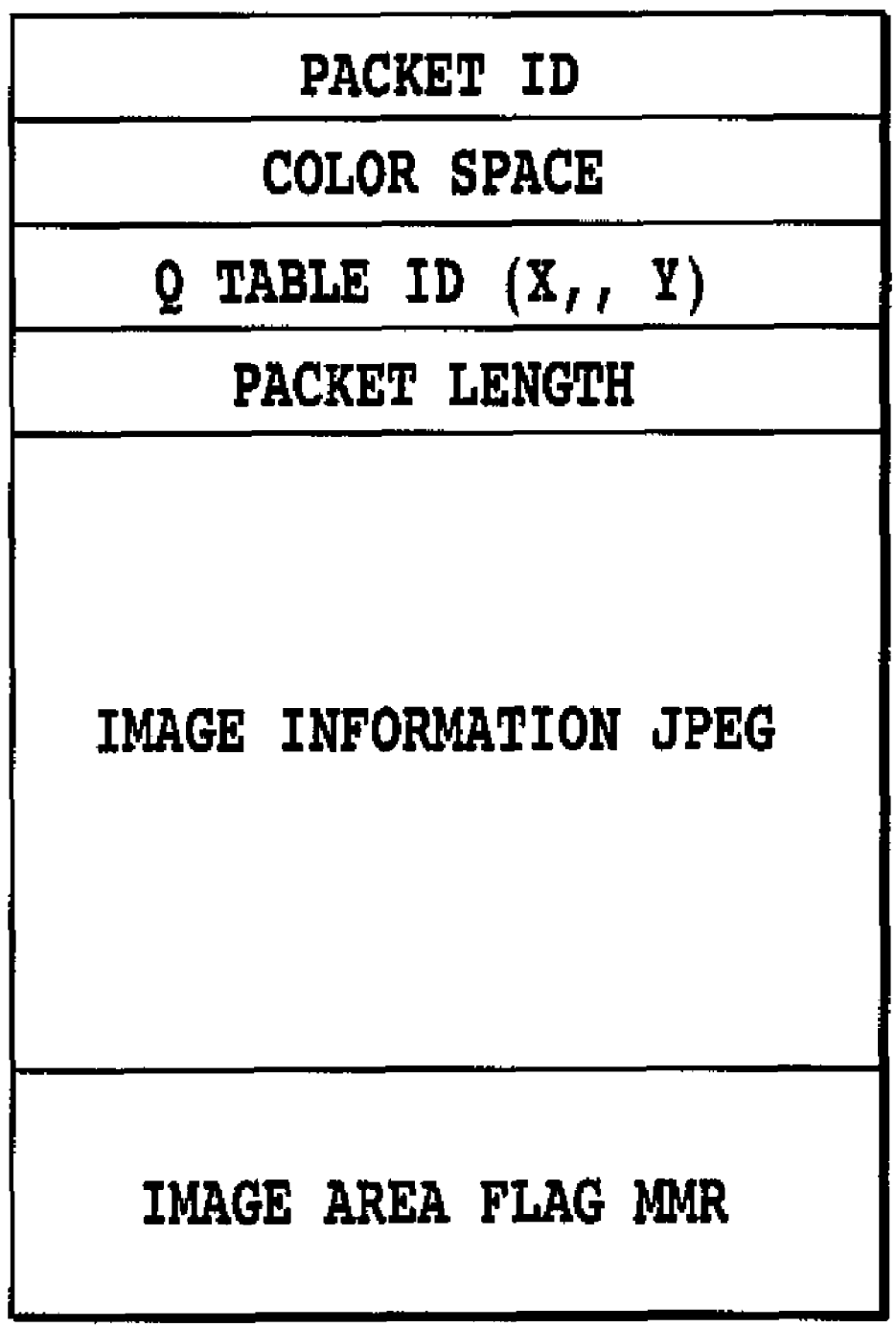
FIG. 6 is a schematic diagram showing packet data explained in FIG. 5.

FIG. 6 is a schematic diagram showing such packet data. In Decompression 2013, JPEG is spread based on this header information and rearranged into a raster image. By drawing JPEG such a packet image, in the case of image rotation, the image can be rotated by partial decompression and compression that is realized by rotating only an image inside the packet and changing a position of the packet ID. This improves the efficiency of processing very well. All the images that flow in the image bus 2010 become a packet image. If a raster image is needed for FAX transmission, rotation of a binary image, compression of a binary image, decompression thereof, etc., conversion from a packet image into a raster image is performed by software.

Figure 7:
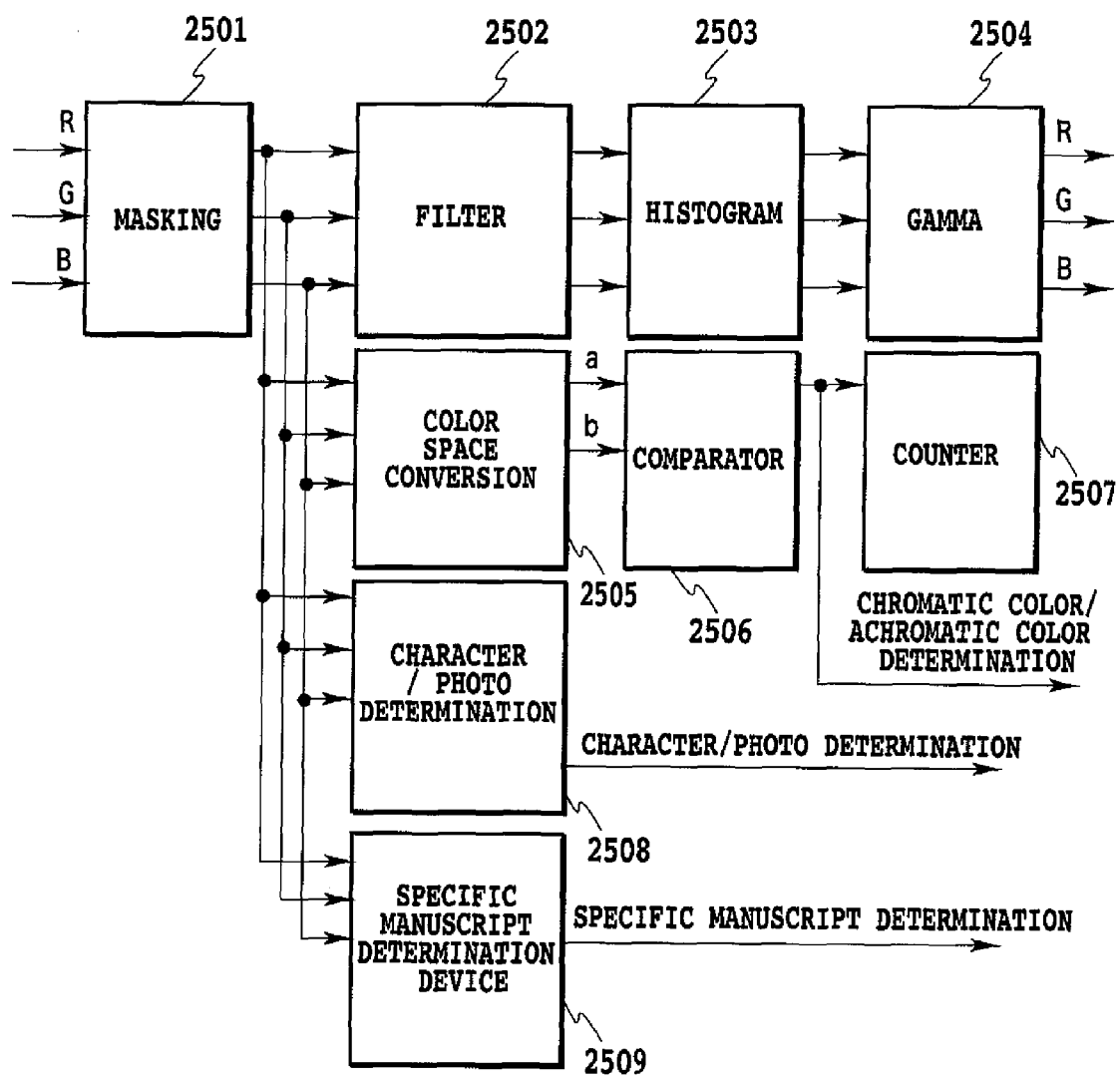
FIG. 7 is a diagram showing a detailed configuration of scanner image processing.

FIG. 7 is a diagram showing a detailed configuration of a scanner image processing 2014. The luminance signal consists of 8-bit R, G, and B inputted from the scanner is converted into a standard RGB color signal that is not dependent on a filter color of the CCD by Masking 2501. With a filter 2502, for example, a matrix of 9×9 is used, and processing of blurring or emphasizing an image is performed. Histogram 2503 is a processing unit for sampling image signal data in an input image, and is used for the base level determination of the input image. This module samples RGB data in a square area surrounded by stating points and end points specified in a main scanning direction and in a sub-scanning direction, respectively, with a constant pitch in the main scanning direction and in sub-scanning direction to form a histogram. This histogram is read when base removal or backside copying prevention is specified. Then the base of a manuscript is inferred from this histogram. This base is saved and managed as an ignoring level along with the image in the memory or the HD, and used for image processing at the time of printing and transmission. In Gamma 2504, processing is done in such a way that the density of a whole image may become thicker or thinner. For example, a color space of an input image is converted into an arbitrary color space, or correction processing related to hues of an input system is performed. In order to determine whether a manuscript is color or monochrome, an image signal before magnification alteration is converted into L, a, and b values of the known Lab color space, respectively, by Color Space Conversion 2505. Among them, the a and the b values indicate color signal components. When a comparator 2506 determines that this color signal component is equal to or more than a predetermined level, the comparator 2506 outputs a 1-bit chromatic determination signal indicating a chromatic color; otherwise, it outputs an achromatic determination signal indicating an achromatic color. A counter 2507 measures an output from the comparator. Moreover, this chromatic color/achromatic color determination signal is stored in the memory or the HD (hard disk drive) as the image area flag along with the image, and is used for image processing in the image conversion unit 2030 or at the time of printing, etc. Character/Photo Determination 2508 has a function of extracting a character or edge from an image and thereby separating the image into characters and photographs. As an output thereof, a character/photo determination signal is obtained. This signal is also used as the image area flag. A specific manuscript determination unit 2509 is capable of determining how much an input image signal agrees with patterns possessed by the determination unit and from the unit 2509 a determination result of agreement/disagreement can be read. In response to the determination result, the image is processed and falsification of bills, securities, etc. is prevented.

Figure 8:
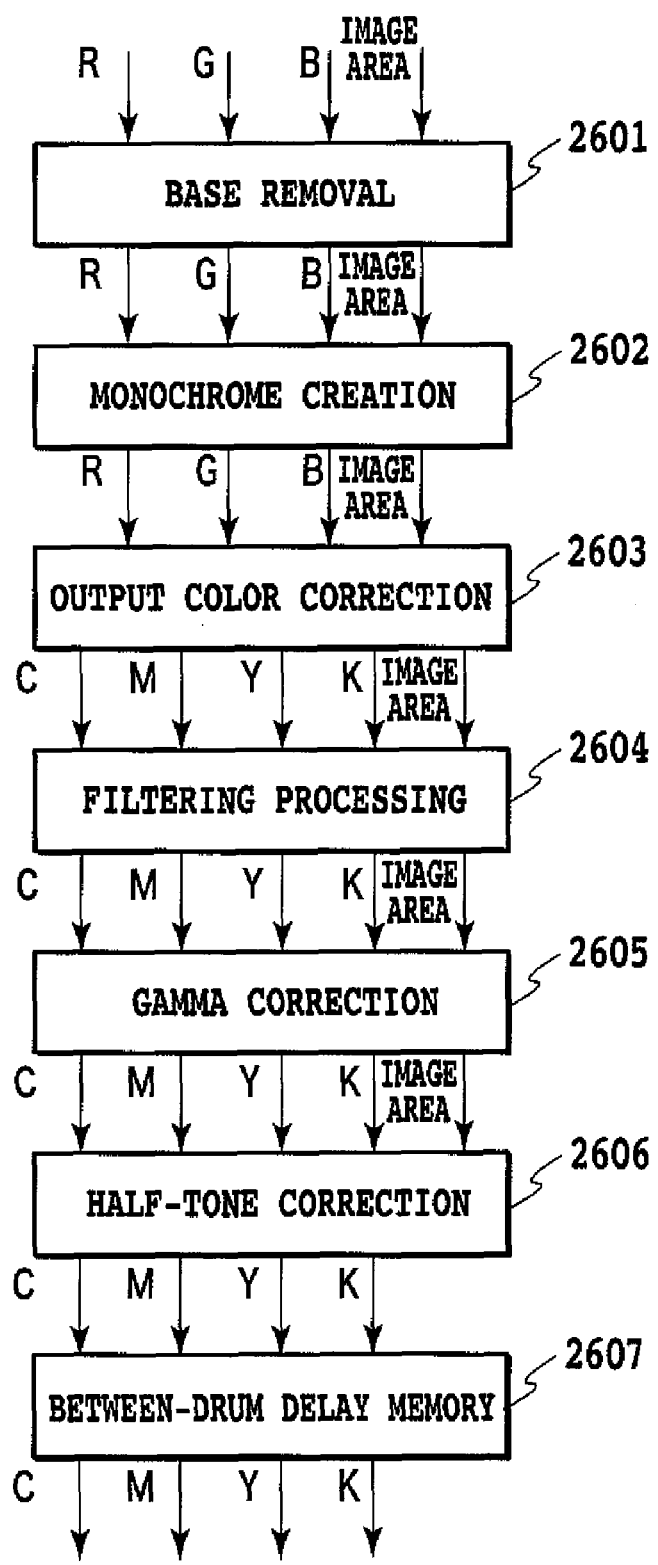
FIG. 8 is a diagram showing a detailed composition of printer image processing shown in FIG. 4.

FIG. 8 is a diagram showing a detailed configuration of the printer image processing 2016. In FIG. 8, a base removal unit 2601 removes a base color of the image data and removes unnecessary covering of the base. For example, a matrix operation of 3×8 and a one-dimensional LUT are use to perform processing of base removal. A monochrome creation unit 2602 is a monochrome unit that, when converting color image data into monochrome data, converts the color image data, for example, RGB data, to a gray monochrome color. This creation unit is constructed with, for example, a 1×3 matrix operation unit for multiplying RGB by an arbitrary constant to obtain a gray signal. An output color correction 2603 performs color correction in accordance with characteristics of the printer unit 2095 outputting the image data. For example, it is constructed with, for example, processing of a matrix operation of 4×8 and direct mapping. A filter processing unit 2604 corrects spatial frequencies of the image data arbitrarily. This processing unit is constructed with, for example, processing of performing a matrix operation of 9×9. A gamma correction unit 2605 performs gamma correction in accordance with characteristics of the printer unit 2095 producing printing out. This correction unit is usually constructed with a one-dimensional LUT. A half-tone correction 2606 performs half-tone processing so that an image may match with the number of stages that the printer unit 2095 can express. To be concrete, binarization, 32-valued digitization, or the like is performed by screen processing, error diffusion processing, or the like. Each processing described above can change its contents in response to an unillustrated character/photo determination signal. A between-drum delay memory 2607 is used to shift a formation timing of CMYK by the amount corresponding to a distance between each two drums in the case where the printer is equipped with drums of colors. With this, C, M, Y and K images can be superposed on each other.

Figure 9:
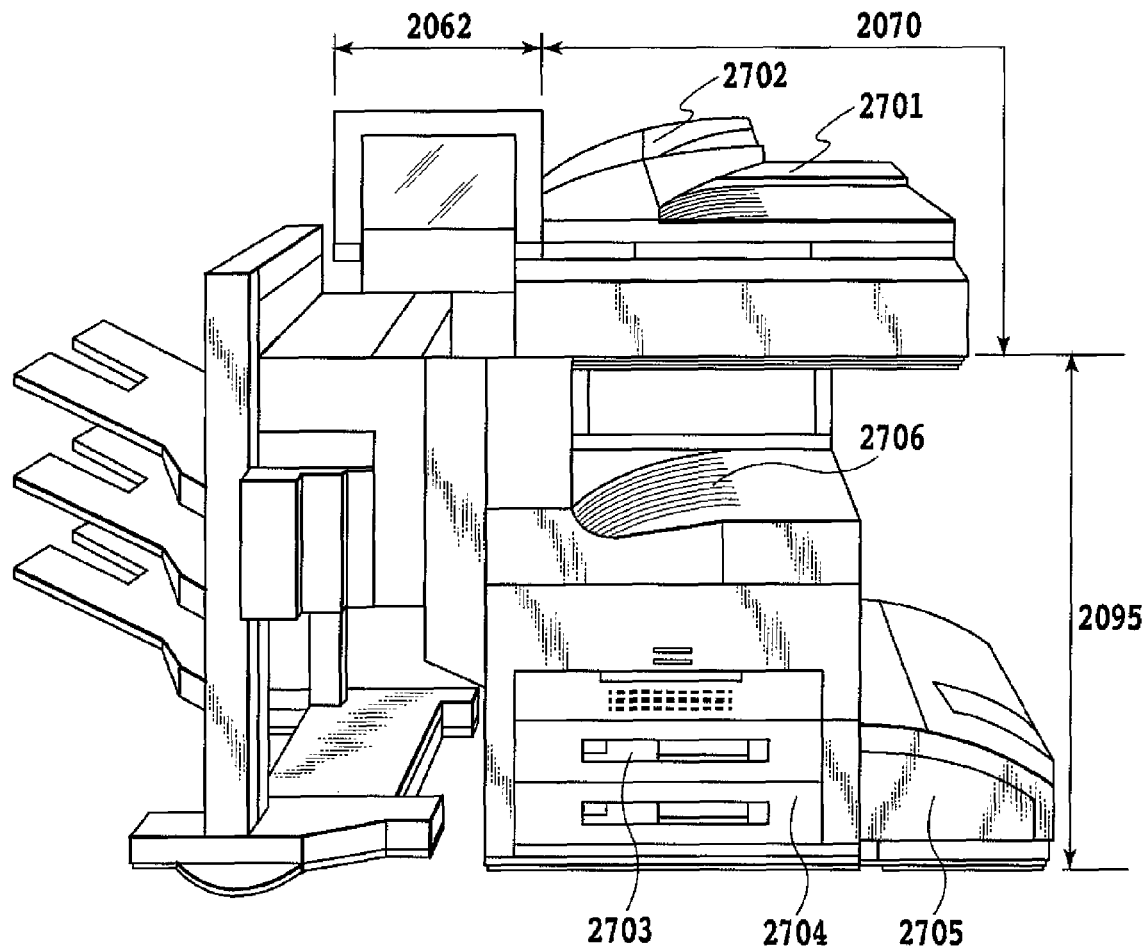
FIG. 9 is a perspective view showing an appearance of a multifunctional printer shown in FIG. 3.

FIG. 9 is a perspective view showing the appearance of the multifunctional printer 200 described above. In the figure, the scanner unit 2070 serving as the image input unit irradiate an image on paper that is as a manuscript and scans it with a CCD line sensor (not illustrated), and thereby converts it into raster image data of an electric signal. Manuscript paper is set to a tray 2702 of the manuscript feeder 2701. Then, when the user directs to start reading from the operation portion 2062, the CPU 2001 of the controller unit gives a direction to the scanner unit 2070, which performs a reading operation of manuscript images while feeding a manuscript form one by one from the tray 2702 of a feeder 2701. The printer unit 2095 serving as an image output unit converts the raster image data into an image on paper. This embodiment uses the electrophotographic system that employs a photosensitive drum. Note that, for the image formation system used in this invention, other systems may be used, such as the ink jet system of ejecting ink from a micro-nozzle array and printing an image on paper. The printing operation is started by a direction from the CPU 2001. The printer unit 2095 has two or more paper feeding stages so that different paper sizes or different paper orientations can be selected, and is provided with paper cassettes 2703, 2704, and 2705 corresponding thereto. A paper discharging tray 2706 carriers sheets of paper on which printing is completed.

Figure 10:
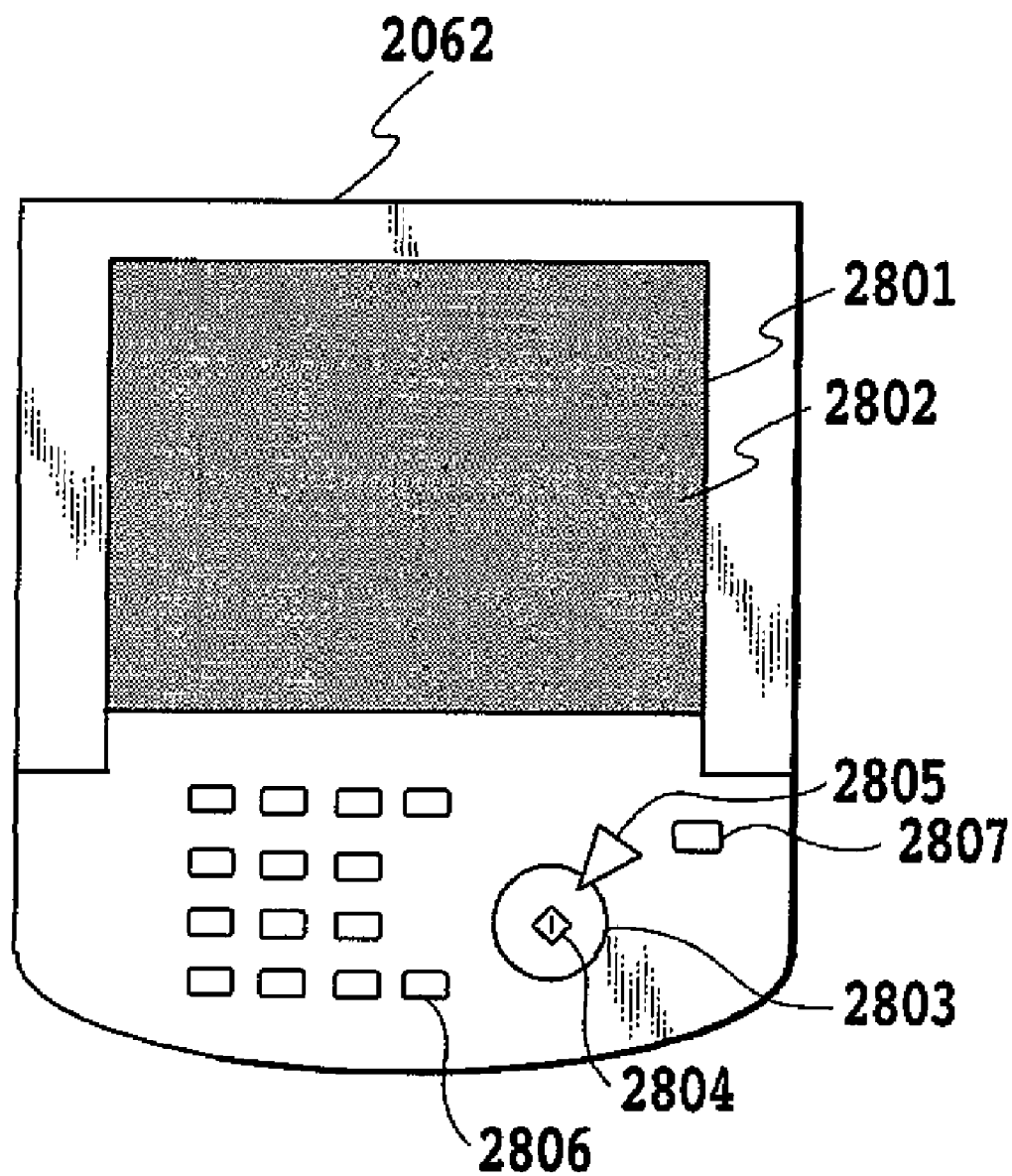
FIG. 10 is a diagram showing a detailed composition of a control panel shown in FIG. 9.

FIG. 10 is a diagram showing a detailed configuration of the operation portion 2062 shown in FIG. 9. In FIG. 10, an LCD display unit 2801 is constructed with an LCD (liquid crystal display) and a touch-panel sheet 2802 glued thereon. With this construction, the LCD display unit 2801 displays an operation screen of the system and soft keys, and if a key currently displayed is pressed, its position information is transmitted to the controller CPU 2001. A start key 2803 is used when starting a reading operation of a manuscript image. A two-color LED 2804 of green and red is provided in the middle of the start key 2803, and it indicates whether the start key 2803 is in a usable state by its color. Stop Key 2805 is used in order to stop an operation under working. An ID key 2806 is used when the user enters a user ID. A reset key 2807 is used when initializing the setting of the operation portion.

Figure 11:
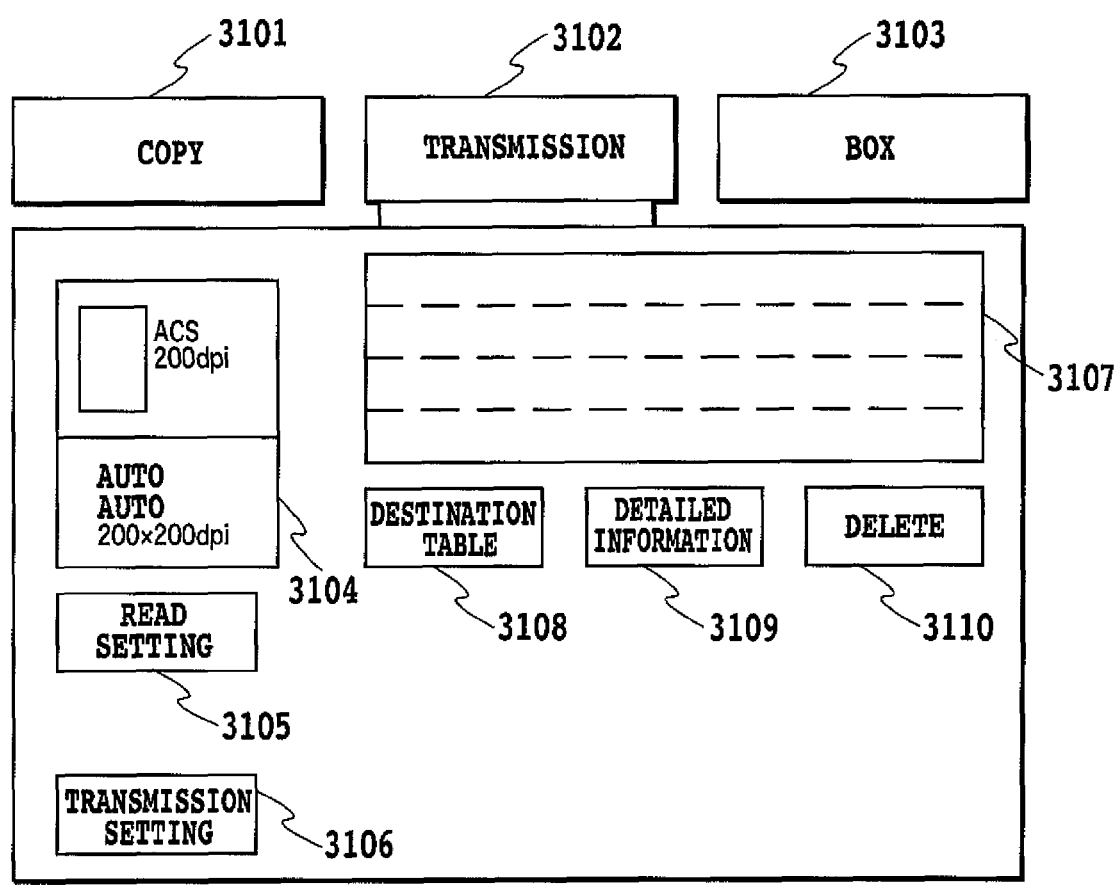
FIG. 11 is a view showing an initial screen of a display in the control panel of the printer shown in FIG. 9.

FIG. 11 is a view showing an initial screen (it is also a standard screen to which the flow returns after setting up each image formation function) in the operation portion 2062 of the printer 200 of this embodiment. In the figure, "Copy" 3101 is a tab for changing over to a screen on which copy setting is established. "Transmission" 3102 is a tab for changing over to a screen on which setting for transmitting a scanned image by FAX or electronic mail is established. "Box" 3103 is a tab for changing over to a screen on which a scanned image and a PDL image are stored in an internal HDD, or a stored read image and a PDL image are printed or transmitted, or setup for editing is established. In addition, a "PDL print" tab (not illustrated) for setting up an operation of this printer in executing printing based on PDL from a host device etc. is provided. By Read Setup tab 3105, resolution, density, etc. at the time of reading an image are set up. The numeral 3104 indicates a window for displaying setting at the time of reading an image being set up by this read setup tab 3105. Transmission Setup 3106 is a button for conducting timer setting at the time of transmitting a timer's time, the setting of the case where an image stored in the HDD is printed by this printer, and the like. A display unit 3107 displays a transmission destination specified by a destination table 3108. A detailed information 3109 is a button for displaying detailed information on one destination displayed on the display unit 3107. An erase 3110 is a button for eliminating one destination displayed on the display unit 3107.

Figure 12:
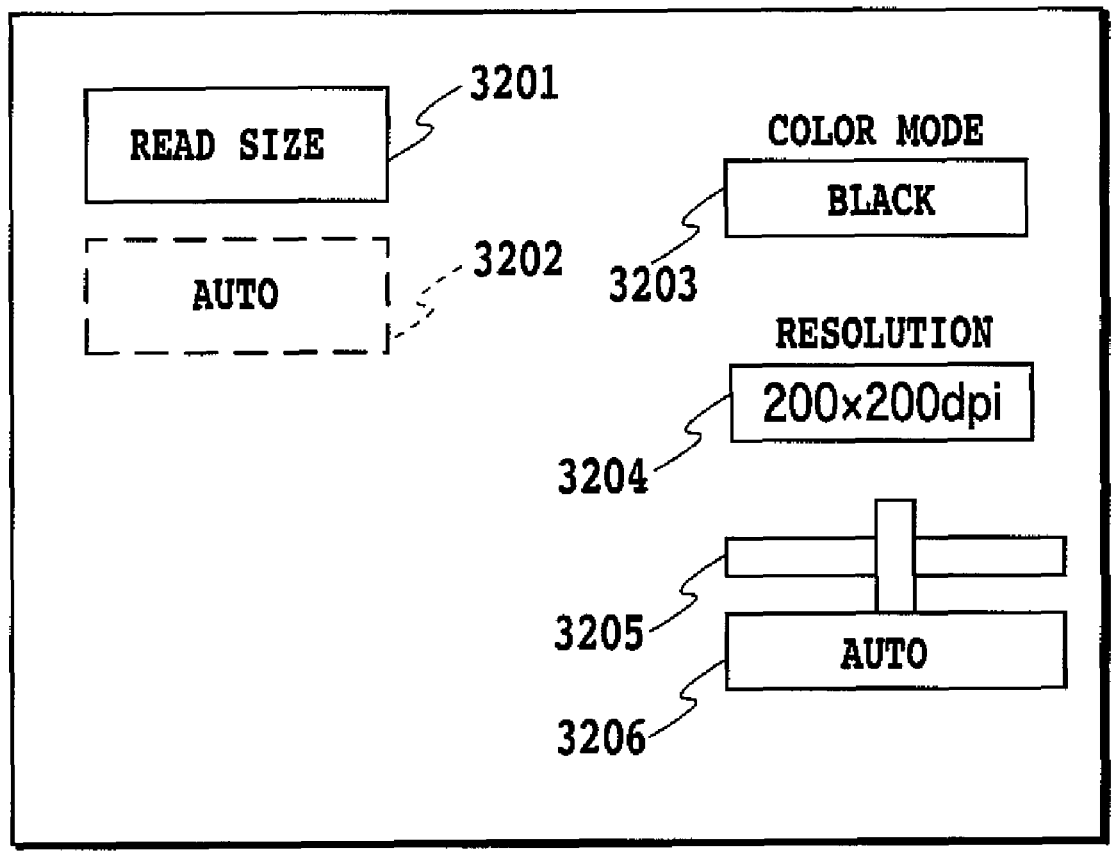
FIG. 12 is a diagram showing a pop-up window displayed when a read setup tab shown in FIG. 11 is pressed.

FIG. 12 is a diagram showing a pop-up window that is displayed when pressing Read Setup 3105 shown in FIG. 11. In FIG. 12, a window 3201 is for selecting and entering reading manuscript size. Here, a reading size being set up is displayed in an area 3202. A window 3203 is for selecting a manuscript reading mode; through this window, a reading mode is selected from three kinds: Color/Monochrome/Automatic (ACS). The color mode can be similarly selected also in Copy and Box shown in FIG. 11. The following result is accumulated: in the case of Color, a color image; in the case of Monochrome, a monochrome image; and in the case of ACS, a color or monochrome image according to a result of determination as to whether the image is color or monochrome. The numeral 3204 is a selection entry from the poopup for selecting resolution of reading. The numeral 3205 is a slider for adjusting a density in reading a manuscript, allowing adjustment of nine stages. The numeral 3206 is a button for automatically determining the density when reading an image covered with a base, such as a newspaper. Regarding the numeral 3206, the same setting is possible also in Copy.

Figure 13:
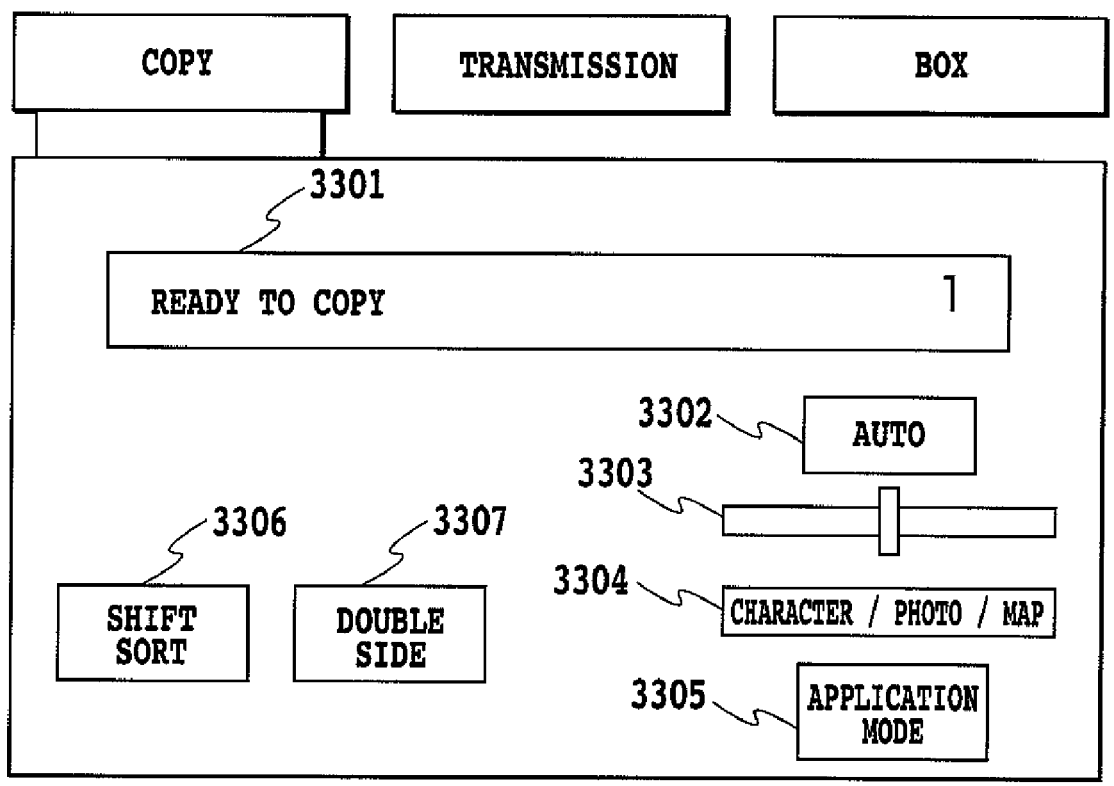
FIG. 13 is a view showing a screen displayed when a copy tab shown in FIG. 11 is pressed.

FIG. 13 is a view showing a screen displayed when a copy tab 3101 shown in FIG. 11 is pressed. In the figure, the numeral 3301 indicate a display part for showing information as to whether the copier is ready to copy, and this display part also indicates the number of copies being set up simultaneously. The numeral 3302 indicates a button for selecting whether a base is ignored automatically. The numeral 3303 indicates a slider for enabling nine steps of density adjustment by its operation. The numeral 3304 indicates an area for selecting a type of manuscript, enabling selection of characters plus photographs plus maps, a character, a printing paper photograph, and a printed photograph. The numeral 3305 indicates Application Mode button, whereby reduction layout (a function of printing a plurality pages of a manuscript into one sheet by reduction), color balance (fine adjustment of each color of CMYK), etc. can be set up. The numeral 3306 can indicates a button for establishing setting related to various finishing, allowing settings of Shift Sort, Staple Sort, and Group Sort. The numeral 3307 indicates a button for establishing setting related to double-sided reading and double-sided printing. The above-mentioned "Application Mode" button is provided in a screen of the PDL mode that is switched over by "PDL Print" tab (not illustrated) in the initial screen of FIG. 4. By pressing this "Application Mode,"

a setting of copy-forgery-inhibited pattern printing that will be explained in FIG. 11 and subsequent figures can be established.

Figure 14:
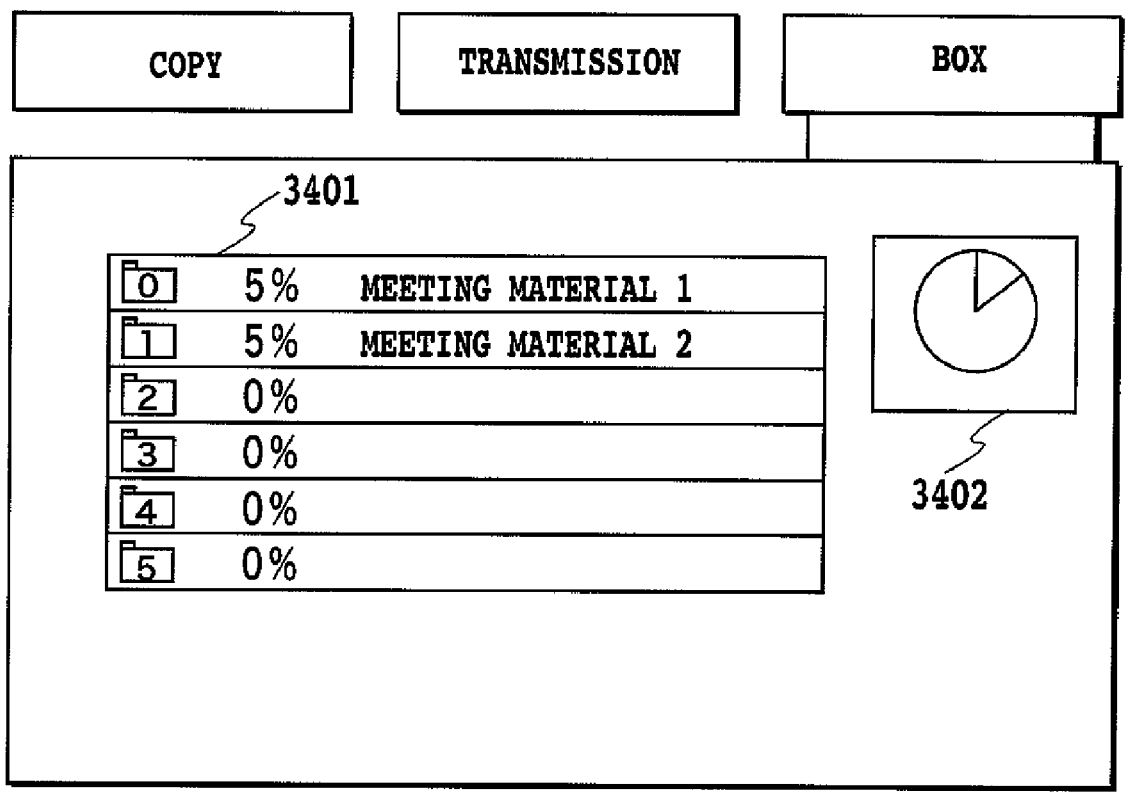
FIG. 14 is a view showing a screen displayed when a box tab shown in FIG. 11 is pressed.

FIG. 14 is a view showing a screen to be displayed when Box tab 3103 shown in FIG. 11 is pressed. In the figure, the numeral 3401 indicates respective schematic representations of folders that are logically divided areas in a hard disk. A folder number is allocated to each folder beforehand. A percentage of a disk capacity used by the folder is indicated by a numeric in the right side of the folder. An arbitrary name can be given to a folder, and that name is also indicated in this display. The numeral 3402 is an area where a used capacity of the whole HDD is shown.

Figure 15:
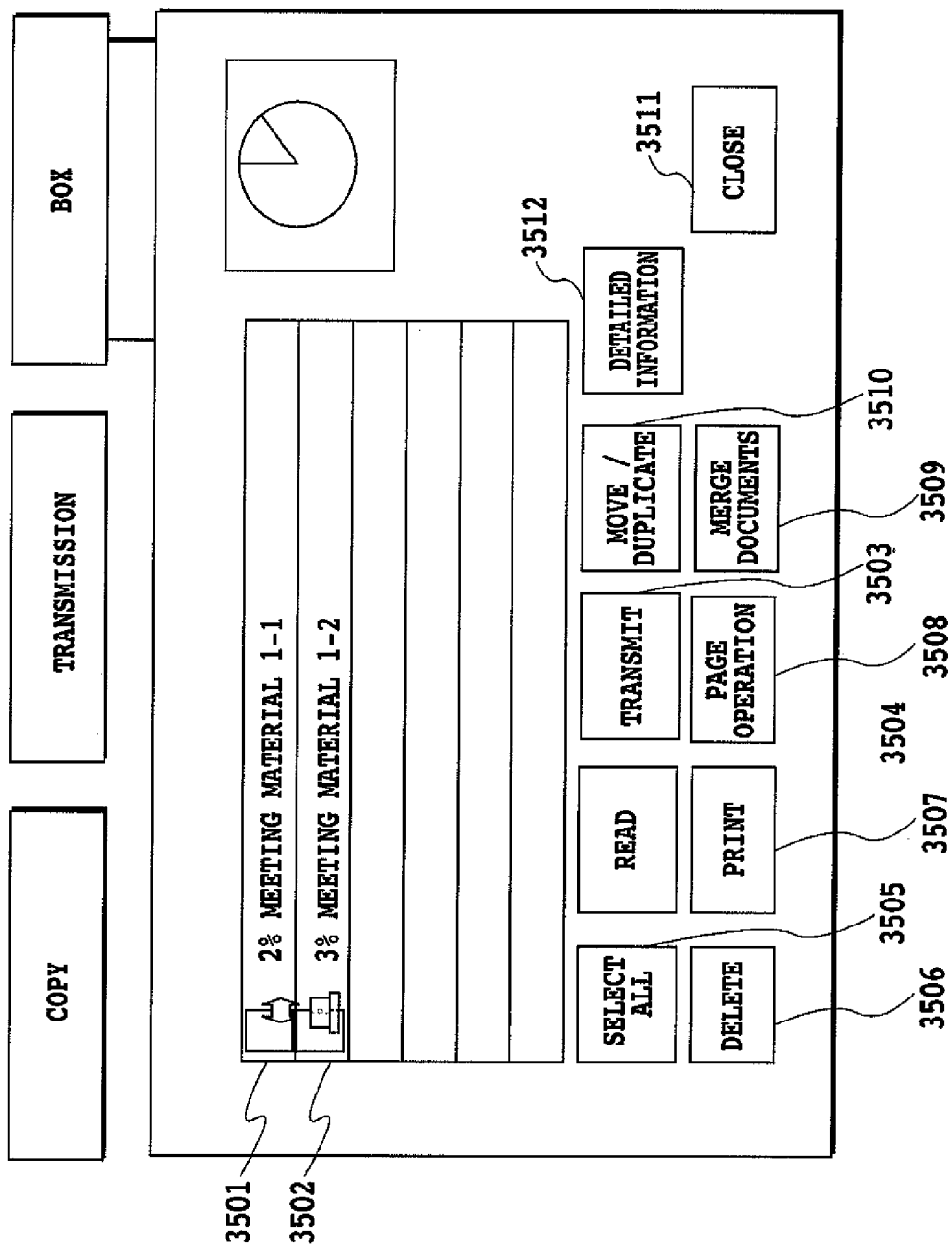
FIG. 15 is a view showing the screen displayed when a display of a folder shown in FIG. 14 is pressed.

FIG. 15 is a view showing a screen that will be displayed when pressing an icon corresponding to a folder of "Meeting material 1" in the display 3401 of folders shown in FIG. 14. In FIG. 15, the numerals 3501, 3502 indicate display of a folder, like the display of FIG. 14, concretely indicating document names of documents as the image data and the like. In an example shown in FIG. 15, the screen shows that a stored document consists of two pages ("Meeting material 1-1" and "Meeting material 1-2"). The numeral 3501 indicates a folder for storing a scanned document, and an icon indicating being a scanned document is shown together with a used capacity of HD. The numeral 3502 indicates a folder of a PDL document stored from the PDL, and similarly an icon corresponding to it is shown together with a used capacity of HD. By pressing each icon, a corresponding document is selected, and a state of being selected is indicated by inverse display. The numeral 3503 indicates a button for transmitting the selected document. The numeral 3504 indicates a button for reading a manuscript from a scanner and creating a document. The numeral 3505 indicates a button for selecting all the documents in a folder. The numeral 3506 indicates a button for deleting a selected document. The numeral 3507 indicates a button for printing a selected document. The numeral 3508 indicates a button for operating a page of a selected document. As described above, all the pages of a document or individually selected pages can be deleted. The numeral 3509 indicates a button for merging selected documents and saving it. By this, for example, it is possible to select two documents, merge them into a single document, and save it. The numeral 3510 indicates a button for moving and duplicating a document. To be concrete, the document is moved from a box in which it exists to a box other than this or duplicated thereto. The numeral 3512 indicates a button for displaying detailed information of a document finally selected. In this display, information, such as resolution, a manuscript size, and color, can be seen besides the document name. The numeral 3511 indicates a button for closing this screen, and by doing so the screen returns to the screen shown in FIG. 14.

As described above, documents as the image data stored in respective folders in the hard are subjected to various processing of transmission, copying, etc. besides printing. For the image data with a copy-forgery-inhibited pattern image added or the image data added with information that a copy-forgery-inhibited pattern image must be combined at the time of outputting among these pieces of the image data, processing is performed in such a way that a copy-forgery-inhibited pattern function of a copy-forgery-inhibited pattern image may not be impaired, as will be described latter as an embodiment of this invention. In addition, processing that effectively prevents duplication, falsification, etc. of these pieces of the image data with the copy-forgery-inhibited pattern added is performed.

Figure 16:
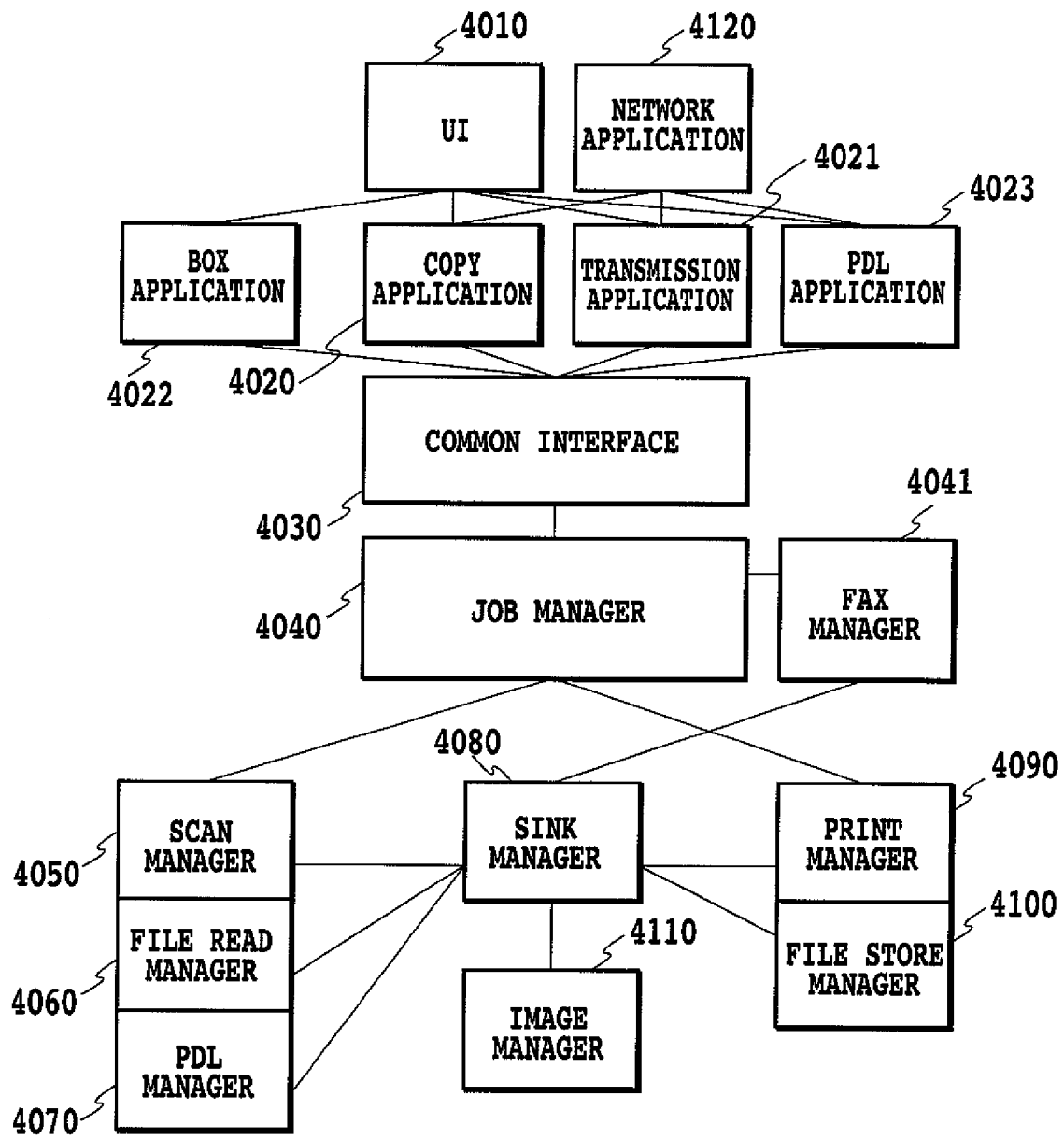
FIG. 16 is a diagram showing a configuration of software operating in the multi-function combined machine printer shown in FIG. 3.

FIG. 16 is a diagram showing a software configuration that operates in the multi-function combined printer 200. In the figure, the numeral 4010 indicates a UI control unit for controlling a display operation portion. A copy application unit 4020, the transmission application unit 4021, and a BOX application unit 4022 each receive a direction from this UI control unit 4010, and perform a copying operation, a transmission operation, scanning from a box screen, printing, respectively. A PDL application unit 4023 receives PDL print data from a network application 4120, and inputs a PDL print job into the common interface 4030.

A common interface unit 4030 performs processing of absorbing an equipment-dependent portion of an equipment control portion. The job manager 4040 arranges job information received from the common interface, and transmits it to a document processing unit of a lower layer. This document processing unit is constructed with the following: in the case of Local copy, a scan manager 4050 and a print manager 4090; and in the case of a transmission job of remote copy or transmission job, with the scan manger 4050 and a file store manager 4100, respectively. Further, the document processing unit is constructed with the following: in the case of received job of remote copy, a file read manager 4060 and the print manager 4090; and in the case of PDL Print, such as of LIPS and PostScript, a PDL manager 4070 and the print manager 4090, respectively. A request of image processing to the image manager 4110 that synchronizes the document managers and performs various image processing is done via a sink manager 4080. The image manager 4110 performs image processing at the time of scanning and printing and storing of an image file.

Processing by several pieces of software that operate on the multi-function combined machine (image formation apparatus) 200 explained with reference to FIG. 16 above will be explained below.

Local Copy Processing

Figure 17:
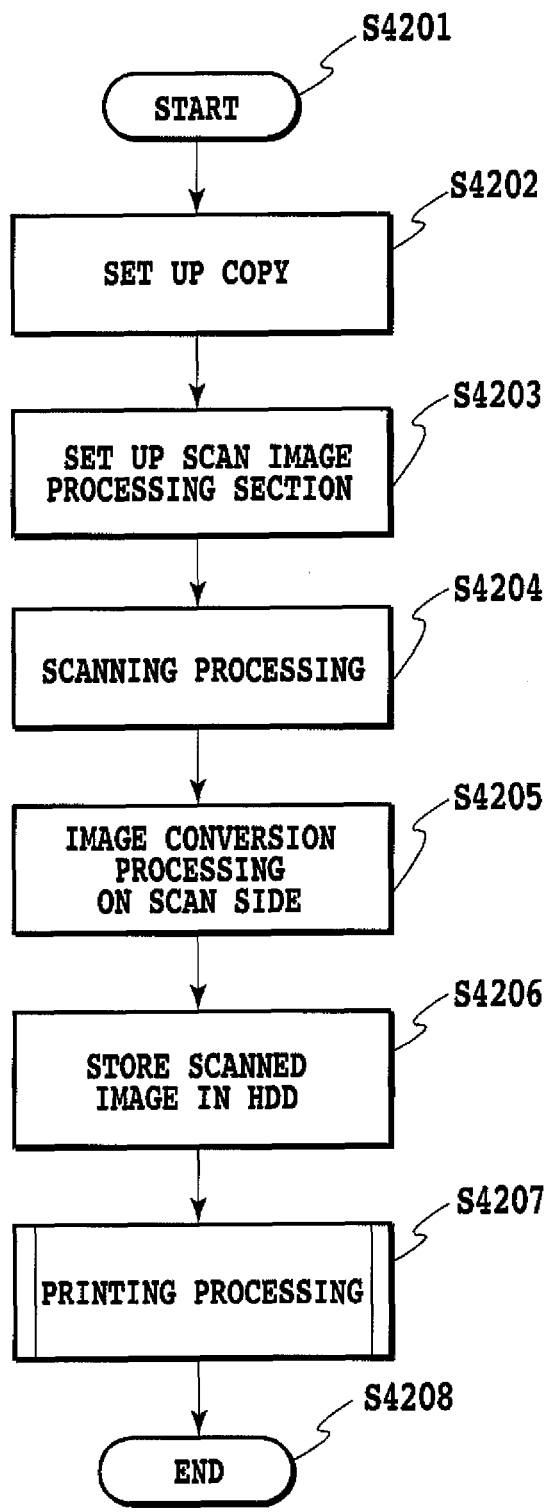
FIG. 17 is a flowchart showing processing of Local copy shown in FIG. 16.

FIG. 17 is a flowchart showing processing of a local copy. By the user's direction, the setting of copying along with a copy direction from the UI control unit 4010 is transmitted to the copy application unit 4020 (Step S4202).

The copy application unit 4020 transmits information from the UI control unit 4010 to the job manager 4040 for performing device control, through the common interface 4030. The job manager 4040 transmits information of the job to the scan manager 4050 and the print manager 4090. The scan manager 4050 gives a scanning demand to the scanner 2070 via an unillustrated device I/F's (which are a serial I/F connecting the controller 2000 and the scanner 2070 and a serial I/F connecting the controller 2000 and the printer 2095). At the same time, the scan manager 4050 gives a demand of image processing for scanning to the image manager 4110 via the sink manager 4080. Following the direction of the scan manager 4050, the image manager 4110 establishes setting of the scanner image processing unit 2014 (Step S4203) and, after the completion of the setup, transmits the completion of scan preparation via the sink manager 4080. After that, the scan manager 4050 directs scanning to the scanner 2070 (Step S4204). The completion of scanned image is transmitted to the image manager 4110 by an interrupt signal from unillustrated hardware. The sink manager 4080 receives the completion of scanning from the image manager 4110 and transmits it to both the scan manager 4050 and the print manager 4090. At the same time, the sink manager 4080 gives a direction to the image manager 4110 in order to file a compressed image accumulated on the RAM 2002 into the HDD 2004. The image manager 4110 stores the image in the memory (including a character/photo determination signal) in the hard disk drive made up of the HDD 2004 following the direction. At this time, according to the setting of Copy, if necessary, image conversion is performed in the image conversion unit 2030 (Step S4205), and the converted image in the memory is stored in the HDD 2004 (Step S4206). In the case where page information is saved in unillustrated SRAM as an accompanying information of the image and the scanned image is saved in the box (hard disk drive) as a document, document information and box information are also stored. These information includes a color/monochrome determination result, a base removal level for enabling base removal, a scanned image as an image input source, color space RGB, etc. When storing in the hard disk drive made up of the HDD 2004 is completed and the image manager receives the completion of scanning from the scanner 2070, the image manager notifies the scan manger 4050 of the completion of creating a file via the sink manager 4080. The scan manager 4050 returns the notification of completion to the job manager 4040, and the job manager 4040 returns the notification of completion to the copy application unit 4020 via the common interface 4030. At the time when an image is inputted into the memory, the print manager 4090 gives a printing demand to the printer 2095 via the device I/F, and at the same time gives a print image processing demand to the sink manager 4080. By this, the processing regarding printing by the printer 2095 is started (Step S4207).

Figure 20:
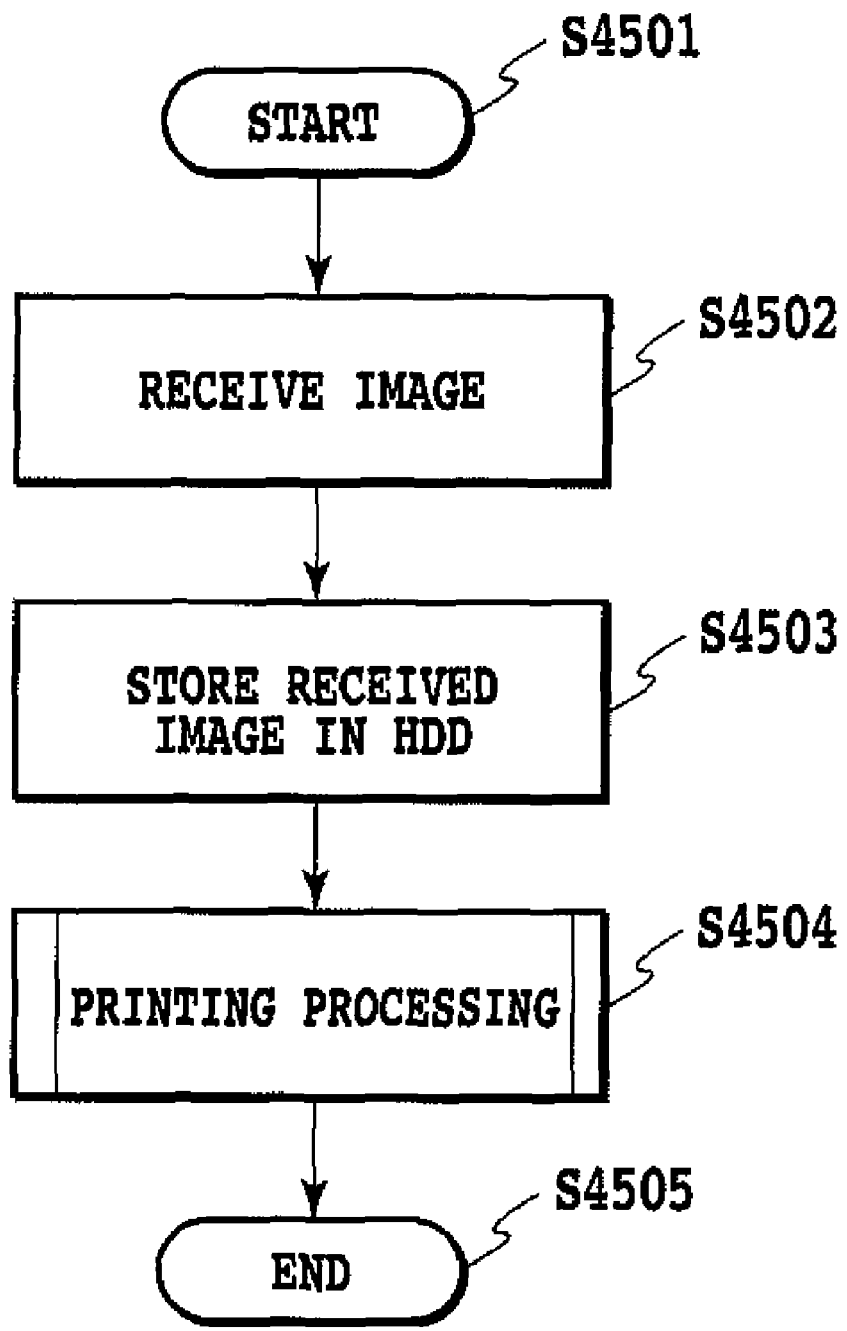
FIG. 20 is a flowchart showing processing when the multi-function combined machine receives a FAX transmission.
Figure 21:
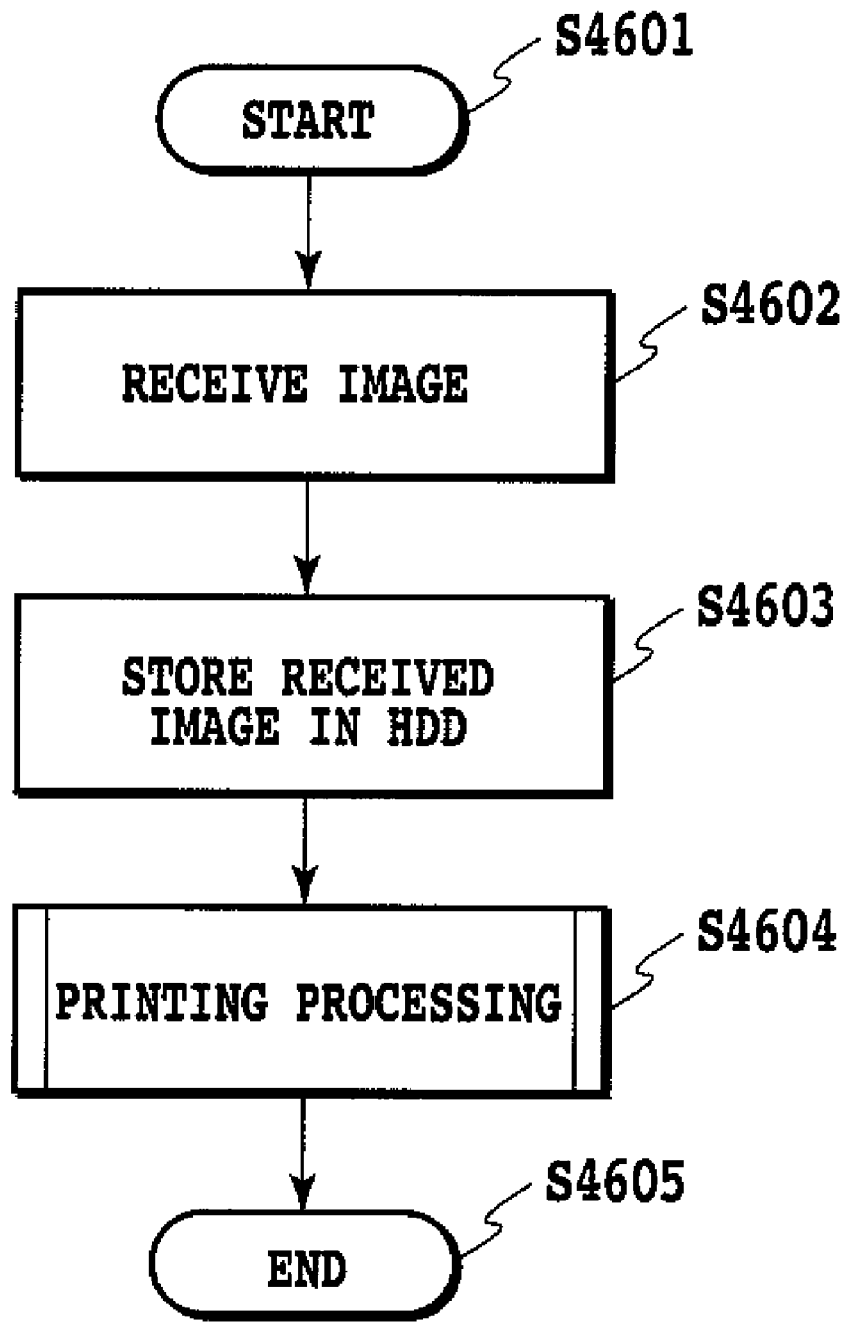
FIG. 21 is a flowchart showing processing when the multi-function combined machine performs printing for remote copy or box print.
Figure 22:
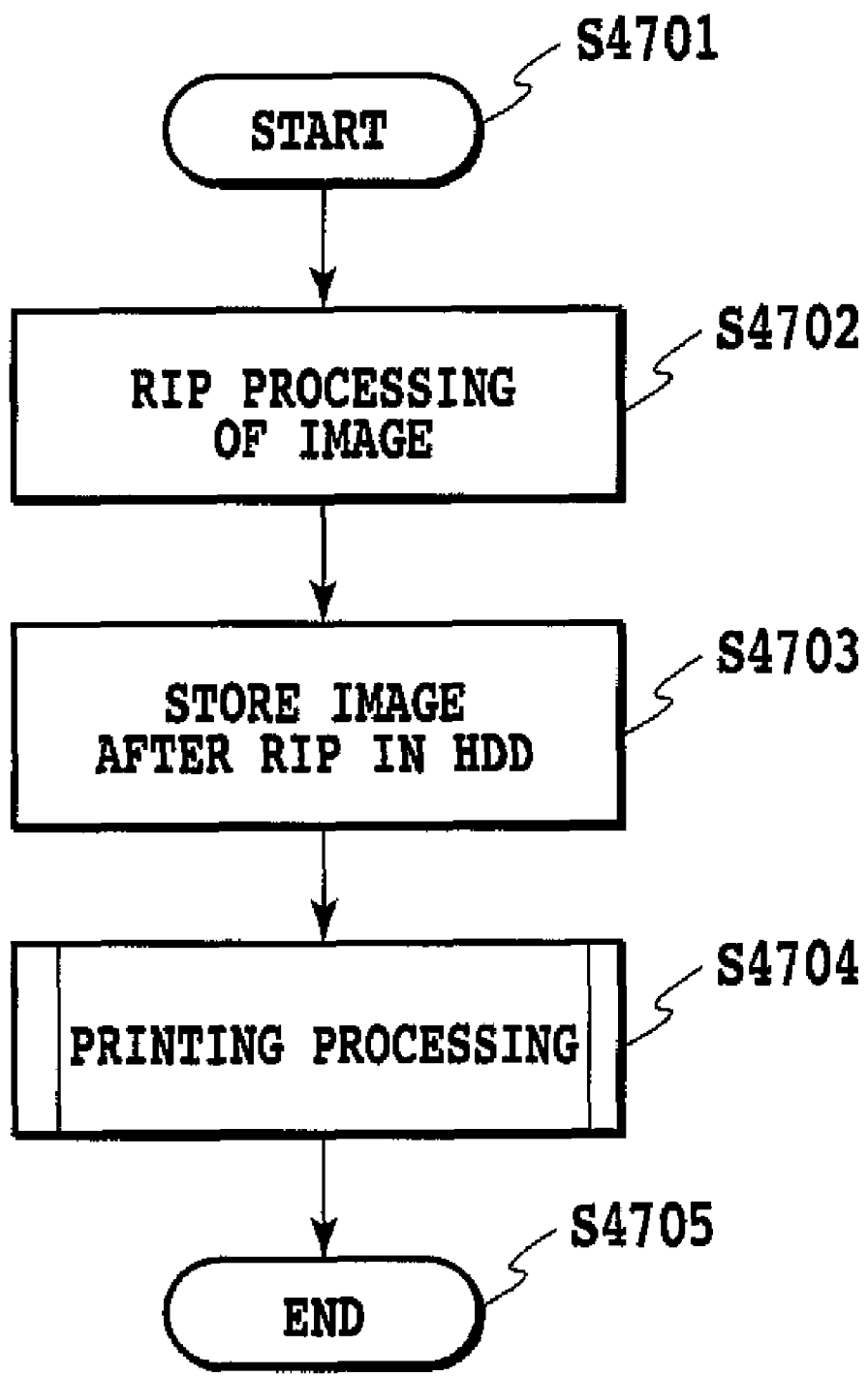
FIG. 22 is a flowchart showing processing of decompression storing processing of PDL data received by the multi-function combined machine.
Figure 23:
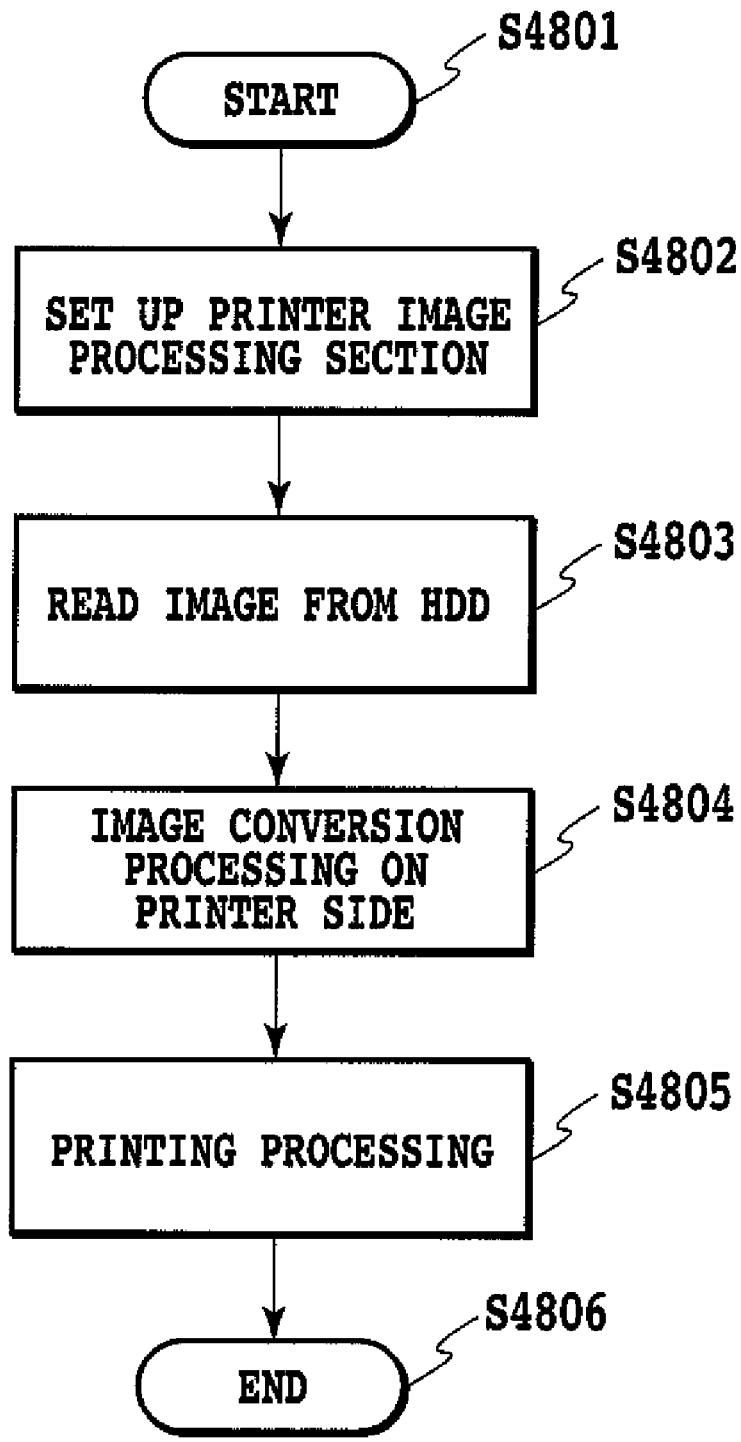
FIG. 23 is a flowchart showing processing of a printer unit in the multi-function combined machine.

FIG. 23 is a flowchart showing processing regarding printing by the printer 2095. Incidentally, printing processing in processing that will be described in FIGS. 20 to 22 is the same as the processing shown in this FIG. 23.

On reception of a demand from the print manager 4090, the sink manager 4080 requests setup of image processing to the image manager 4110. The image manager 4110 establishes a setting of the printer image processing unit 2015 according to the accompanying information of the image described above (Step S4802). The image manager 4110 performs image conversion on the image in the memory (or image read from the hard disk drive made up of the HDD 2004 (Step S4803)) (Step S4804). When this multi-function combined machine is made to create a copy-forgery-inhibited pattern image and add it to the image, processing of creation of the copy-forgery-inhibited pattern image and addition of the copy-forgery-inhibited pattern image to the image read from the hard disk drive are performed in this Step S4804. After the image conversion processing in the above, the image manager 4110 transmits the completion of printing preparation to the print manager 4090 via the sink manager 4080. The print manager 4090 gives a print direction to the printer 2095 (Step S4805). The completion of print image transfer is transmitted to the image manager 4110 by an interrupt signal from unillustrated hardware. Receiving the completion of printing from the image manager 4110, the sink manager 4080 transmits such information to the print manager 4090. Receiving the completion of discharge of paper from the printer unit, the print manager 4090 returns a notification of completion to the job manager 4040, and the job manager 4040 returns it to the copy application unit 4020 via the common interface 4030. When scanning and printing are completed, the copy application unit 4020 notifies the UI control unit of the completion of the job.

Remote Copy and Transmission

Figure 18:
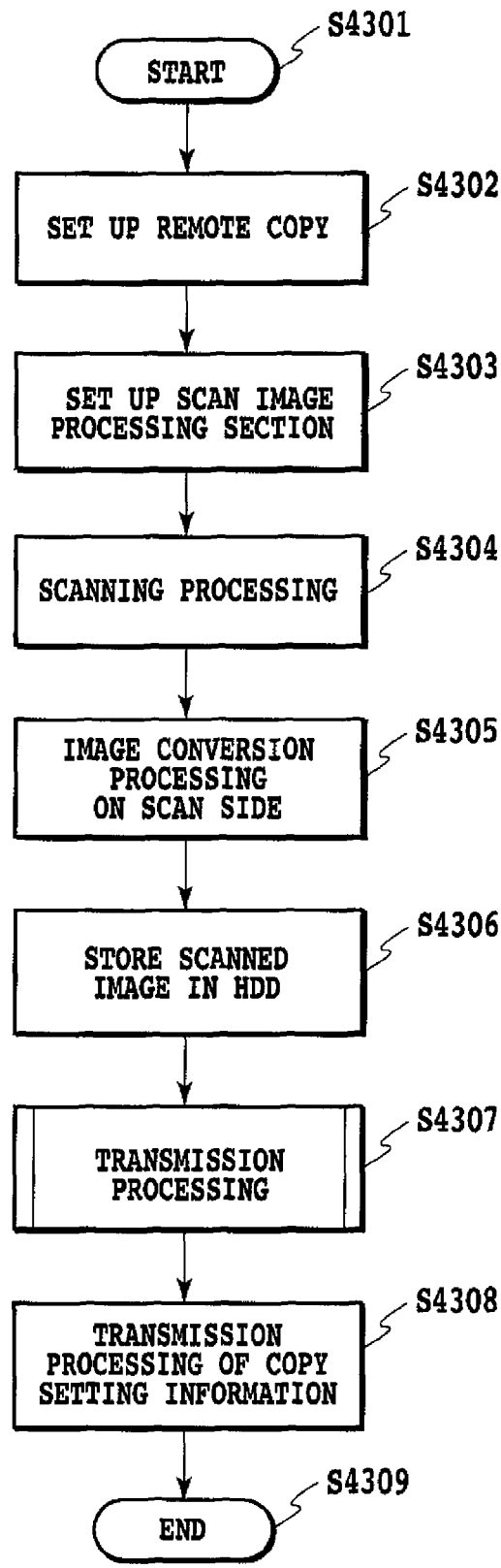
FIG. 18 is a flowchart showing processing of remote copy of transmitting the image data to other printer and switching the printer to print it or processing of transmitting the image data to other equipment.

FIG. 18 is a flowchart showing processing of remote copy of transmitting the read image data to other printer to make the printer print it or processing of transmitting it to other device. Like the case of local copy shown in FIG. 17, the setting of remote copy along with a direction of remote copy is transmitted from the UI control unit 4010 to the application unit 4020 by a direction of the user (Step S4302). Processing of Steps S4303 to S4306 after that is the same as the processing of Steps S4203 to S4206 shown in FIG. 17. Incidentally, in the case of remote copy, the file store manager 4100 in the place of the print manager 4090 receives a demand from the job manager 4040. The file store manager 4100 receives a notification of the completion of storing from the sink manager 4080 at the time when a scanned image has been fully stored in the hard disk drive (Step S4306). Then, it is notified to the copy application unit 4020 in the case of remote copy, or to a transmission application unit 4021 in the case of a transmission job, via the common interface 4030. After this notification, the copy application unit 4020 and the transmission application unit 4021 requests a network application 4420 to transmit a file stored in the hard disk drive. The network application 4420 reads the file stored in the hard disk drive, and starts transmission processing (Step S4307).

Figure 24:
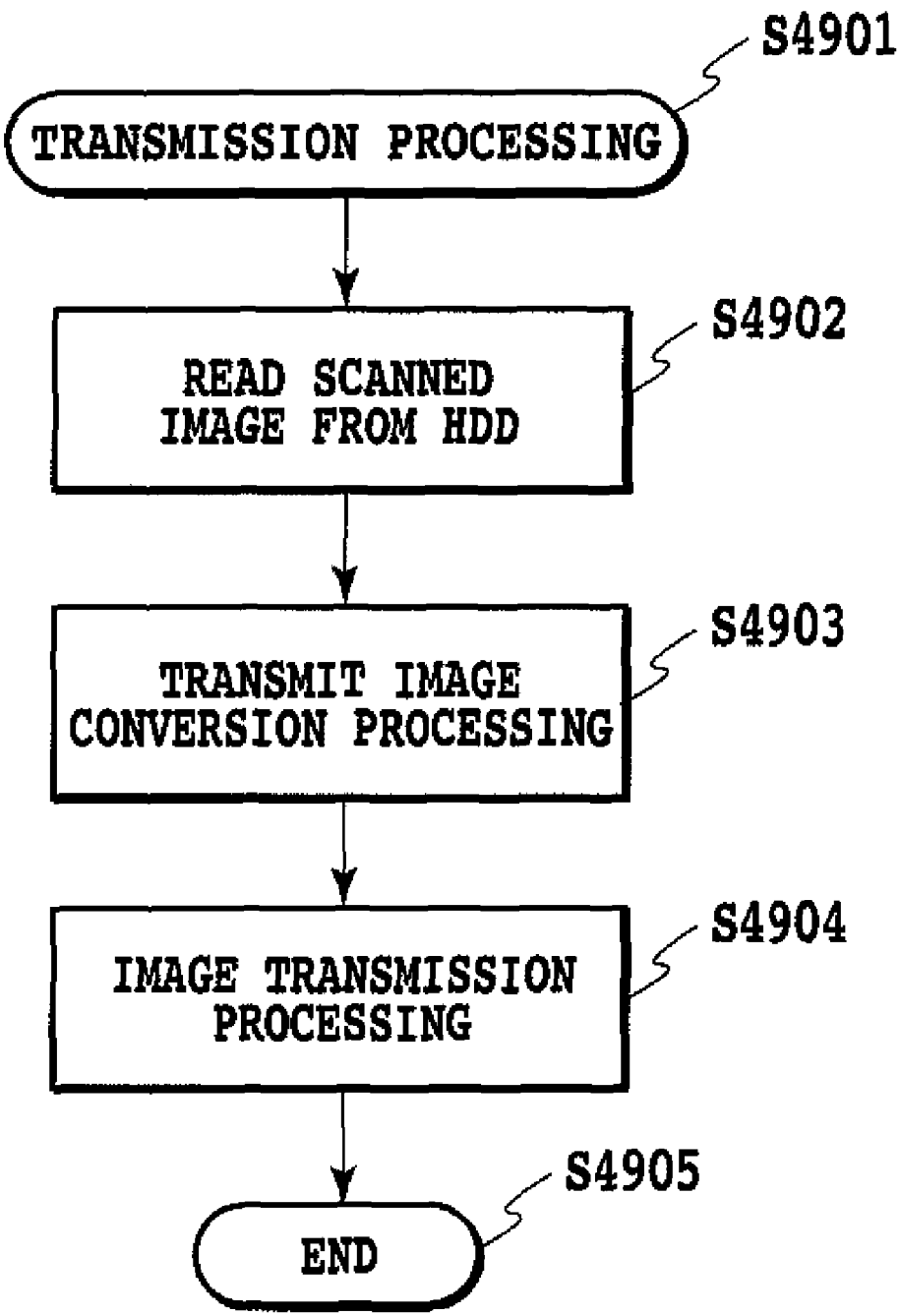
FIG. 24 is a flowchart showing details of transmission processing shown in FIG. 18.

FIG. 24 is a flowchart showing details of this transmission processing. In the transmission processing, first, the network application 4420 received the request reads the file of the image data from the hard disk drive (Step S4902). Then, the network application 4420 performs necessary image processing on the image to be transmitted (Step S4903). In this image processing, as will be described in FIG. 33 etc. about the embodiment of this invention, the image data with a copy-forgery-inhibited pattern image added is subjected to processing of visualizing the latent mark in the copy-forgery-inhibited pattern image so that persons can recognize. Alternatively, as will be described later, protecting is performed in such a way that the latent mark will be visualized for image data added with information indicating that a copy-forgery-inhibited pattern image must be combined at the time of outputting. The image data subjected to the image processing is transmitted to other equipment, such as a printer at the transmission destination (Step S4904).

After the above transmission processing, in the case of local copy, the network application 4420 receives setting information about copying from the copy application unit 4020 at the time of starting a job, and notifies it to equipment at the transmission destination (Step S4308). In the case of remote copy, the network application 4420 performs transmission using a communications protocol specific to the equipment. In the case of transmission, a standard file transfer protocol, such as FTP and SMB, is used.

FAX Transmission

Figure 19:
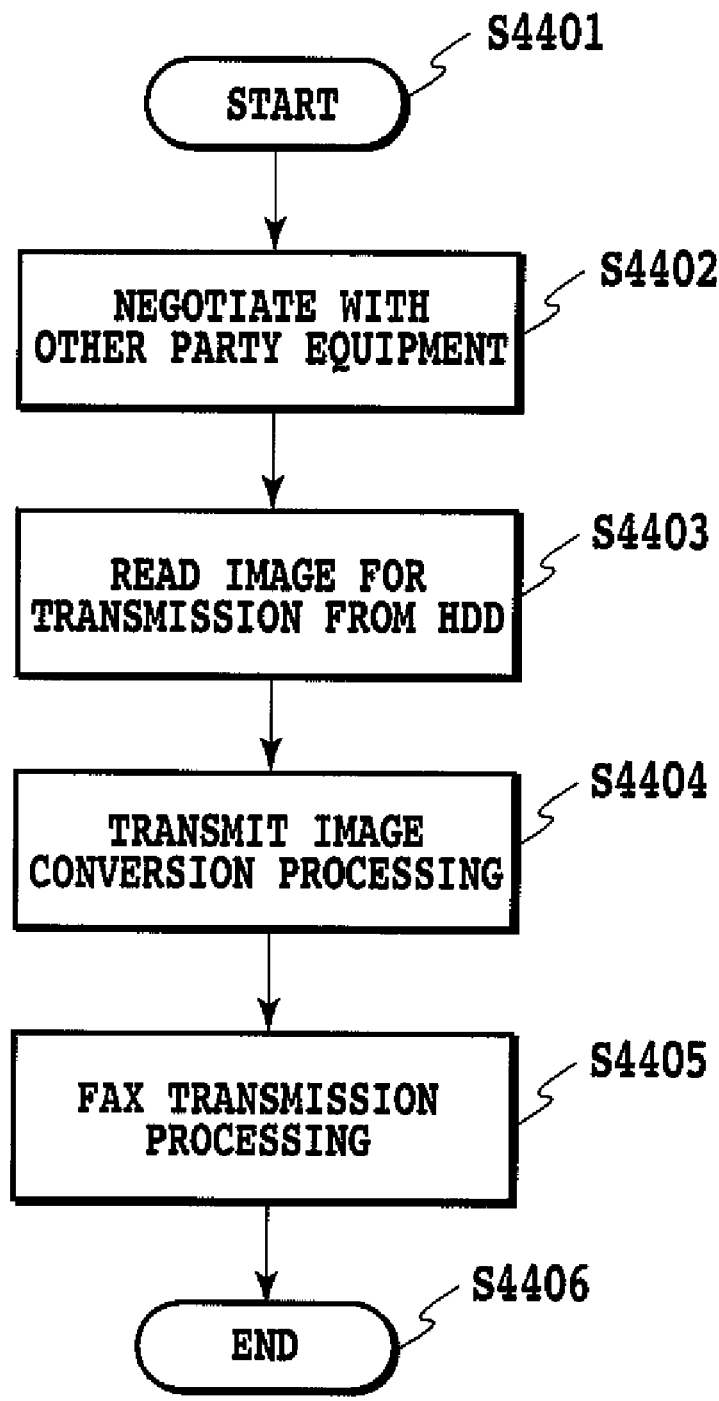
FIG. 19 is a flowchart showing processing of Facsimile (FAX) Transmission.

FIG. 19 is a flowchart showing processing of FAX transmission. After storing the file, the transmission application 4021 directs transmission to the FAX manager 4041 via the common interface 4030 and the job manager 4040. The FAX manager 4041 negotiates with the other equipment at the transmission destination via the modem 2050 (Step S4402), and reads a file stored in the hard disk drive onto the memory (Step S4403). Then, the FAX manager 4041 requests the image manager 4110 to perform necessary image processing (monochrome color conversion, multiple-value binary conversion, rotation, magnification change) (Step S4404), and transmits the image after conversion using the modem (Step S4406). Along with doing so, in the image processing (Step S4404), processing to make the latent mark emerge from the image data with a copy-forgery-inhibited pattern image added is performed, as will be described related to embodiments of the present invention. The processing of making the latent mark emerge is performed also for the image data added with information that a copy-forgery-inhibited pattern image must be combined when being outputted in the other equipment but not with a copy-forgery-inhibited pattern image.

Incidentally, if there is a printer at the transmission destination, the transmission application gives a direction of printing as a print job via a common interface 4000.

Processing by Reception

Next, processing that the multi-function combined machine 200 performs in response to reception from other equipment will be explained.

FIG. 20 is a flowchart showing processing when the multi-function combined machine 200 receives FAX transmission. If FAX transmission comes, the FAX manager receives an image using the modem (Step S4502), and stores it as an image file in the hard disk drive made up of the HDD 2004 (Step S4503). When the FAX manager notifies the box application 4021 after storing the image file in the hard disk drive, the box application 4021 gives a direction of printing the received image to the job manager 4040 via the common interface 4030. Processing after this is the same as the processing shown in FIG. 23 (Step S4504).

FIG. 21 is a flowchart showing processing in the case where the multi-function combined machine performs printing for remote copy or box print. In the printing of remote copy, the transmitted image data is saved in the hard disk drive made up of the HDD 2004 by the network application 4420 (Steps from S4602 to S4603). Along with this, the network application 4420 issues a job to the copy application unit 4020. In the case of printing of a box document, the image data to be printed is in a state of being stored in the hard disk drive made up of the HDD 2004. When the job is issued to the box application 4022 by a direction of the control unit 4010 of the UI, the application unit inputs a print job into the job manager 4040 via the common interface 4030 (Step S4604).

Unlike local copy, the file read manager 4060 in place of the scan manager 4050 receives a demand from the job manager 4040. The file read manager 4060 gives a demand for spreading the image data in the memory moved from the hard disk to the image manager 4110 via the sink manager 4080. An image manager 4110 spreads an image in the memory. At the time of completion of expansion, the image manager 4110 transmits the completion of expansion to the file read manager 4060 and the print manager 4090 via the sink manager 4080. At the time when the image enters the memory, the print manager 4090 selects a paper feed stage directed from the job manager or a stage having the paper size and gives a print demand to the printer 2095 via the device I/F. In the case of automatic feeding, the feed stage is determined considering an image size, and a printing demand is given. At the same time, a print image processing demand is given to the sink manager 4080. When the sink manager 4080 receives a demand from the print manager 4090, it requests the setting of print image processing to the image manager 4110. At this time, for example, if optimum size paper has been run out and rotation become necessary, the sink manager 4080 also requests a rotation direction of the image additionally. When a rotation direction is given, the image manager rotates the image using Image Rotation 2019. The image manager 4110 makes the setting of a printer image processing unit 2090, and transmits the completion of printing preparation to the print manager 4090 via the sink manager 4080. The print manager 4090 gives a print direction to the printer. The completion of print image transfer is transmitted to the image manager 4110 by an interrupt signal from unillustrated hardware. Receiving the completion of printing from the image manager 4110, the sink manager 4080 transmits the completion of printing to the file read manager 4060 and the print manager 4090. The file read manager 4060 returns the notification of the completion to the job manager 4040. Receiving the completion of discharge of paper from the printer unit, the print manager 4090 returns the notification of the completion to the job manager 4040. The job manager 4040 returns the notification of the completion to the copy application unit 4020 via the common interface 4030. When printing is completed, the application unit will notify the UI control unit of the completion of the job.

FIG. 22 is a flowchart showing received PDL data expansion and storing processing. A demand from the host PC that inputted PDL printing is transmitted to the PDL application 4023 via the network application 4120. The PDL application directs a job of PDL data that is spread and stored to the job manager 4040 via the common interface 4030. At this time, the PDL manager 4070 and the file store manager 4100 receive a demand from the job manager 4040. A flow related to image inputting after the completion of image RIP (Step S4702) is the same as that in the scan job described above. The image in the memory (including image area flags, such as a character/photo determination signal etc.) is stored in the hard disk drive made up of the HDD 2004 (Step S4703). In the case where page information is saved in unillustrated SRAM and the scanned image is saved in a box (hard disk drive) as accompanying information of the image, document information and box information are also stored. These information is a color/monochrome determination result, a base removal level for enabling base removal, a scanned image as an image input source, color space RGB, etc. When the PDL image has been stored in the HDD 2004, the notification of the completion of storing is received from the sink manager 4080, which is notified to the PDL application 4023 via the common interface 4030. After this notification, the PDL application 4023 notifies the network application 4420 of the completion of storing in the HDD, and this information is transmitted to the host PC that inputted the PDL printing. In the case of a PDL print job, the PDL manager 4070 and the print manager perform processing of making an image spread in the memory to be printed on a paper (Step S4704).

For printing of an image that is described in PDL and stored, a stored document that is directed to be printed by UI is issued as a print job to the BOX application. The BOX application unit 4022 inputs the print job into the job manager 4040 via the common interface 4030. Unlike local copy, a file read manager 4060 in place of the scan manager 4050 receives a demand from the job manager 4040. A demand for spreading an image that is instructed to be printed in the memory from the HDD is issued to the image manager 4110 through the sink manager 4080. Operations after this are the same as the operations explained in printing of remote copy.

Copy-Forgery-Inhibited Pattern Image Formation and Addition

Next, processing of forming the copy-forgery-inhibited pattern image data and adding it to the image data will be explained. In this embodiment, the PC 240 performs this processing.

Figure 25:
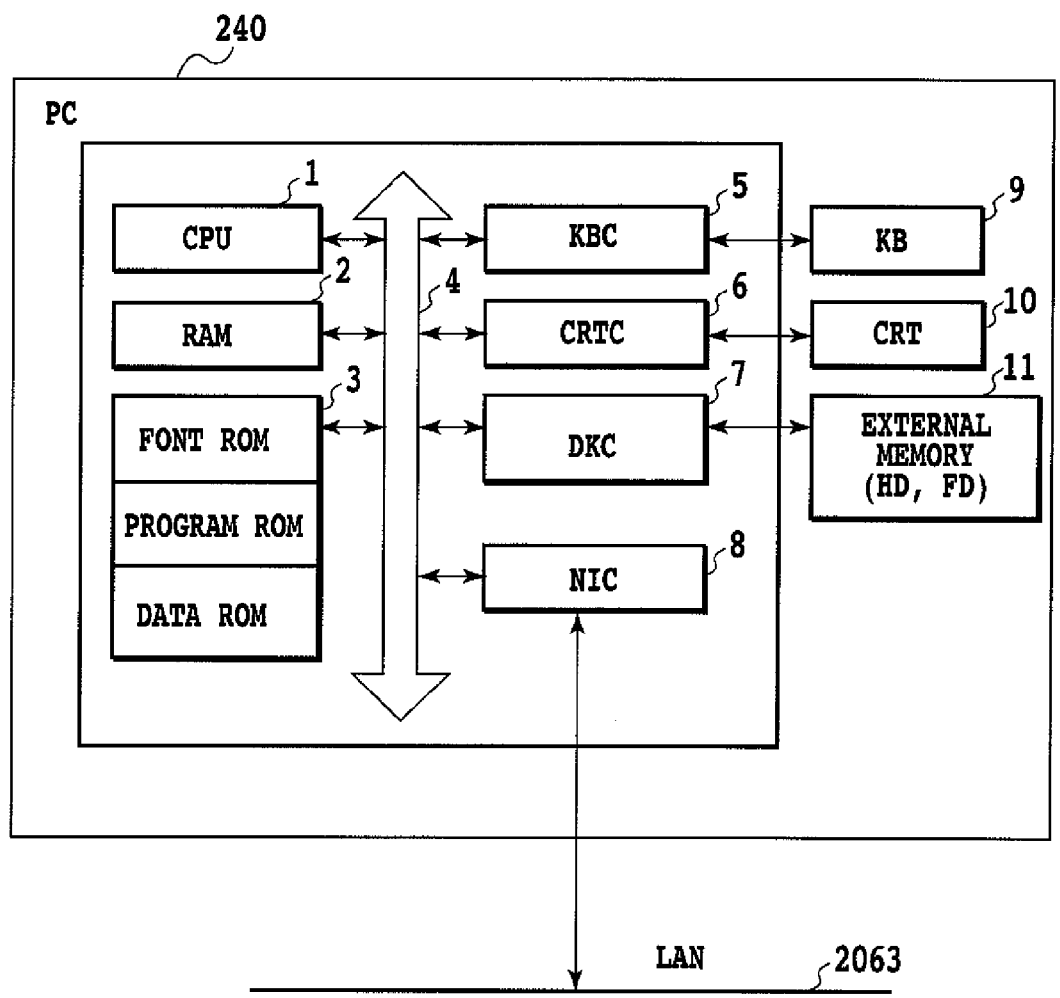
FIG. 25 is a block diagram showing a hardware configuration of the PC shown in FIG. 3.

FIG. 25 is a block diagram showing a hardware configuration of the PC 240 (FIG. 3) according to one embodiment of the present invention.

As shown in the figure, the PC 240 is provided with the CPU 1. The CPU 240 controls execution of processing of a document in which diagrams, images, characters, tables (including spread sheets), etc. and printing processing based on it according to a document processing program stored in the program ROM of the ROM 3 or external memory 11 etc. The CPU 1 supervises controlling of devices connected with the system bus 4. Program ROM of the ROM 3 or the external memory 11 stores an operating system program (hereinafter referred as OS) that is a control program of the CPU 1 and the like. Font ROM of the ROM 3 or the external memory 11 stores font data etc. used in the above-mentioned processing. Data ROM of ROM 3 or the external memory 11 stores various data used in performing the above-mentioned document processing etc. The RAM 2 functions as main memory, a work area, etc. of the CPU 1.

A keyboard controller (KBC) 5 controls key entry from a keyboard 9 or an unillustrated pointing device. A CRT controller (CRTC) 6 controls display by a CRT display (CRT) 10 including display of the copy-forgery-inhibited pattern image. The numeral 7 indicates a disk controller (DKC) and controls access with the external memory 11, such as a hard disk (HD) and a floppy (registered trademark) disk (FD). A hard disk drive stores a boot program, various kinds of applications, font data, a user file, an edit file, a printer command generation program (hereinafter, referred to as a printer driver), etc. A network interface controller (NIC) 8 is connected with an image formation apparatus 200 via the LAN 2063, and performs communication control processing.

The CPU 1 opens various windows registered beforehand based on a command directed by an unillustrated mouse cursor on the CRT 10, and performs various data processing. When the user executes printing, the user can open the window regarding the setting of printing and can perform the setting of a printer and the setting of a printing processing method to a printer driver including selection of a printing mode.

Figure 26:
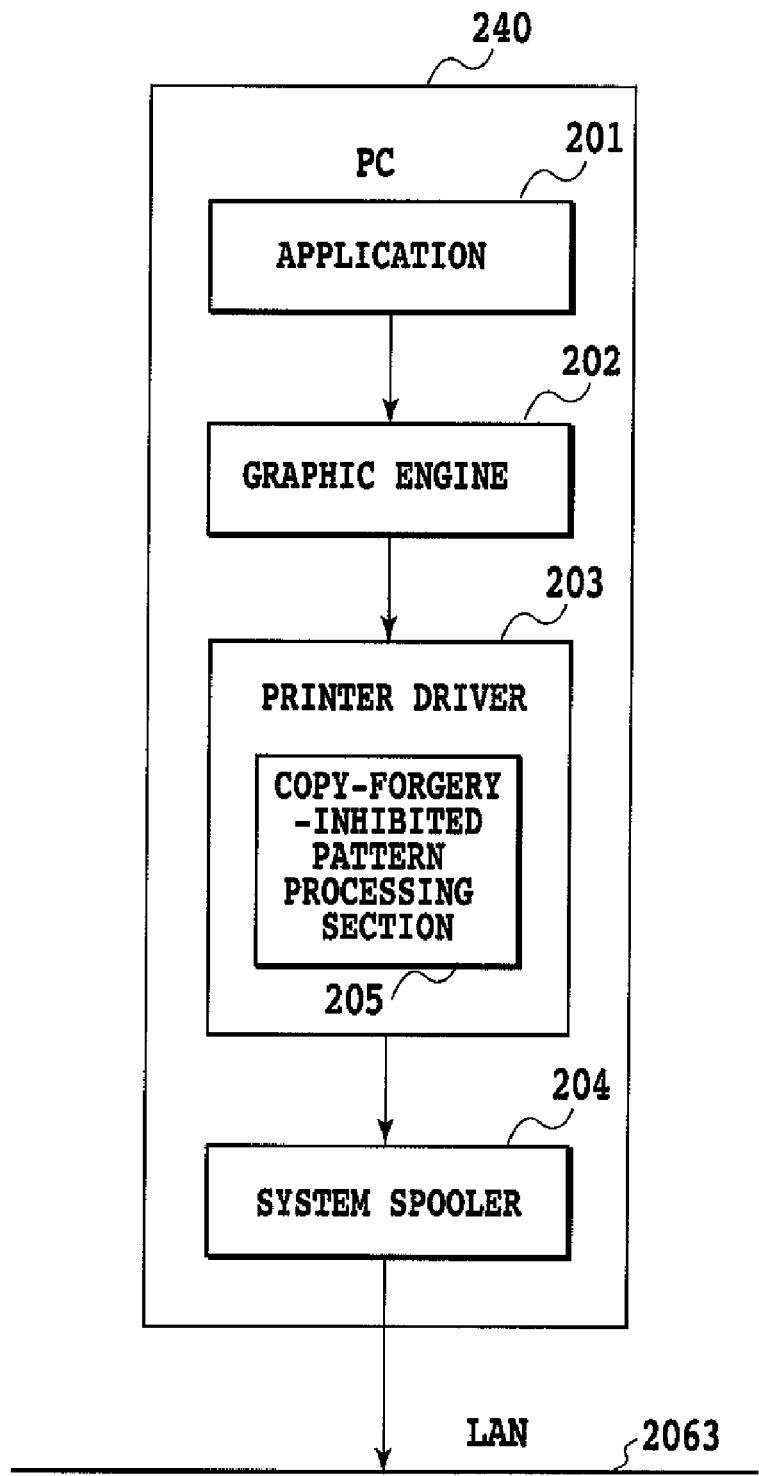
FIG. 26 is a diagram showing a software configuration for printing processing in the PC shown in FIG. 25.

FIG. 26 is a diagram showing a software configuration for the printing processing in the PC 240 shown in FIG. 25. An application 201, the graphics engine 202, a printer driver 203, and the system spooler 204 exist as files saved in the external memory 11. Further, they are program modules, each of which is loaded in the RAM 2 by the OS or a module using the e and is executed.

Moreover, the system is configured such that the application 201 and the printer driver 203 can be added to a FD of the external memory 11, an unillustrated CD-ROM, or a HDD of the external memory 11 via the LAN 2063. The application 201 saved in the external memory 11 is loaded in the RAM 2 and is executed. When this application 201 makes the image formation apparatus 200 (FIG. 3) perform printing, the image formation apparatus 200 performs output (drawing) using the graphic engine 202 that has been loaded to the RAM 2 similarly and made ready for execution.

A graphics engine 202 loads the printer driver 203 prepared for each printer to the RAM 2 from the external memory 11, and sets an output of the application 201 in the printer driver 203. Moreover, the graphics engine 202 converts a GDI (Graphic Device Interface) function received from the application 201 into a DDI (Device Driver Interface) function and outputs it to the printer driver 203. The printer driver 203 converts the DDI function received from the graphic engine 202 into a control command recognizable to the printer, for example, a PDL, (Page Description Language). The converted printer control command is outputted as print data to the image formation apparatus 200 through a system spooler 204 which is loaded into the RAM 2 by the OS.

In the software configuration of this embodiment, the printer driver 203 has a copy-forgery-inhibited pattern processing unit 205 in it. The copy-forgery-inhibited pattern processing unit 205 may be a built-in module of the printer driver 203, or may be that in the library module format that will be added by individual installation. The printer driver 203 processes drawing (addition of a copy-forgery-inhibited pattern) of a copy-forgery-inhibited pattern image that will be described later by execution of the copy-forgery-inhibited pattern processing unit 205 related to printing of a copy-forgery-inhibited pattern image.

Hereafter, with reference to FIGS. 27 to 31, the processing of forming the image data with a copy-forgery-inhibited pattern image added in the PC 240 will be explained.

Figure 27:
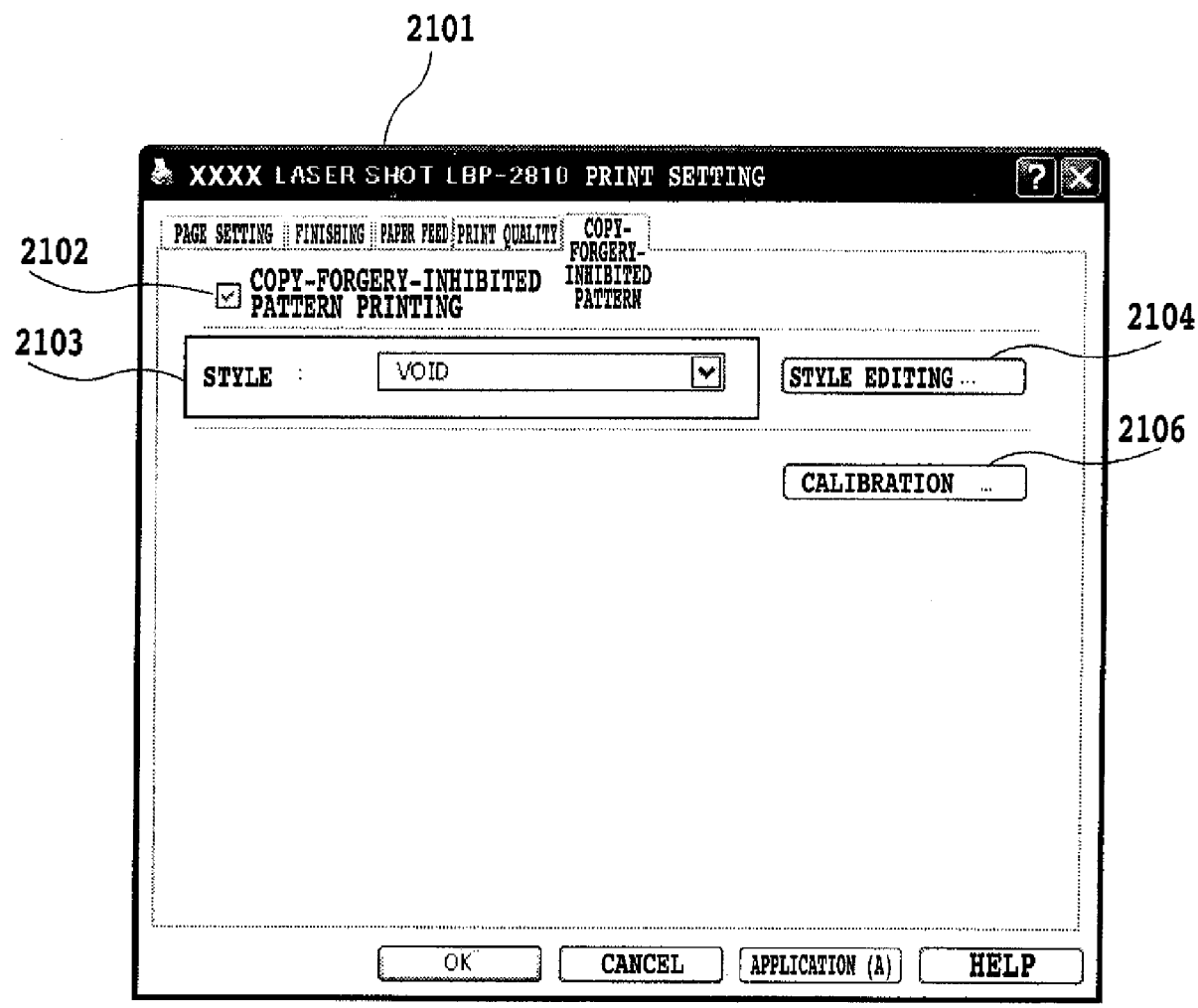
FIG. 27 is a diagram showing an example of an initial screen regarding copy-forgery-inhibited pattern printing by a printer driver of the PC.

FIG. 27 is a diagram showing one example of an initial screen of the user interface related to copy-forgery-inhibited pattern printing by the printer driver 203. In this example, it is made possible to perform settings related to copy-forgery-inhibited pattern printing in a property sheet 2101 in the dialog.

The numeral 2102 shows check box for specifying that copy-forgery-inhibited pattern printing (printing an image that includes copy-forgery-inhibited pattern image, hereinafter referred to similarly) is to be performed or not. Contents specified in this check box 2102 are stored as printing information added that holds printing setting information about print data (manuscript data). The numeral 2103 indicates style information for enabling a singe identifier (style) to specify plural pieces of setting information of the copy-forgery-inhibited pattern printing. The printer driver 203 is made possible to select a plurality of styles, and a relation between each style and predetermined information about the copy-forgery-inhibited pattern printing is registered in a registry. Pressing a button 2104 sets the screen displaying a dialog 2201 for style editing shown in FIG. 28A.

Figure 28A:
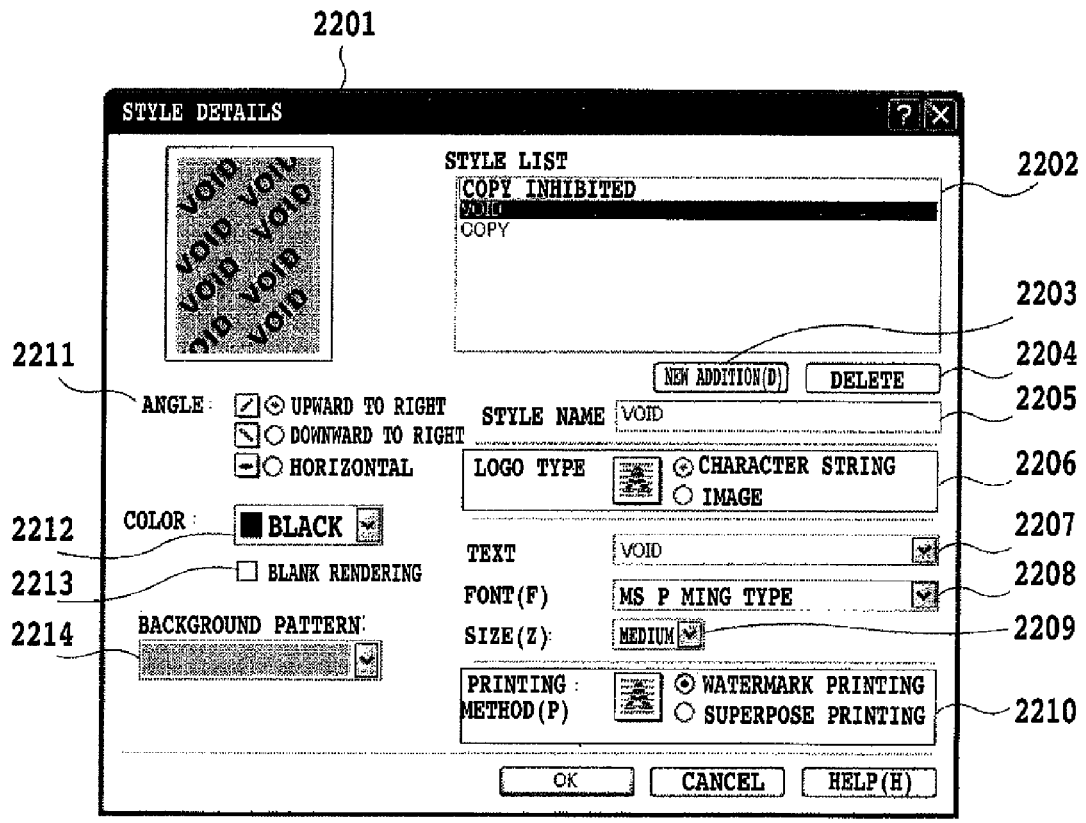
FIG. 28A is a diagram showing an example of a dialog for editing individual detailed setting of copy-forgery-inhibited pattern printing.
Figure 28B:
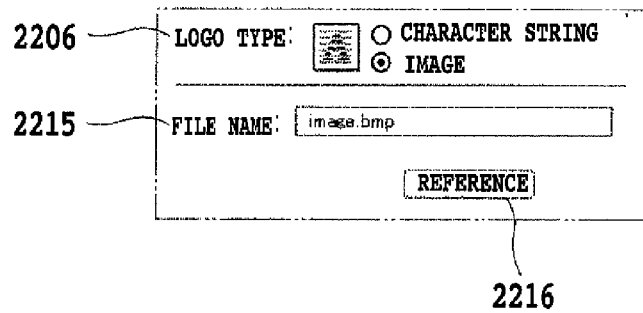
FIG. 28B is a diagram showing a button for displaying an image file name and a file selection dialog.

FIG. 28A is a diagram showing one example of the dialog for editing an individual detailed setting of copy-forgery-inhibited pattern printing.

Figure 1:
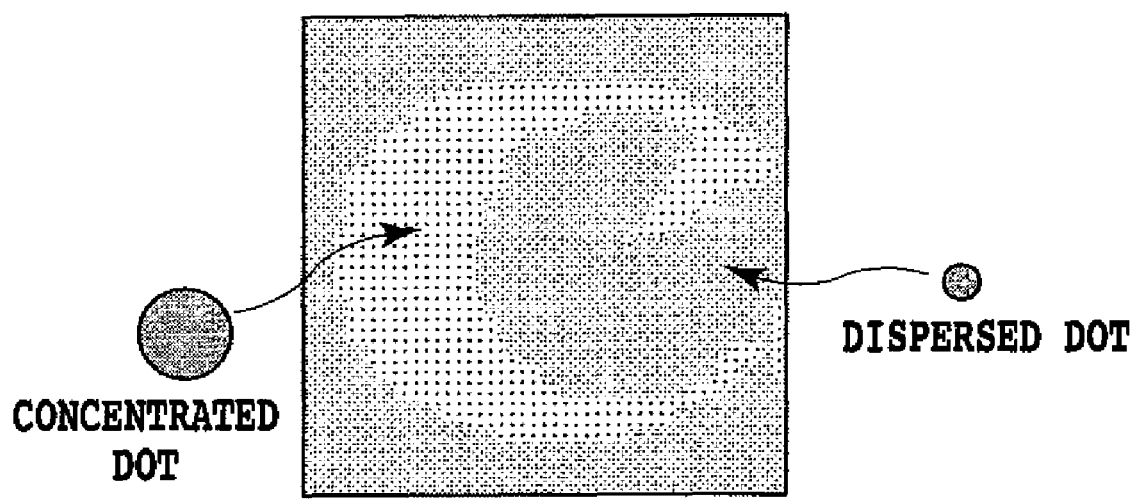
FIG. 1 is a diagram showing a state of dots in areas of a latent-mark part and the background part in a copy-forgery-inhibited pattern image.
Figure 2A:
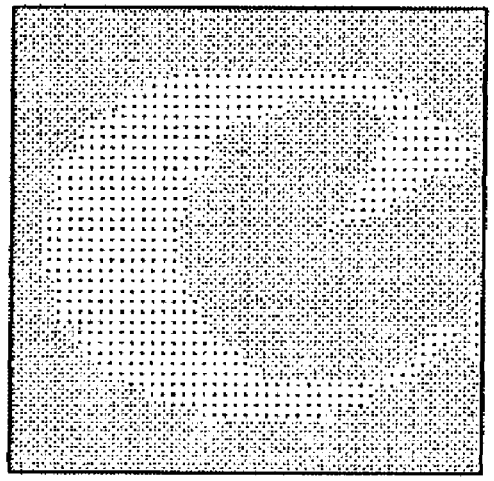
Figure 2A:
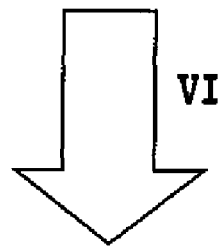
Figure 2B:
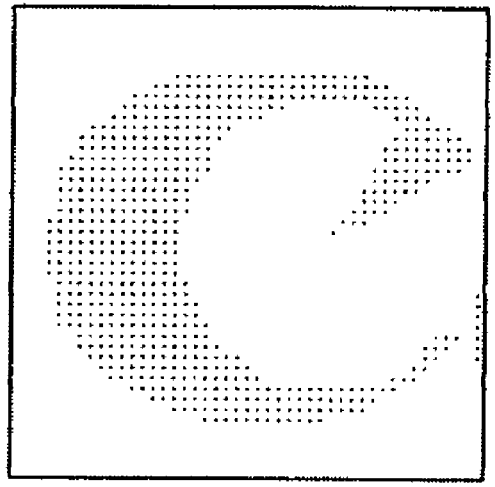

In the figure, the numeral 2201 indicates the whole dialog for editing copy-forgery-inhibited pattern information. A result of a copy-forgery-inhibited pattern image created by the individual copy-forgery-inhibited pattern information that will be described in the area is displayed for preview. The numeral 2202 indicates an area in which a list of styles that are selectable in the checkbox 2103 shown in FIG. 2. The dialog allows new addition and deletion of a style by using buttons 2203, 2204. The numeral 2205 indicates an area in which a name of a style currently specified is displayed.

The numeral 2206 indicates a radio button for selecting a kind of a drawing object used for copy-forgery-inhibited pattern printing. Selection of "Character String" in the box 2206 by the user enables the use of a text object. Moreover, selection of "Image" by the user enables the use of the image data. In FIG. 28A, since "Character String" is selected, the dialog 2201 displays setting information about a text object specified by the numerals 2207 to 2209 etc. and now the setting information has been allowed to be edited. On the other hand, when "Image" is selected in the area 2206, pieces of information 2207 to 2209 are not displayed. Instead, an image file name display 2215 shown in FIG. 28B and a button 2216 for displaying an unillustrated file selection dialog are displayed.

In this embodiment, the system is so configured that kinds of drawing objects used for copy-forgery-inhibited pattern printing that the PC 240 performs consists of "Character string" and "Image," and either of the two is selected. However, the kind of a drawing object is not restricted to this. The system may be configured so as to use two or more kinds of drawing objects simultaneously.

The numeral 2207 indicates an area in which a character string used as a copy-forgery-inhibited pattern image is displayed and edited. The numeral 2208 indicates an area in which font information of the character string is displayed and edited. In this embodiment, a screen serves as a selection screen only for font names. However, the screen function may be extended so that family information of a typeface (Bold, Italic, etc.), historiated initial information, etc. can be selected. The numeral 2209 indicates an area in which a font size of a character string used as a pattern of the copy-forgery-inhibited pattern is displayed and set up. Although in this embodiment, a form specifiable in three steps, "Large," "Medium," and "Small" is assumed, a generally used method for specifying a font size, such as direct input of a point number, may be adopted.

The numeral 2210 indicates a radio button for setting up a printing order of the pattern of the copy-forgery-inhibited pattern and the manuscript data. If "Watermark Printing" is specified by this radio button, the manuscript data is drawn after the pattern of the copy-forgery-inhibited pattern is drawn. On the other hand, if "Superpose Printing" is specified, the manuscript data is drawn, and subsequently the pattern of the copy-forgery-inhibited pattern is drawn. A procedure of drawing will be described later. The numeral 2211 indicates a radio button for specifying an arrangement angle of the pattern of the copy-forgery-inhibited pattern. In this embodiment, three selections, "Upward To Right," "Downward To Right," and "Horizontally," are made selectable. However, an angle specification method may be extended by disposing a numeral value input area where an angle can be arbitrarily specified or a slider bar whereby an angle can be specified intuitively. The numeral 2212 indicates an area in which a color used for the pattern of the copy-forgery-inhibited pattern (foreground pattern, background pattern) is indicated and specified. The numeral 2213 indicates a checkbox for changing places between the foreground pattern and the background pattern. If the checkbox 2213 is not checked, a copy-forgery-inhibited pattern image such that the foreground pattern becomes visualized on the duplication is created. That is, the checked checkbox indicates that the printer is configured such that the foreground pattern is reproducible on the duplication. On the other hand, when the checkbox 2213 is not checked, a copy-forgery-inhibited pattern image such that the background pattern becomes visualized on the duplication is created. That is, the checked checkbox indicates that the copier is configured such that the background pattern is reproducible on the duplication. At this time, text information and image information that are specified as the foreground pattern is in a blank state, and becomes recognizable on the duplication. The numeral 2214 indicates an area for specifying a camouflage image that makes difficult for human eye to recognize addition of a copy-forgery-inhibited pattern image in a printed-out matter to which the copy-forgery-inhibited pattern is added. The camouflage image can be selected from a plurality of patterns. An option of using no camouflage image is also provided.

Figure 29:
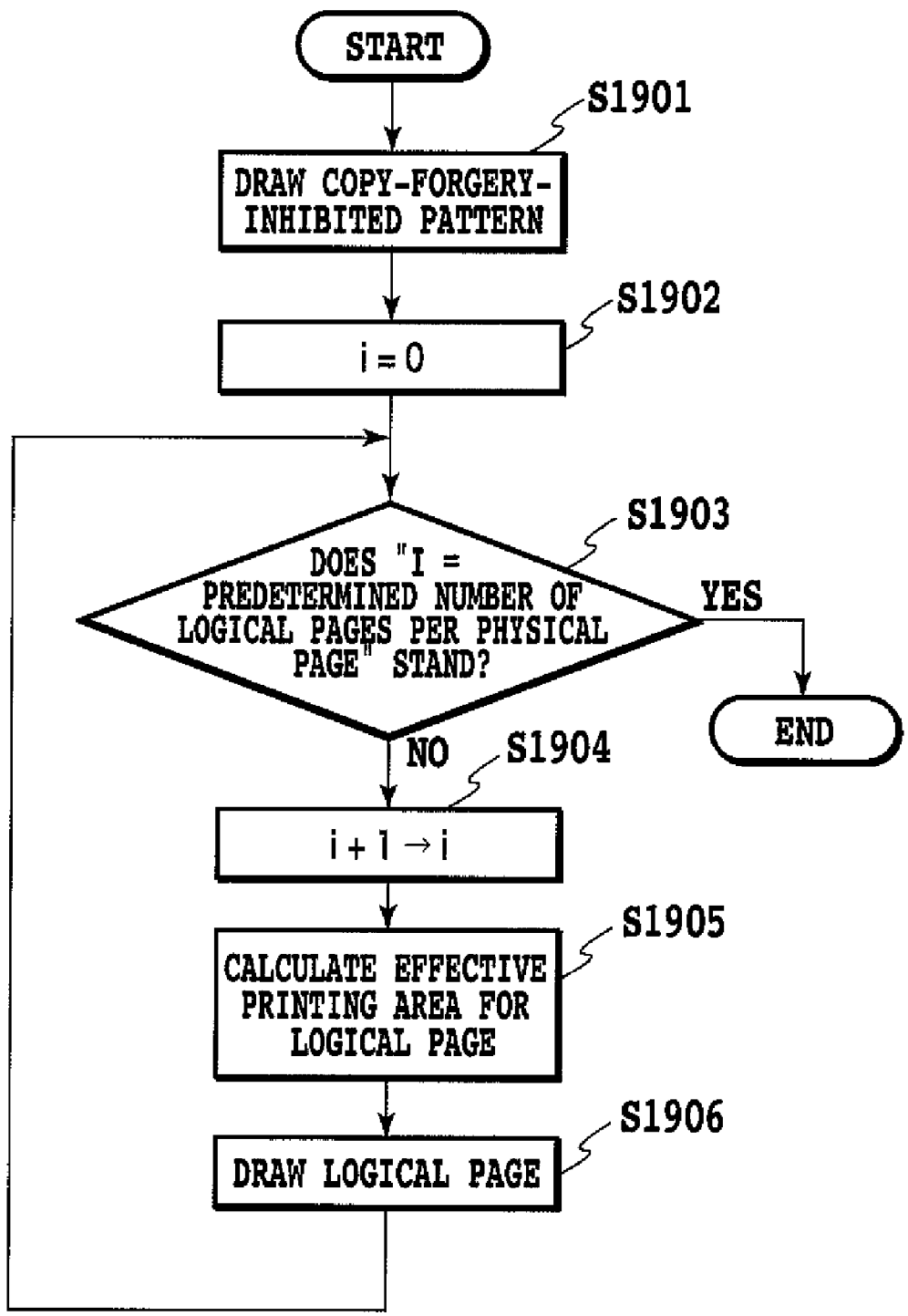
FIG. 29 is a flowchart showing a flow of drawing processing of watermark printing in copy-forgery-inhibited pattern printing.
Figure 30:
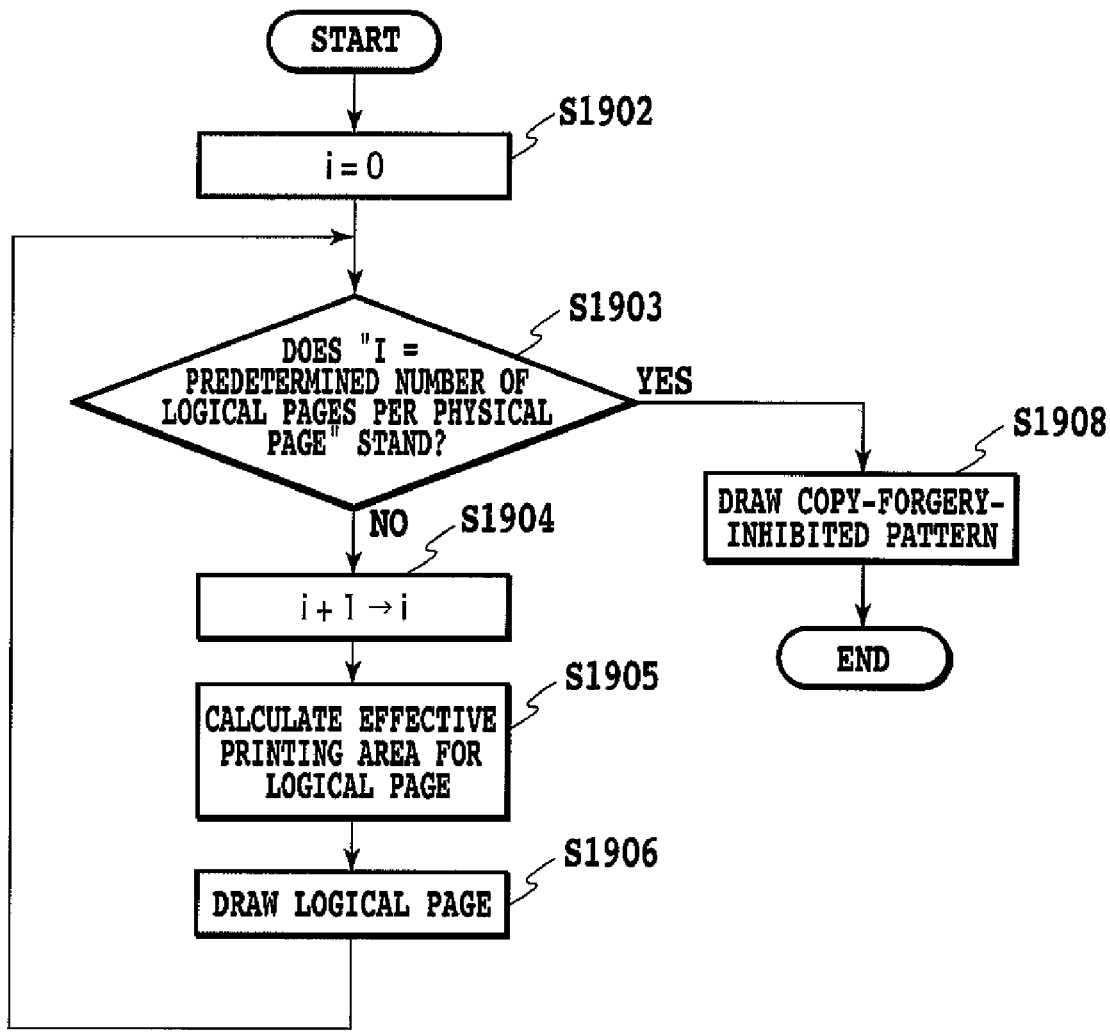
FIG. 30 is a flowchart showing a flow of drawing processing of superpose printing in copy-forgery-inhibited pattern printing.

FIGS. 29 and 30 are flowcharts showing flows of drawing processing in copy-forgery-inhibited pattern printing. These flowcharts show flows of the drawing processing that correspond to "Watermark Printing" and "Superpose Printing," respectively, explained in FIG. 28A. These processing are performed in printing processing that uses a general printer driver. Moreover, the CPU 1 for controlling and executing printing processing performs the following processing. In FIGS. 29 and 30, the steps in which the same processing is performed are given the same numeral.

First, the case of "Watermark Printing," namely the case where the pattern of the copy-forgery-inhibited pattern is drawn before drawing the manuscript data will be explained using the flowchart of FIG. 29.

In Step S1901, the CPU 1 draws a pattern of a copy-forgery-inhibited pattern according to individually set-up detailed information of the copy-forgery-inhibited pattern. Its detailed processing will be described later in FIG. 31. Next, the flow moves to drawing processing of the manuscript data.

First, in Step S1902, the CPU 1 initializes the counter for counting the number of logical pages per physical page (one side of printing paper).

Next, in Step S1903, the CPU 1 determines whether the counter has come to indicate the number of logical pages per one physical page, which are set up in advance. If the determination result is determined equal to the number of logical pages, the flow proceeds to Step S1908. If otherwise, namely the determination result is determined not equal to the number of logical pages, the flow proceeds to Step S1904.

Next, the CPU 1 increments the counter value by unity in Step S1904. Following this, in Step S1905, the CPU 1 calculates an effective printing area for logical pagers to be drawn from now based on the number of logical pages per physical page and the counter value. Next, in Step S1906, the CPU 1 reads current logical page number using the counter value as an index from printing setting information (not illustrated) about physical pages. Then, the CPU 1 renders reduction drawing of the pertinent logical page so that it may be settled in the effective printing area. Naturally, in the case where allocation printing of plural logical pages is not specified, there is no necessity for reduction.

What is described in the foregoing is a procedure of the drawing processing about "Watermark Printing."

Next, "Superpose Printing," namely the case where the pattern of the copy-forgery-inhibited patterns drawn after the manuscript data is drawn will be explained using a flowchart of FIG. 30.

In Step S1902, the CPU 1 initializes the counter for counting the number of logical pages per one physical page (one side of printing paper). Next, in Step S1903, the CPU 1 determines whether the counter has come to indicate the number of logical pages per one physical page, which are setup in advance. If the determination result is equal to the number of logical pages, the flow proceeds to Step S1908. If the determination result is not equal to the number of logical pages, the flow proceeds to Step S1904.

Next, in Step S1904, the CPU 1 increments the counter value by unity. Subsequently, in Step S1905, the CPU 1 calculates an effective printing area for logical pages to be drawn from now based on the number of logical pages per physical page and the counter value. Next, in Step S1906, the CPU 1 reads current logical page number using the counter value as an index from printing setting information about physical page (not illustrated). Then, the CPU 1 performs reduction drawing such that the pertinent logical pages fit in the effective printing area. Naturally, in the case where allocation printing of a plurality of logical pages is not specified, reduction is unnecessary.

When a predetermined number of logical pages as one physical page has been spread, the processing proceeds to Step S1908. In Step S1908, the CPU 1 draws the pattern of the copy-forgery-inhibited pattern according to detailed information of an individually set-up copy-forgery-inhibited pattern for the effective printing area of the physical page acquired from the application.

Figure 31:
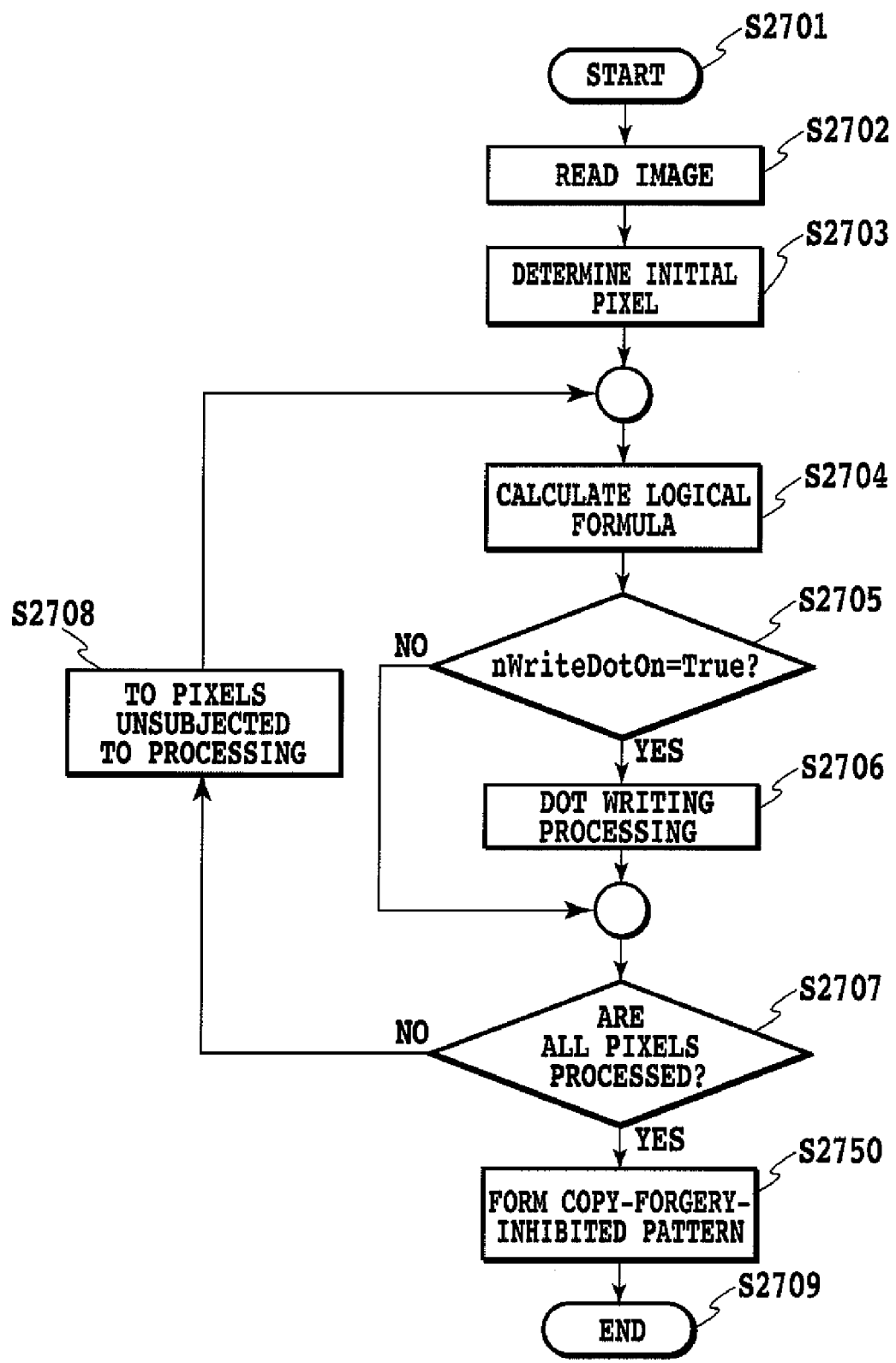
FIG. 31 is a flowchart showing details of the copy-forgery-inhibited pattern drawing processing in Step S1901 shown in FIG. 29 and of the copy-forgery-inhibited pattern drawing processing in Step S1908 shown in FIG. 30.

FIG. 31 is a flowchart showing details of drawing processing of the pattern of the copy-forgery-inhibited pattern in Step S1901 shown in FIG. 29 and of drawing processing of the pattern of the copy-forgery-inhibited pattern in Step S1908 shown in FIG. 30. In the below, the copy-forgery-inhibited pattern drawing processing will be explained with reference to FIG. 31.

First, the copy-forgery-inhibited pattern drawing processing is started in Step S2701 via a user interface etc. Next, in Step S2702, an input background image, a background threshold pattern, a foreground threshold pattern, foreground background area specific images, and a camouflage area specific image are read. In Step S2703, initial pixels at the time of creating a copy-forgery-inhibited pattern image are determined. For example, when image proceeding is performed on the whole of the input image in the order of raster scanning, from the upper left to the lower right, to covert the input image into a copy-forgery-inhibited pattern image, the upper left is specified as an initial position.

Next, in Step S2704, the copy-forgery-inhibited pattern processing unit 205 performs processing of arranging a background threshold pattern, a foreground threshold pattern, a fundamental image, a camouflage image on tiles starting from the upper left of the copy-forgery-inhibited pattern image area by calculation based on Formula (1) below. By this calculation, whether a pixel value corresponding to a dot at the time of printing in the said pixel position needs to be written is determined. At this time, the pixel value corresponds to inputted color information. Incidentally, the background threshold pattern and the foreground threshold pattern each are the image data consisting of "1" and "0" that correspond to writing/non-writing of a dot. These images are data binarized by a dither matrix suitable to create the foreground (latent-mark) image and the background image, respectively.

$$n\text{WriteDotOn} = n\text{Camouflage} \times (n\text{SmallDotOn} \times \overline{n\text{HiddenMark}} + n\text{LargeDotOn} \times n\text{HiddenMark}) \quad \text{Formula (1)}$$

Components of Formula (1) are shown below.

nCamouflage: In a camouflage image, if an object pixel is a pixel that constitutes a camouflage pattern, it is given 0; if otherwise, then 1.

nSmallDotOn: If the pixel value of the background threshold pattern is black, it is given 1; if otherwise (white), then 0 (color is not restricted to this).

nLargeDoton: If the pixel value of the foreground threshold pattern is black, it is given 1; if otherwise (white), then 0 (color is not restricted to this).

nHiddenMark: In a fundamental image, if an object pixel is a pixel that constitutes a latent mark, then it is given 1; if otherwise (a pixel constituting the background image), then 1.

$\overline{n\text{HiddenMark}}$: Negation of nHiddenMark. It takes 0 in the foreground part, and takes 1 in the background.

Incidentally, it is not necessary to perform calculation using all the elements of Formula (1). Improvement in the speed of processing can be attained by omitting unnecessary calculation.

For example, if nHiddenMark=1 stands, then $\overline{n\text{HiddenMark}}$=0; if nHiddenMark=0 stands, then $\overline{n\text{HiddenMark}}$=1. Therefore, it is allowed that if nHiddenMark=1 stands, then a value of Formula (2) below is set to a value of nLargeDoton, whereas if nHiddenMark=0 stands, then the value of Formula (2) is set to the value of nSmallDotOn.

Since the value of nCamouflage is a multiplier to be multiplied to the whole as shown in Formula (1), if nCamouflage=0 stands, then nWriteDotOn=0. Therefore, if nCamouflage=0 stands, calculation of Formula (2) below can be omitted.

$$(n\text{SmallDotOn} \times \overline{n\text{HiddenMark}} + n\text{LargeDotOn} \times n\text{HiddenMark}) \quad \text{Formula (2)}$$

In the generated copy-forgery-inhibited pattern image, an image having dimensions of the least common multiples of vertical and horizontal lengths of the background threshold pattern, the foreground threshold pattern, the fundamental image, and the camouflage image becomes a minimum unit of repetition. Consequently, if the copy-forgery-inhibited pattern processing unit 205 creates only a part of the copy-forgery-inhibited pattern that is the minimum unit of repetition and arranges that part of the copy-forgery-inhibited pattern image in a tile mosaic up to the dimensions of the copy-forgery-inhibited pattern image area, processing time required to create the copy-forgery-inhibited pattern image can be shortened.

Next, in Step S2705, the CPU 1 determines a calculation result (value of nWriteDoton) of Step S2704. That is, if nWriteDotOn=1 stands, then the flow proceeds to Step S2706; if nWriteDoton=0 stands, the flow proceeds to Step S2707.

In Step S2706, processing of writing a pixel value corresponding to a dot at the tine of printing is performed. Note here that the value of a pixel value is changeable according to a color of the copy-forgery-inhibited pattern image. If a black copy-forgery-inhibited pattern is intended to be created, processing object pixels of the input background image are set to black color. Alternatively, that pixel is set as cyan, magenta, and yellow considering colors of toners or inks of the printer, whereby a color copy-forgery-inhibited pattern image can also be created. Moreover, in the case where a background image is the image data of 1 to several bits per pixel, the pixel value can be expressed using an index color. The index color is a method for expressing the image data whereby information of colors appearing frequently in an object color image are set in a table of contents (for example, index 0 representing white, and index 1 representing cyan). Then, the value of each pixel is expressed by a number in the table of contents in which color information is described (for example, expression is done as follows: the first pixel value is a value of index 1, the second pixel value is a value of index 2, and so on).

In this Step S2706, along with processing of writing the above-mentioned pixel value corresponding to a dot (pixel), processing of setting the image area flag corresponding to a dot is also performed. For example, in the case where the dot considered is a dot in a latent mark of a copy-forgery-inhibited pattern image, the image area flag is set as Character; in the case where the dot is a dot in the background part, it is set as Photograph. This image area flag is used in the processing of disappearing the background part of the copy-forgery-inhibited pattern image data according to the embodiment of the present invention, as will be described later in FIG. 33 etc.

In Step S2707, it is determined whether all the pixels of the processing object area of an input background image are processed. If all the pixels of the processing object area of the input background image are not processed, the flow proceeds to Step S2708, where an unprocessed pixels are selected and the processing of Steps S2704 to S2706 are performed again.

In Step S2750, the pattern of the copy-forgery-inhibited pattern based on the copy-forgery-inhibited pattern image made by processing of Steps S2704 to S2708 is generated.

Figure 32:
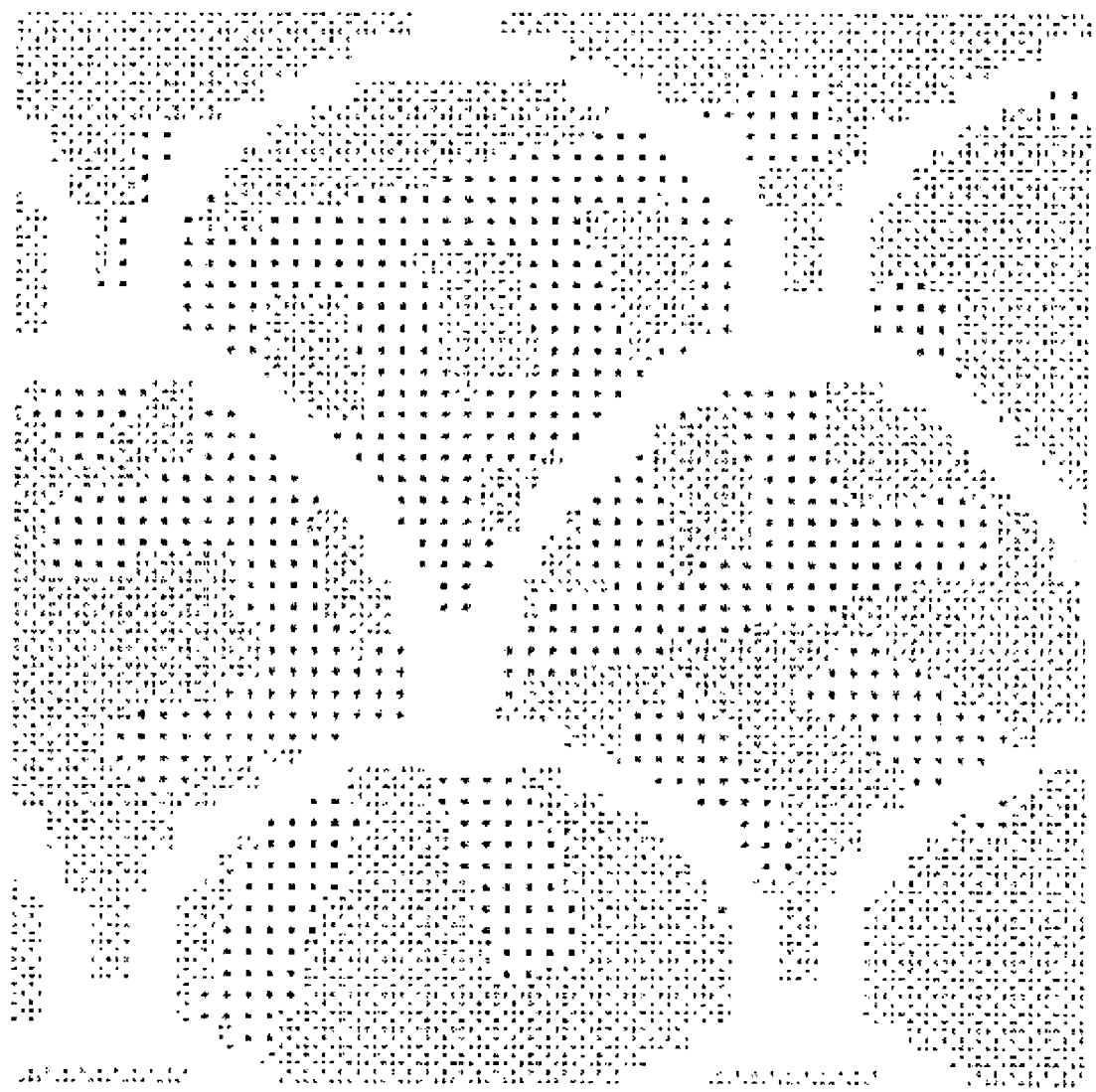
FIG. 32 is a diagram showing a creation example of a copy-forgery-inhibited pattern image that is subjected to up to boundary processing.

As described above, the copy-forgery-inhibited pattern image can be generated by the input background image being subjected to the above-mentioned processing. Note that only with this processing, there may be the case where aggregation of dots are generated in a portion where the foreground and the background of the foreground and background area specific image make change-over, which makes an outline of the foreground obvious, causing a demerit of reduced effect of a counterfeit preventing copy-forgery-inhibited pattern. In order to eliminate this demerit, boundary processing whereby aggregation of dots in a portion of changing over of the foreground and the background of the foreground and background area specific image may be performed additionally. FIG. 32 is a view showing a generation example of the copy-forgery-inhibited pattern to which the boundary processing has been applied.

Several embodiments of the processing performed in the image processing configuration according to one embodiment of the present invention described in the foregoing will be explained below. This processing is processing that an image data with a copy-forgery-inhibited pattern added, which is generated in a PC or the like, and is temporarily stored in a hard disk of the image formation apparatus 200, an multi-function combined machine of the embodiment, is maintained so that the function of copy-forgery-inhibited pattern can not be impaired when the image data is subjected to processing other than printing, such as transmission. In the below, this image data temporarily stored in the hard disk is also called a "box document." Moreover, embodiments in which the image data with a copy-forgery-inhibited pattern added and the normal image data stored in the hard disk are protected from duplication, falsification, etc. will also be explained below.

First Embodiment

In a first embodiment of this invention, when a box document with a copy-forgery-inhibited pattern image added is used other than printing, image processing that makes a copy-forgery-inhibited pattern image (in this embodiment, a latent-mark) emerge in advance by image processing is applied to at least the copy-forgery-inhibited pattern image. More specifically, at the time of transmission processing such that the image data is transmitted to external equipment via a network, there is a case where resolution conversion etc. is performed on the image data of the document, such as a SEND function of the image processing apparatus. In this case, even if it causes a certain amount of collapse of the image, an image on which the latent-mark is visualized by such a degree as can be observed at a transmission destination can be realized. In addition, it becomes also possible for the apparatus at a transmission destination to perform printing in a state of the latent-mark is emerged. As a result, although an original function of making the latent-mark appear in copying no longer exists, the emerged latent-mark is included in the image data being handled, and accordingly illegal handling of the image, such as duplication, can be restrained. In this embodiment, a disappearance, a density reduction, or alteration of color of the background part of the copy-forgery-inhibited pattern image in the image data is performed by image processing in the image formation apparatus 200, so that the density of the latent-mark part is made comparatively thicker than the density of the background part so as to make the latent-mark part emerge.

Specifically, in the transmission job explained in FIG. 24, processing that disappears the background part and makes the copy-forgery-inhibited pattern character part emerge is performed in transmit image conversion processing in Step S4903 of the figure. Moreover, in the FAX transmission job explained in FIG. 19, the above-mentioned processing is performed in Step S4404. In image processing on a transmission image in a transmission job and a FAX transmission job, various processing is performed according to a transmission destination. As is described above, the image manager executes this by operating a plurality of image processing units in the image conversion unit 2030 being connected with one another.

Processing to make the latent mark emerge is performed using the thinning filter 2024 described above in FIG. 4 and/or the color space conversion 2021. To be concrete, the system is so configured that an image of the background part a copy-forgery-inhibited pattern having high spatial frequencies is disappeared by using the thinning filter 2024 set to be a low pass filter. In addition, an input that is thinner in density (higher brightness) is outputted with a thinner density (higher brightness) by the color space conversion 2021. With this processing, a pattern of the background part of the copy-forgery-inhibited pattern with a thin density (high brightness) can be disappeared more completely.

Figure 33:
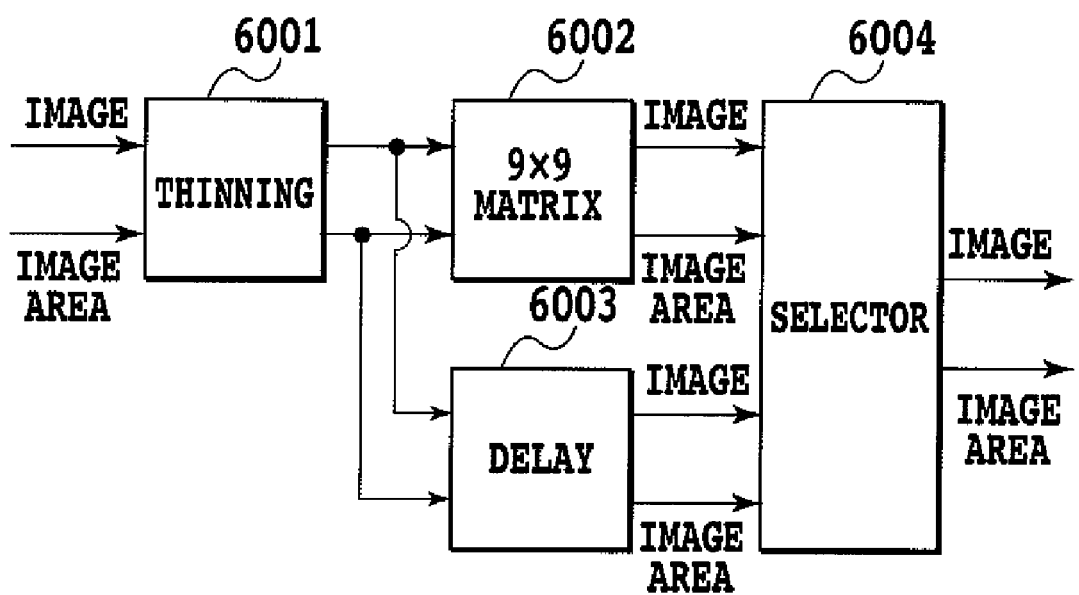
FIG. 33 is a block diagram showing a detailed configuration of a thinning filter according to the first embodiment of this invention.

FIG. 33 is a block diagram showing a detailed configuration of the thinning filter 2024.

From the RAM 2002 (FIG. 4) in which the image data from the hard disk is spread, the image data with a copy-forgery-inhibited pattern image added and an area flag signal are inputted to the thinning filter 2024. The thinning circuit 6001 is configured to be able to thin the input image and the image area flag by a factor of ½, ¼, or ⅛ and output it, according to setting. In this embodiment, the system is further configured to be able to establish setting of outputting inputted image, as it is, without performing this thinning processing.

Figure 34:
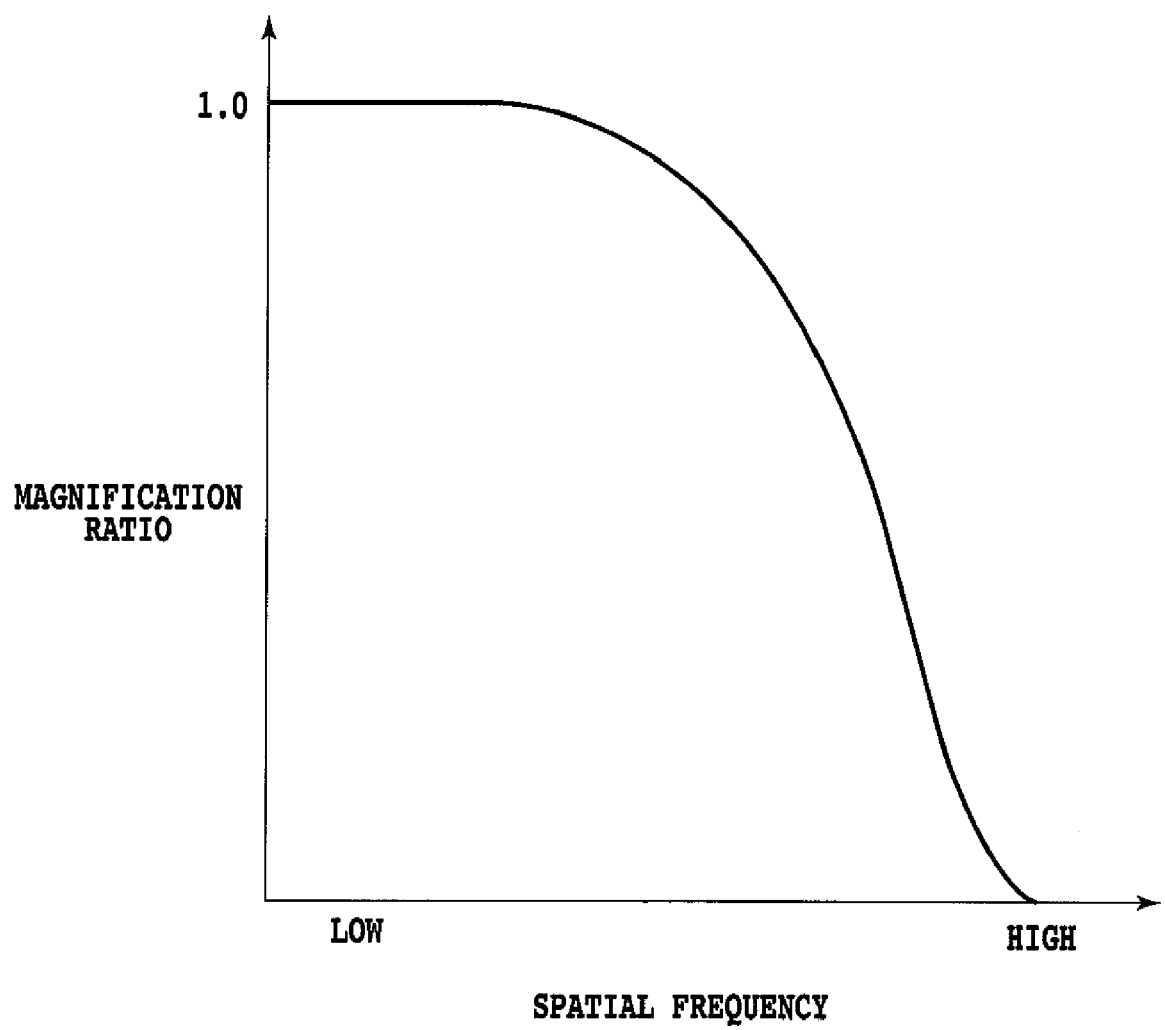
FIG. 34 is a diagram showing a characteristic of a filter being set up at the time of processing of making the latent mark emerge, in the thinning filter.

The filter 6002 is made up of a matrix of 9×9. FIG. 34 is a diagram showing a characteristic of a filter 6002 that is set up at the time of processing of making the latent-mark emerge. As shown in FIG. 34, by setting up the filter 6200 as a low pass filter, processing will be so performed that an image of the copy-forgery-inhibited pattern background part having a high-frequency characteristic is disappeared. A delay 6003 has a delay equivalent to the delay produced in the processing of the filter 6002. A selector 6004 selects and outputs either an output of the filter 6002 or an output of the delay 6003 according to an image area signal. To be concrete, if the image area signal is "Character," it selects an output of the delay 6003; if the image area signal is "Photograph," it selects an output of the filter 6002. By this selection, for the copy-forgery-inhibited pattern character part (latent-mark part) whose image area flag is set as "Character," an image signal that does not pass through the filter is selected; for the copy-forgery-inhibited pattern background part whose image area flag is set as "Photograph," an image signal that is subjected to the processing of the filter is selected. By this processing, it is possible to perform low pass processing by a filter 6200 only on the background part of the copy-forgery-inhibited pattern, so that the copy-forgery-inhibited pattern background part can be disappeared while image degradation by the low pass processing is controlled to a minimum.

Incidentally, it is needless to say that if addition of the copy-forgery-inhibited pattern is done by the method of either watermark printing (FIG. 29) or superpose printing (FIG. 30), selection according to the above-mentioned image area flag is performed similarly.

Figure 35:
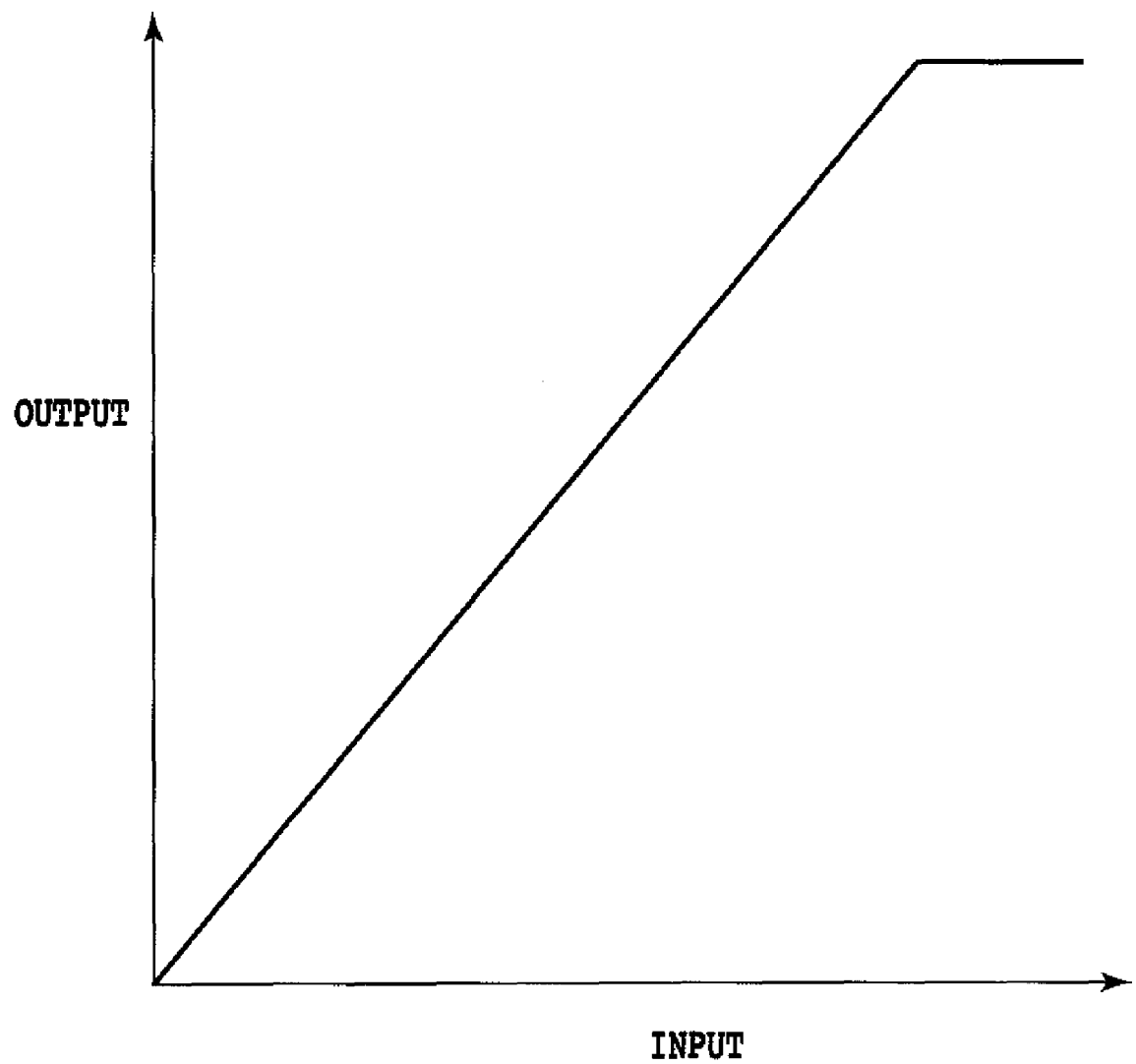
FIG. 35 is a diagram showing a characteristic of an LUT for color space conversion at the time of the processing of making the latent mark emerge according to the first embodiment of this invention.

FIG. 35 is a diagram showing a characteristic of an LUT of the color space conversion 2021 at the time of processing of making the latent-mark emerge. By setting up the LUT having a characteristic shown in FIG. 35, an image in a high brightness area (thin in density) is made to have higher brightness (thinner in density), whereby an image currently printed in a thin density like the copy-forgery-inhibited pattern background part is made thinner. By this processing, the background part of the copy-forgery-inhibited pattern is tried to be disappeared more completely. As a result, the image data with an in-advance emerged latent-mark part can be obtained.

Then, the image data such that the latent-mark has emerged is written back in RAM 2002 again. Processing for transmission is performed on this image data and transmitted. By this, even if the image data is impaired to some extent by processing of resolution conversion or the like for transmission, a state where the latent-mark has emerged can be maintained. As a result, it becomes possible to restrain illegal handling of a person using this image, such as data duplication, at a transmission destination. Moreover, when printing is performed at a transmission destination, the printed matter can be made with the latent-mark emerged. Although the printed matter described above has no function of the original copy-forgery-inhibited pattern that the latent-mark is visualized when a printed matter is copied, meaning or the like indicated by the latent-mark of the printed matter discourages its holder to use it, making it possible to restrain illegal use of the printed matter.

Modification of First Embodiment

In the above-mentioned first embodiment, there is explained an example where low-pass filtering processing is performed only on the background part of a copy-forgery-inhibited pattern such that a character/photo determination flag of its image area flag is set as "Photograph" regarding the image data with a copy-forgery-inhibited pattern added and color conversion processing of further thinning a low density part of the image is performed. It is needless to say that this invention is not restricted to this form.

In this modification, as the image area flag, a flag for indicating a position concerned as the latent-mark part of or the background part the copy-forgery-inhibited pattern is provided, in addition to the character/photo determination flag, and is used to perform processing only on the copy-forgery-inhibited pattern image, so that the added copy-forgery-inhibited pattern data is made to emerge.

Figure 36:
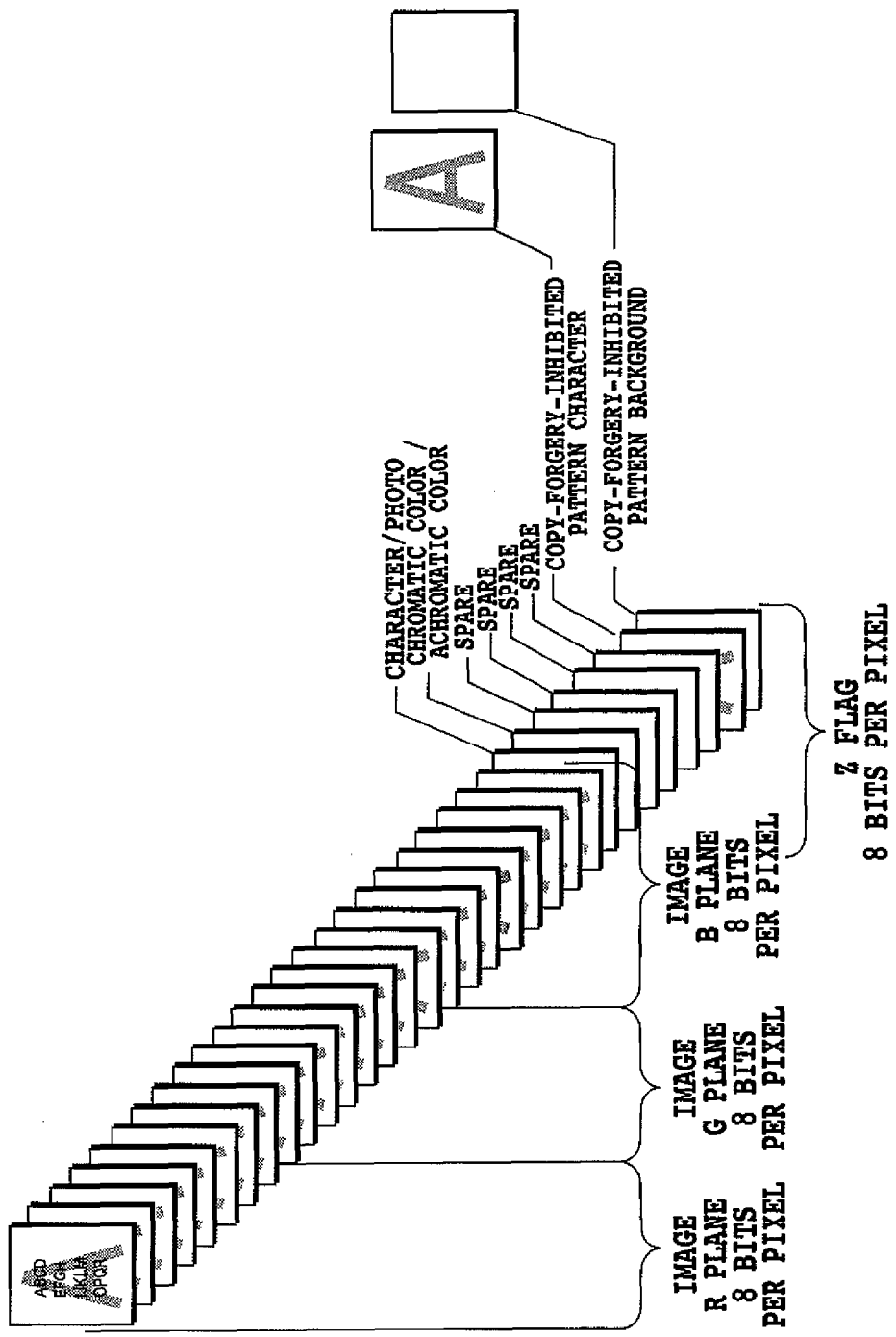
FIG. 36 is a diagram schematically showing a composition of the image data after expanding PDL data of an image with a copy-forgery-inhibited pattern already added in a modification of the first embodiment.
Figure 37:
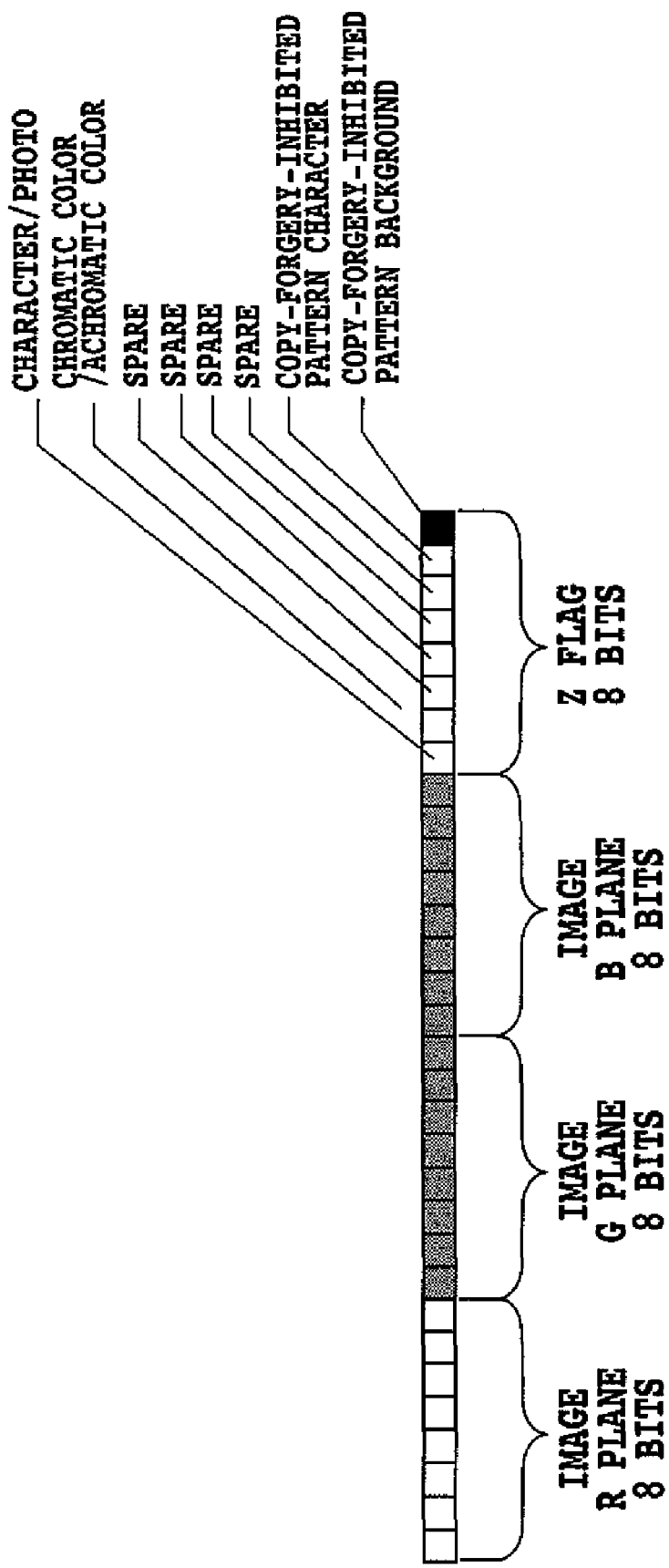
FIG. 37 is a diagram schematically showing a part of the image data shown in FIG. 36.

FIG. 36 and FIG. 37 are diagrams schematically showing a structure of the image data after PDL data of an image with a copy-forgery-inhibited pattern added is spread by the RIP 2018. This image data consists of 8-bit data for each color of RGB and the image area flag of 8 bits.

The 8-bit image area flag consists of
a character/photo determination flag,
a chromatic/achromatic determination flag,
spare,
spare,
spare,
spare,
a copy-forgery-inhibited pattern latent-mark part (copy-forgery-inhibited pattern character) determination flag,
a copy-forgery-inhibited pattern background part (copy-forgery-inhibited pattern/background) determination flag,
each using 1 bit.

The processing of making the copy-forgery-inhibited pattern emerge uses the thinning filter 2024 and the color space conversion 2021, which is the same as the above-mentioned first embodiment. What is different from the first embodiment in the processing of the thinning filter 2024 shown in FIG. 33 is firstly processing of a selector 6004 that corresponds to the setup of the above-mentioned flag.

More specifically, the selector 6004 selects an output of the delay 6003 if the determination flag of the copy-forgery-inhibited pattern background part is "0," and selects an output of the filter 6002 if being "1." By this selection, for a copy-forgery-inhibited pattern character part for which the copy-forgery-inhibited pattern background determination flag of the copy-forgery-inhibited pattern image is set to "0" and the copy-forgery-inhibited pattern character determination flag is set to "1," the image data that does not pass through the low pass filter 6002 is selected, regardless of contents of the character/photo determination flag. On the other hand, for the copy-forgery-inhibited pattern background part for which the copy-forgery-inhibited pattern background determination flag is set to "1" and the copy-forgery-inhibited pattern character determination flag is set to "0," the image data that is subjected to the processing of the filter 6002 is selected.

Accordingly, the system can be so configured that the low pass filter processing is performed only on the copy-forgery-inhibited pattern background part in an image being determined as a photograph. Therefore, the copy-forgery-inhibited pattern background part can be disappeared while image degradation due to the low pass processing is controlled to a minimum.

Figure 38:
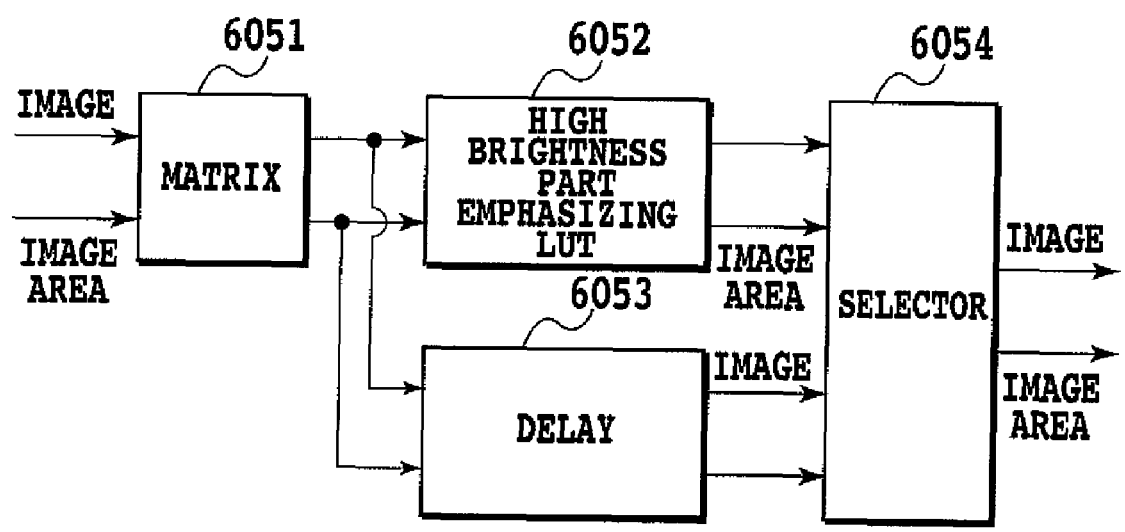
FIG. 38 is a block diagram showing a configuration of color space conversion according to a modification of the first embodiment.

FIG. 38 is a block diagram showing a configuration of the color space conversion 2021 according to this modification. In this modification, in color space conversion, Execution/Non-Execution of the color space conversion on the copy-forgery-inhibited pattern image is determined according to the contents of the image area flag, like the thinning filter.

In FIG. 38, the image data and the image area flag from the RAM 2002 enter into a matrix 6051. The matrix 6051 is a matrix circuit of 3×8. It is configured so as to be able to perform a matrix operation on the input image and the image area flag and output them according to setting. In the processing of making the latent-mark emerge according to this modification, the matrix outputs the inputted image as it is, without using this latent-mark emerging function. A one-dimensional LUT 6052 is given setting of emphasizing a high brightness part. This characteristic is similar to that shown in FIG. 35. By setting up the LUT to have a characteristic as shown in FIG. 35, an image signal of the high brightness area (corresponding to being thin in density) is made higher in brightness (thinner in density), whereby an effect that an image printed thin, as in the copy-forgery-inhibited pattern background part, is made thinner in density can be obtained. A delay 6053 has a delay equivalent to the delay produced in the LUT 6052.

A selector 6054 selects either an output of the LUT 6052 or an output of the delay 6053 according to contents of the image area flag. That is, if a copy-forgery-inhibited pattern background part determination flag is "0" and the copy-forgery-inhibited pattern character determination flag is "1," the output of the delay 6053 is selected. On the other hand, if the copy-forgery-inhibited pattern background part determination flag is "1" and the copy-forgery-inhibited pattern character determination flag is "0," the output of the LUT 6052 is selected. As a result, for a character part of the copy-forgery-inhibited pattern image, the image signal not subjected to the processing of the high brightness emphasizing LUT is selected; for the copy-forgery-inhibited pattern background part, a high brightness emphasized image signal is selected. By this selection, the system can be so configured that high brightness emphasizing processing is performed only on the copy-forgery-inhibited pattern background part and disappearing of the copy-forgery-inhibited pattern background part is performed while controlling image degradation due to the high brightness emphasizing processing to a minimum.

As described in the foregoing, according to this modification, the system can be configured so that image processing of disappearing the copy-forgery-inhibited pattern background part is not performed for the image data of a photograph part (non-character part) with no copy-forgery-inhibited pattern added.

Note that the above-mentioned example is one that the latent-mark is made to emerge when the image data with a copy-forgery-inhibited pattern image added (box document with a copy-forgery-inhibited pattern added) is transmitted to other equipment. However, it is needless to say that application of the present invention is not restricted to this example. For example, when a box document with a copy-forgery-inhibited pattern added is displayed on a display part or the like of the image formation apparatus 200, processing of making the latent-mark part emerging can also be performed like the above-mentioned example (image processing of rendering the brightness of the latent-mark part comparatively lower than the disappeared image that is the background). By this, even if certain collapse arises in the image due to predetermined processing for displaying, the display part can display the image data to such a degree as enables the user to observe the latent-mark. As a result, the user is enabled to observe the image data currently handled as that with a copy-forgery-inhibited pattern added, and accordingly it becomes possible to restrain illegal handling of the image data.

Second Embodiment

A second embodiment of the present invention relates to, like the first embodiment including the above-mentioned modification, processing of making the latent-mark part emerge when image data with a copy-forgery-inhibited pattern image added is tried to be used in job processing other than printing. In this embodiment, when performing various edit processing on the so-called box document stored in the hard disk, the latent-mark of the copy-forgery-inhibited pattern image is made to emerge. This restrains the illegal duplication and falsification of the box document.

FIGS. 39A to 39D are diagrams explaining an editing function of a box document in this embodiment. The editing function of a box document includes document duplication of duplicating a document saved in a box. As other editing functions, there are document merging/document insertion of merging a box document and other box document and inserting a box document in the middle of pages of the other box document so as to generate new box document, page deletion of deleting arbitrary pages from one box document, and the like. The functions regarding the document duplication, document merging, document insertion, and page deletion will be explained below.

Figure 39A:
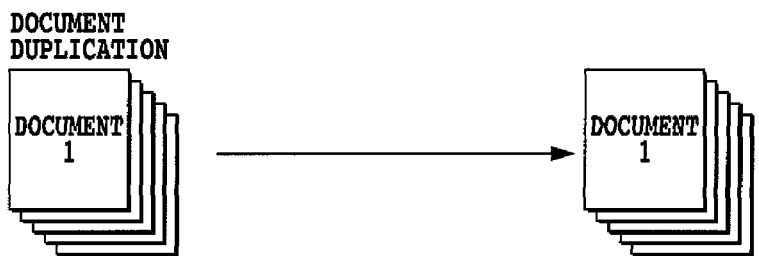
FIGS. 39A to 39D are diagrams explaining an editing function of box document in this embodiment.

FIG. 39A is a diagram explaining the editing function of document duplication. In document duplication, all the pages of the original document are duplicated to draw up a completely identical new document to the original document. Since the completely new document is drawn up, the original document is not edited.

Figure 39B:
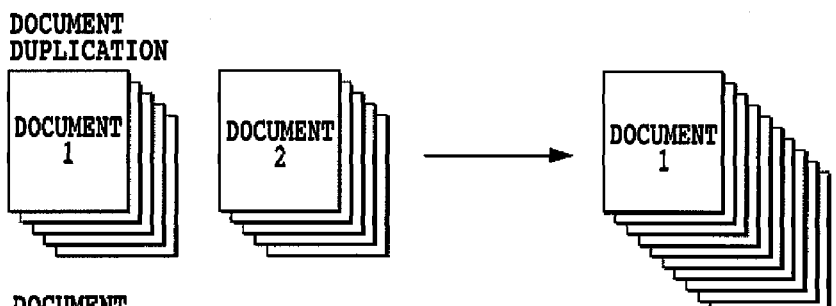

FIG. 39B is a diagram explaining an editing function of document merging. In document merging, a new document is formed by duplicating all the pages of a plurality of documents and combining their pages in a specified order into one document. In this embodiment, since a completely new document is formed, the original document is not edited. Naturally, document merging may be realized by combining a plurality of documents, as they are, into one document not by duplicating pages.

Figure 39C:
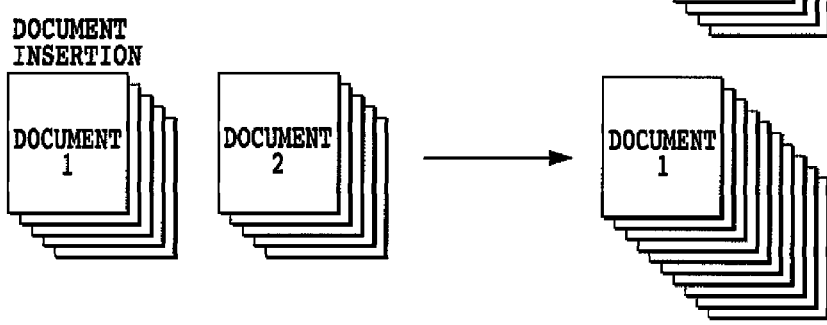

FIG. 39C is a diagram explaining an editing function of document insertion. In document insertion, a document such that a plurality of documents (insertion documents) are inserted into a certain document at specified pages thereof (insertion destination document) is formed. In this embodiment, duplications of the insertion documents are inserted into a duplication of the insertion destination document at specified pages thereof. Since the completely new document is drawn up, the original documents are not edited. Naturally, document insertion may be realized by using a plurality of original documents, as they are, not by duplicating pages.

Figure 39D:
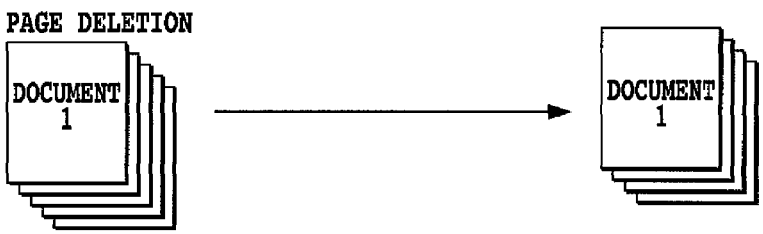

FIG. 39D is a diagram explaining the editing function of page deletion. In page deletion, arbitrary pages of a certain document are deleted. The pages to be deleted may be plural pages. In this embodiment, the pages of the document are deleted directly. Alternatively, the system may be configured so as to delete pages of a duplicated new document.

In this embodiment, when such editing of a box document as the above is done, processing is performed on the copy-forgery-inhibited pattern image data that is added to the image data of the document to make the latent mark of the copy-forgery-inhibited pattern image emerge. This processing of emerging is the same process as is explained in the first embodiment and is performed using the thinning filter 2024 and the color space conversion 2021. That is, the background part is disappeared and the latent mark is made to emerge by the processing described above in FIGS. 33 to 35. Alternatively, processing that makes the latent mark emerge described above in FIGS. 36 to 38 according to the modification of the first embodiment is performed.

Figure 40:
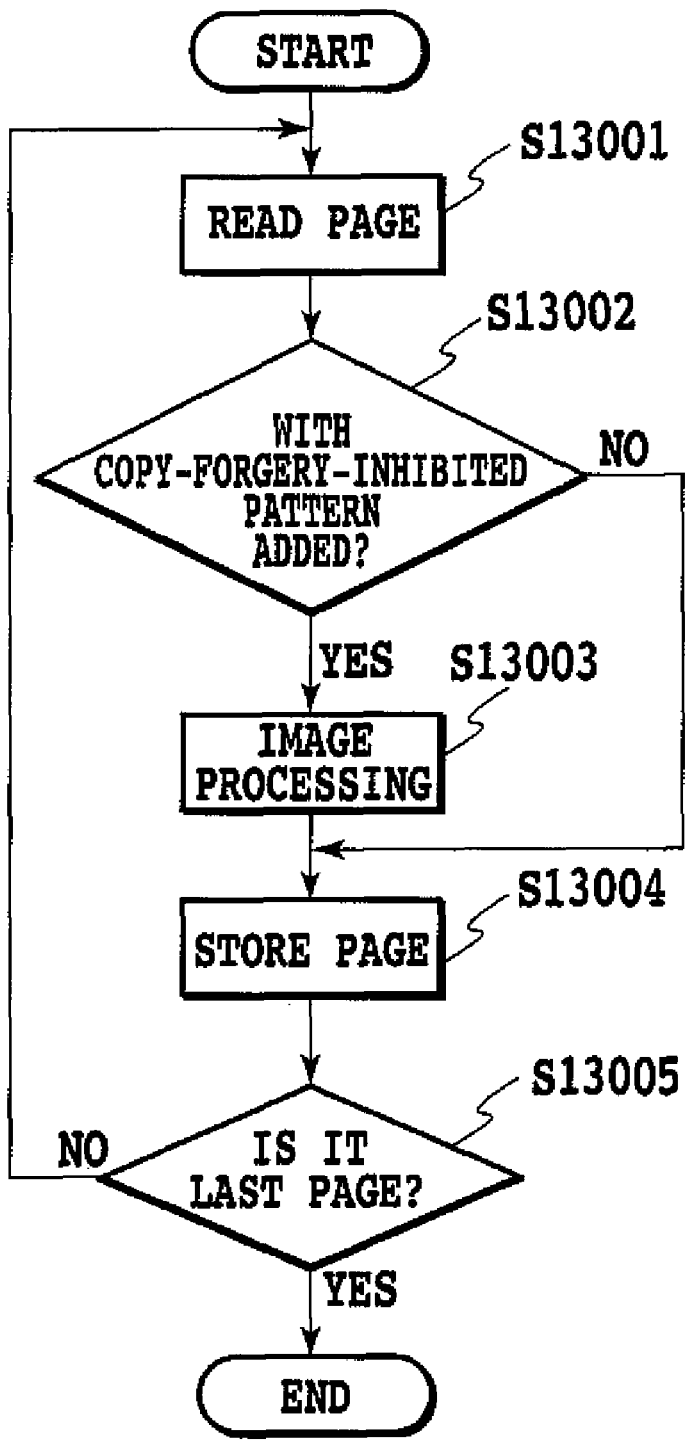
FIG. 40 is a flowchart showing duplication (electronic copying) processing of a box document with a copy-forgery-inhibited pattern added according to the second embodiment of this invention.

FIG. 40 is a flowchart showing duplication (electronic copying) processing of a box document with a copy-forgery-inhibited pattern added according to the second embodiment of the present invention.

In FIG. 40, first, in Step S13001, the image data of a page of a duplication source box document is read. Next, in Step S13002, it is determined whether the image data of the duplication source is added with a copy-forgery-inhibited pattern. In the case of the image data with the copy-forgery-inhibited pattern added, the flow proceeds to Step S13003; if otherwise, the flow proceeds to Step S13004.

In Step S13003, image processing of making the latent mark of the copy-forgery-inhibited pattern emerge is performed on the image data. This processing is the same as the processing explained in the first embodiment.

In Step S13004, the read image data or an image data such that the latent mark of its copy-forgery-inhibited pattern image of that image data is made to emerge is stored in a predetermined position of a new document. To be concrete, the image data of the page is copied as a new document. Then, in Step S13005, it is determined whether the page stored in Step S13004 is the last page. If it is the last page, this processing is ended; if otherwise, the flow returns to Step S13001 and the above-mentioned processing is repeated.

As described above, when a box document is intended to be copied, if it is the image data with a copy-forgery-inhibited pattern added, processing of making the latent-mark part of the copy-forgery-inhibited pattern image emerge is performed. By this, it can be recognized that a copied document differs from the original, and it becomes possible to restrain irregular practices, such as using the copied document illegally.

Incidentally, in the above explanation, it is determined for each page whether the original image data is added with a copy-forgery-inhibited pattern. However, it may be determined, as a whole of the box document, whether the image data is added with a copy-forgery-inhibited pattern.

Figure 41:
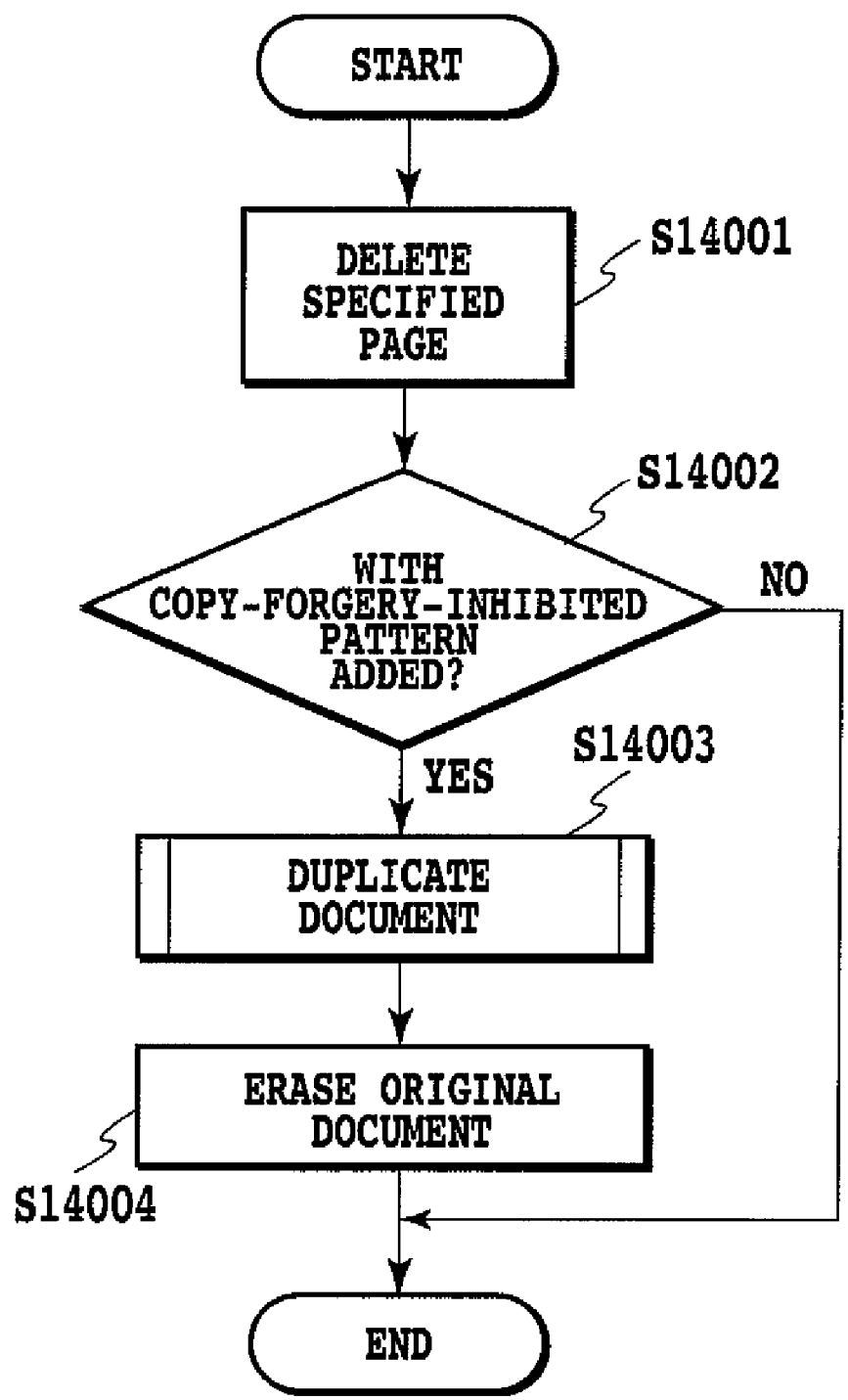
FIG. 41 is a flowchart showing processing of page deleting of a box document with a copy-forgery-inhibited pattern added in the second embodiment.

FIG. 41 is a flowchart showing processing of page deleting of a box document with a copy-forgery-inhibited pattern added in this embodiment. First, in Step S14001, the image data of a specified page is deleted from a box document. The document with this specified page deleted becomes an original box document in the following processing.

Next, in Step S14002, it is determined whether the box document subjected to page deletion is a document with a copy-forgery-inhibited pattern added. If it is a document with a copy-forgery-inhibited pattern added, the flow proceeds to Step S14003; if otherwise, this processing is ended. In this embodiment, if at least one page of the image data with a copy-forgery-inhibited pattern image added exists in the document, the document is determined as a document with a copy-forgery-inhibited pattern added.

In Step S14003, duplication processing explained in FIG. 40 is performed on the original box document with the above-mentioned page deleted. Instead, in Step S14004, the original box document duplicated in Step S14003 is deleted, and this processing is ended. That is, if there is a page added with a copy-forgery-inhibited pattern image in a document containing a deleted page, the document with the page deleted is copied. In doing so, as is explained in FIG. 40, on a page with a copy-forgery-inhibited pattern image added in the document is subjected to processing of making the latent mark of the copy-forgery-inhibited pattern emerge. By this processing, it can be recognized that a document whose pages have been deleted is different from the original, and accordingly it becomes possible to restrain irregular practices, for example, illegal use of the document with pages deleted.

Modification of Second Embodiment

In the second embodiment described above, the example where the copy-forgery-inhibited pattern is added to the image data in the PC 240, and processing of making the latent mark of the copy-forgery-inhibited pattern added emerge in the image formation apparatus 200 is performed is explained. Naturally, embodiments of the present invention are not restricted to this embodiment.

The following modification will explain the case where a copy-forgery-inhibited pattern image is added to the image data inputted from other device, such as the PC 240, and a latent mark of the added copy-forgery-inhibited pattern is made to emerge in the same image formation apparatus 200. To be concrete, the image formation apparatus 200 performs processing of temporarily storing the image data with a copy-forgery-inhibited pattern added and making the latent mark emerge when this is used for a job other than printing.

First, the processing of forming an image with a copy-forgery-inhibited pattern added in the image formation apparatus 200 will be explained with reference to FIGS. 42 to 48.

Figure 42:
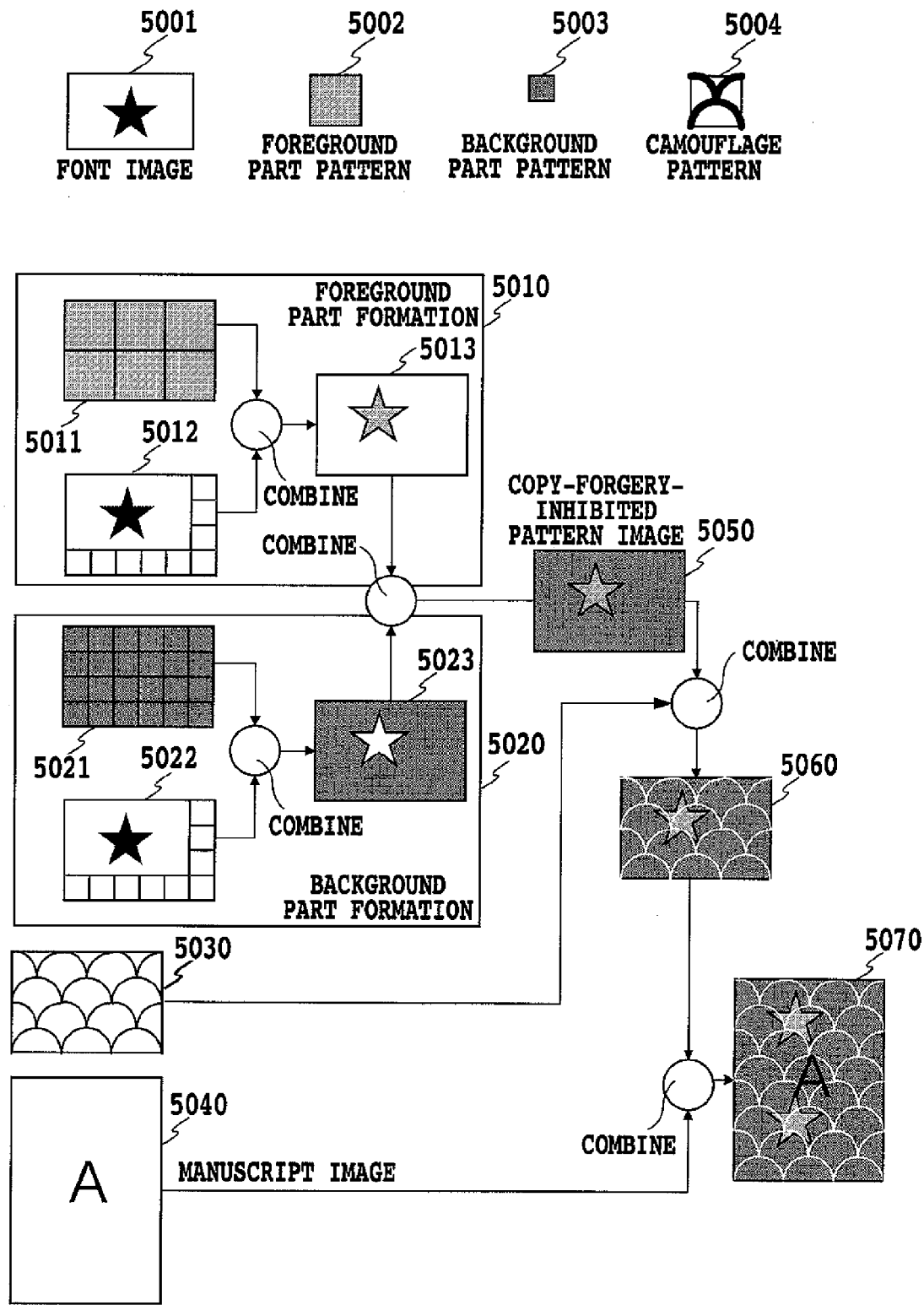
FIG. 42 is a diagram showing the concept of creation processing of an image with a copy-forgery-inhibited pattern added in image formation apparatus 200.

FIG. 42 is a diagram showing a concept of generation processing of an image with a copy-forgery-inhibited pattern added in the image formation apparatus 200. This image formation apparatus spreads characters and symbols specified by the operation portion 2062 in the RAM 2002 as a bit map. The numeral 5001 indicates a font image showing one example as being spread as a bit map. Moreover, a foreground pattern 5002, a background pattern 5003 and a camouflage pattern 5004 of the copy-forgery-inhibited pattern image can be stored in the hard disk made up of the HDD 2004 and spread in the RAM 2002 into an arbitrary size.

The numeral 5010 indicates foreground (latent mark) image generation of the copy-forgery-inhibited pattern. Here, the numeral 5011 indicates a foreground pattern saved in the hard disk that is repeated by a predetermined number and spread in the RAM 2002. The numeral 5012 indicates a specified font spread in the RAM 2002. In order to adjust itself to an image size of the foreground pattern 5011, the font 5012 is added with a white image on its circumference. The pattern 5011 and the font 5012 are spread in the RAM 2002, and subsequently images of the two are combined as a foreground image 5013 by the synthesis 2023 (FIG. 4), which is spread in the RAM 2002. At this time, combining processing is so performed that the foreground pattern 5011 may remain only in a part of a character of the font 5012.

The numeral 5020 indicates background image generation of the copy-forgery-inhibited pattern. Here, the numeral 5021 indicates a background pattern saved in the hard disk that is repeated by a predetermined number and spread in the memory. The numeral 5022 indicates a specified font being spread in the RAM 2002. The font 5022 is added with a white image on its circumference in order to adjust itself to an image size of the background pattern 5021. By the synthesis 2023, both images are combined as a background image 5023, which is spread in the RAM 2002. At this time, combining processing is so performed that the background pattern 5021 may remain only in portions other than characters of the font 5022.

The numeral 5030 indicates a camouflage image. This is an image such that the camouflage pattern 5004 is spread in the RAM 2002. There is the case where this image is not generated according to a direction from the control panel.

After the completion of the image generation processing 5010, 5020 of the foreground and the background, respectively, the foreground image 5013 and the background image 5023 are simply combined by the synthesis 2023, and a copy-forgery-inhibited pattern image 5050 is spread in the RAM 2002. If there is a direction of image generation of the camouflage image 5030, the image 5050 is further subjected to combining processing of the camouflage image and a copy-forgery-inhibited pattern image 5060 with a camouflage image added is spread in the RAM 2002. At this time, combining processing is so performed that the camouflage image may be rendered blank.

After the copy-forgery-inhibited pattern image is created, a manuscript image 5040 and the copy-forgery-inhibited pattern image 5050 (or 5060) are combined to make an image 5070 with a copy-forgery-inhibited pattern added, which is spread in the RAM 2002.

FIGS. 43 to 48 are diagrams showing one example of user interfaces for establishing setting regarding copy-forgery-inhibited pattern image printing in the image formation apparatus 200.

Figure 43:
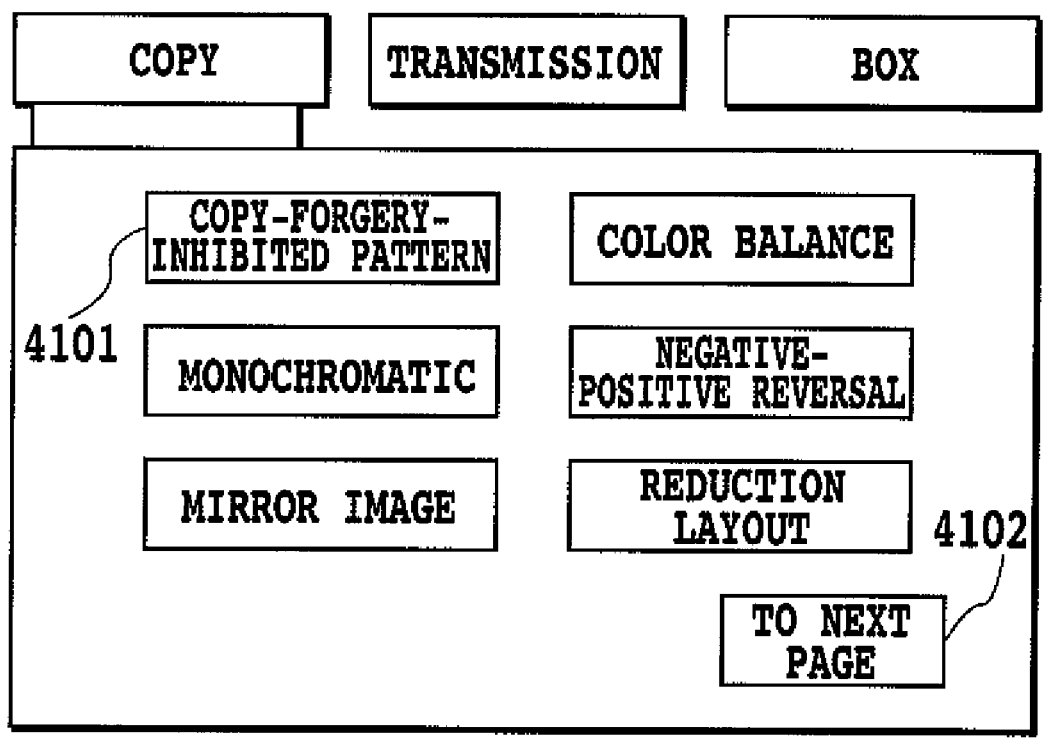
FIG. 43 is a diagram showing one example of a user interface for establishing setting regarding copy-forgery-inhibited pattern image printing in the image formation apparatus 200.

FIG. 43 is a diagram showing a screen when pressing Application Mode button 3305 shown in FIG. 13. As described above, pressing the application mode button enables the user to establish setting of reduction layout, color balance, or the like. In addition, pressing a button 4101 enables the user to establish setting related to the copy-forgery-inhibited pattern.

Figure 44:
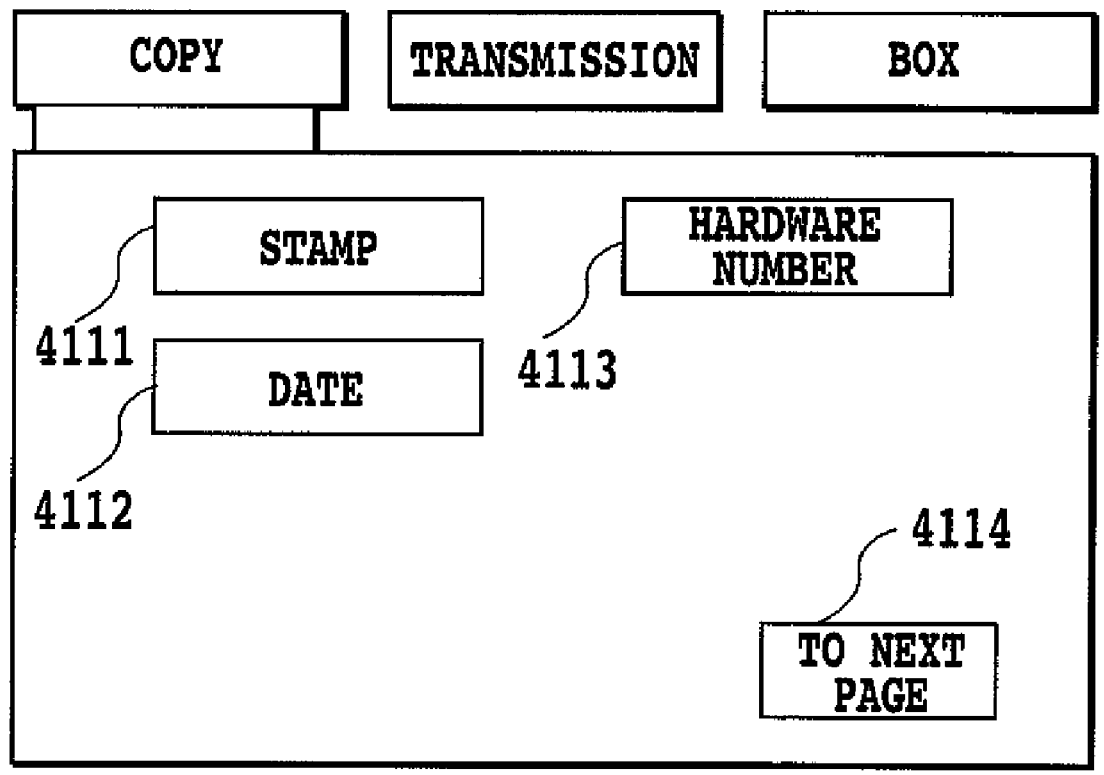
FIG. 44 is a diagram showing one example of the user interface for establishing setting regarding the copy-forgery-inhibited pattern image printing in the image formation apparatus 200.

FIG. 44 is a view showing a screen displayed when the copy-forgery-inhibited pattern setup button 4101 is pressed. In this embodiment, information that will be printed as the copy-forgery-inhibited pattern can be selected from among a stamp, an equipment ID, and a date. In this modification these selections will be explained. The system may be configured so as to enable the user to select, for example, the number of copies, the user's ID number, etc. Although in this embodiment, any one of them is expected to be selected, plural pieces of information may be selected and printed.

Figure 45:
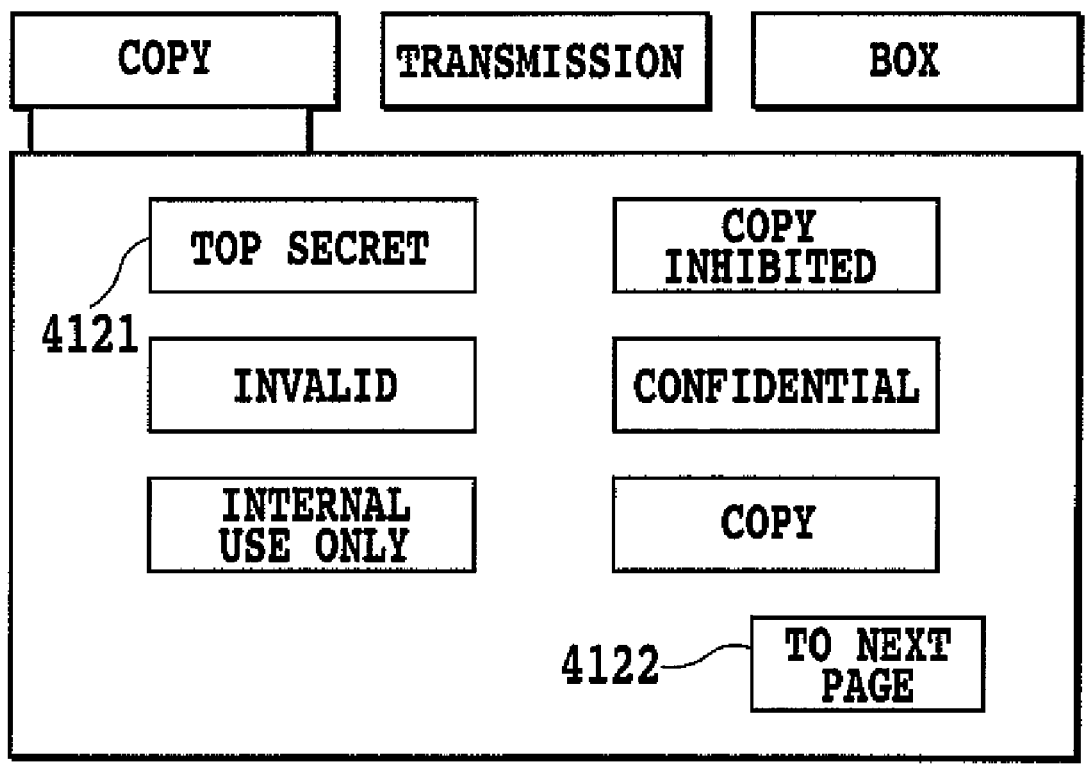
FIG. 45 is a diagram showing one example of the user interface for establishing setting regarding the copy-forgery-inhibited pattern image printing in the image formation apparatus 200.

FIG. 45 is a view showing a screen displayed when a stamp setup key 4111 is pressed. In this figure, six selections of TOP SECRET, COPY INHIBITED, INVALID, CONFIDENTIAL, INTERNAL USE ONLY, and COPY are set up as stamps, and the user is allowed to select what will be printed as the copy-forgery-inhibited pattern (latent mark) from among them. For example, when selecting "TOP SECRET," pressing a button 4121 and pressing a button 4122, which transfers the user to a screen shown in FIG. 47 that is a next setup screen.

Figure 46:
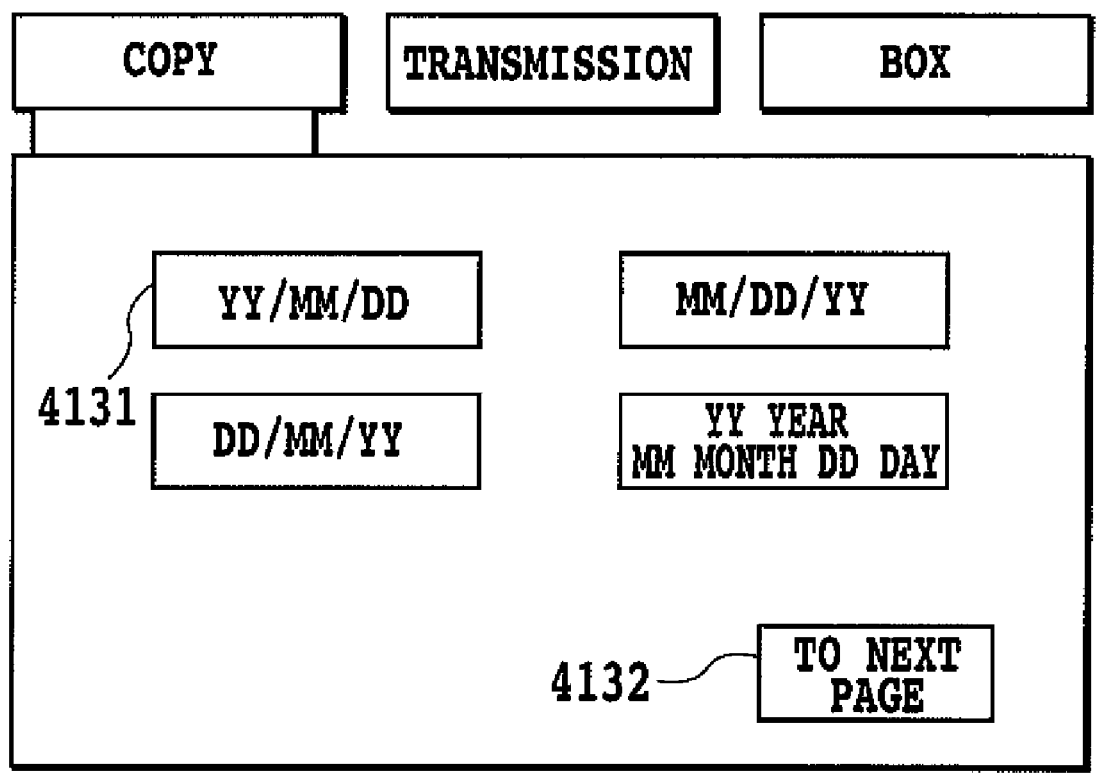
FIG. 46 is a diagram showing one example of the user interface for establishing setting regarding the copy-forgery-inhibited pattern image printing in the image formation apparatus 200.

FIG. 46 is a view showing a screen displayed when a date setup key 4112 is pressed on a screen shown in FIG. 44. As shown in FIG. 46, as formats of the date, four selections of YY/MM/DD, MM/DD/YY, DD/MM/YY, and YY year MM month DD day are provided, and the user is expected to select what will be printed as the copy-forgery-inhibited pattern (latent mark) from among them. For example, when selecting YY/MM/DD, press a button 4131 and subsequently press a button 4132, which transfers the user to a screen shown in FIG. 47 that is a next setup screen.

Figure 47:
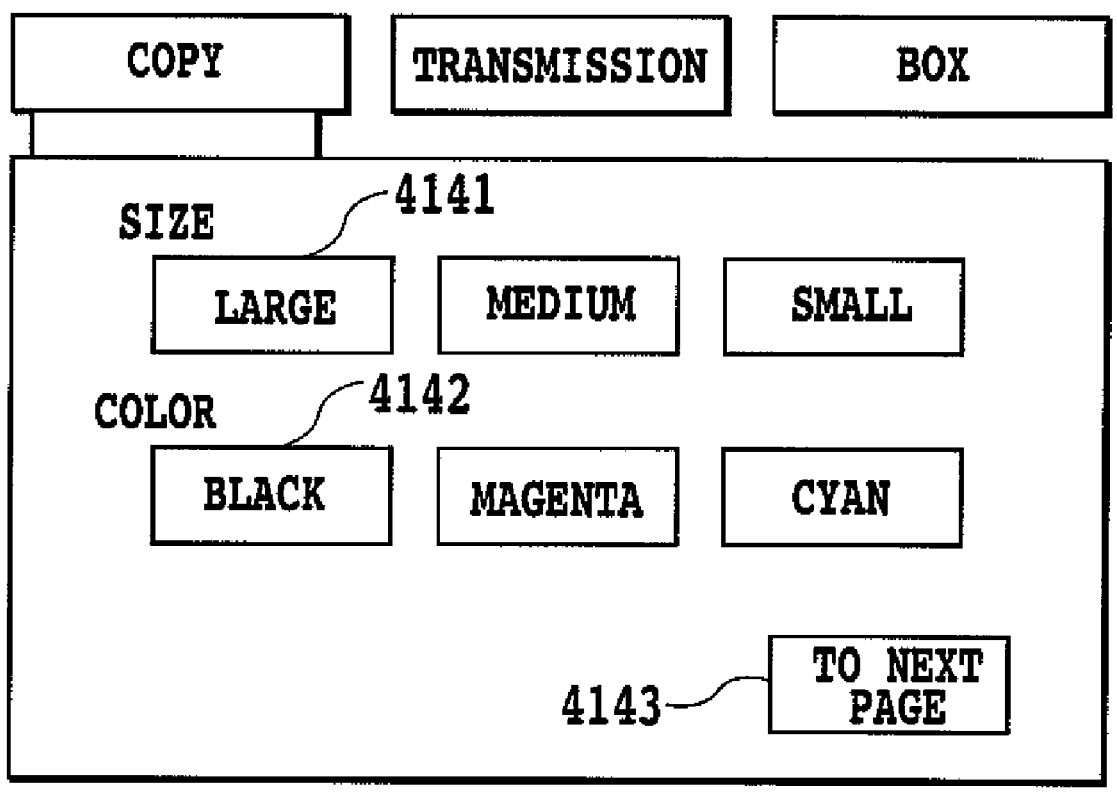
FIG. 47 is a diagram showing one example of a user interface for establishing setting regarding the copy-forgery-inhibited pattern image printing in the image formation apparatus 200.

In FIG. 44, if a hardware number setup button 4113 is pressed, the display is transferred to a screen shown in FIG. 47 that is a next setup screen. As the copy-forgery-inhibited pattern information, a serial number of hardware that individual printer has will be printed in the form of a latent mark.

FIG. 47 is a view showing a screen on which items common to all pieces of the copy-forgery-inhibited pattern information are set up. On this screen, a size and a color of a font as which the latent mark of a copy-forgery-inhibited pattern image is printed are selected. As a size of the font, any one of large, middle and small can be selected, and as a color, any one of black, magenta and cyan can be selected, respectively. After selecting the size and the color of the font, the user is expected to press a button 4143, which effects transfer to a screen shown in FIG. 48 that is a next setup screen.

Figure 48:
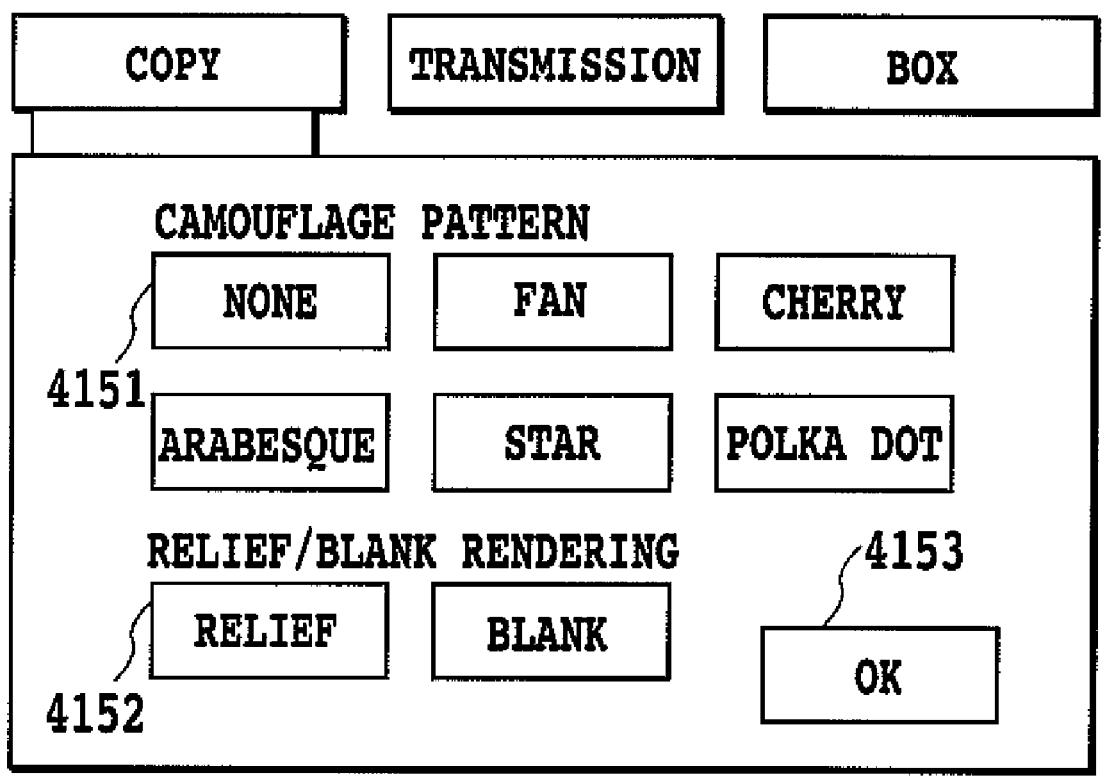
FIG. 48 is a diagram showing one example of an user interface for establishing setting regarding the copy-forgery-inhibited pattern image printing in the image formation apparatus 200.

FIG. 48 is a view showing a screen continued from the previous screen of common setup items. On this screen, selection of a camouflage pattern and setup of relief/blank rendering in the copy-forgery-inhibited pattern printing can be done.

A camouflage pattern is for making a state of addition of a copy-forgery-inhibited pattern image difficult for human eye to recognize in a printed-out matter to which a copy-forgery-inhibited pattern image is added. On a screen shown in FIG. 48, the camouflage pattern can be selected from among a plurality of patterns, such as a fan and a cherry tree and the like. Alternatively, a selection of using no camouflage pattern can also be done. Incidentally, a selected camouflage pattern in the copy-forgery-inhibited pattern printing image shown in FIG. 32 is a fan.

Figure 49A:
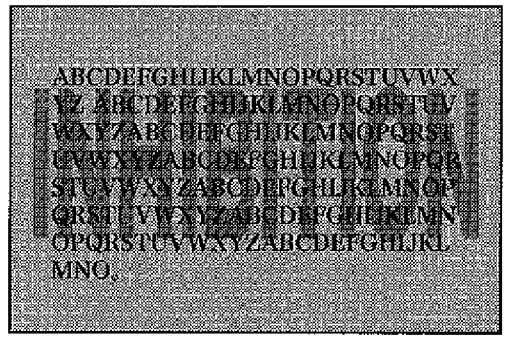
FIG. 49A to 49C are diagrams for explaining emerging/blanking against dark background of an image with a copy-forgery-inhibited pattern added.
Figure 49B:
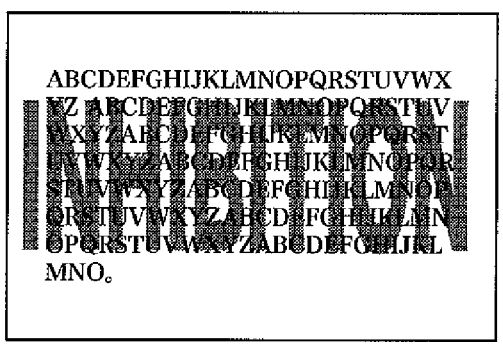
Figure 49C:
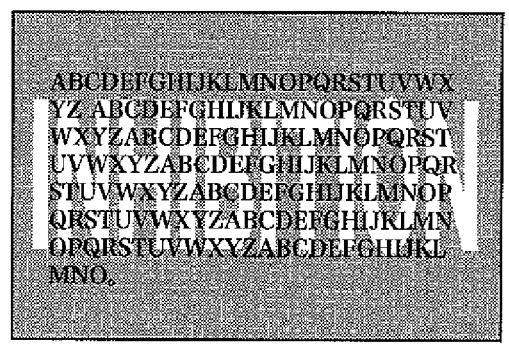

Setting of relief/blank rendering is for specifying which is to be visualized, the latent mark of a copy-forgery-inhibited pattern or an image of text information etc. that is put into a copy-forgery-inhibited pattern in an image after duplicating the image with a copy-forgery-inhibited pattern added. FIGS. 49A to 49C are diagrams for explaining relief/blank rendering of an image with a copy-forgery-inhibited pattern added. FIG. 49A shows a printed image with a copy-forgery-inhibited pattern added. When relief rendering is set up, a duplication of this printed matter becomes what is shown in FIG. 49B; when blank rendering is setup, a duplication becomes what is shown in FIG. 49C. That is, in the case of setting of relief rendering, setting of visualization of the latent mark of a copy-forgery-inhibited pattern, such as a character ("Inhibition") on the duplication is established. On the other hand, in the case of blank rendering, setting of visualizing of an image that is put into a copy-forgery-inhibited pattern on the duplication is established. In either case, the latent mark, such as characters, becomes notably recognizable on the duplication.

The camouflage pattern and relief/blank rendering are selected individually and subsequently a button 4153 is pressed on a screen shown in FIG. 48, whereby all the settings related to the copy-forgery-inhibited pattern are fixed.

In the image formation apparatus 200, the image data with a copy-forgery-inhibited pattern added that are formed in such a way as is explained with reference to FIGS. 42 to 48 in the foregoing is temporarily stored in the hard disk. Then, when this image data is used for a job other than printing, such as transmission and editing, the image formation apparatus 200 performs processing of making the latent mark emerge that is explained in each of the above-mentioned embodiments or the modification.

According to the second embodiment including the modification described above, it is possible that, when the image data with a copy-forgery-inhibited pattern added is duplicated or when a modification operation, such as page deletion and insertion, is performed, the latent mark, such as a character string, is made to emerge in the data obtained by such an operation. By this processing, under an idea that the image data with a copy-forgery-inhibited pattern added is a "Master (Original)," it can be made visually recognizable that a duplication and a modified matter are different from the original.

Note that in both cases of the above-mentioned first embodiment and the second embodiment, the copy-forgery-inhibited pattern of the original data itself (data stored in a box (hard disk) in the first place) is not visualized but what is duplicated from the original is subjected to the processing. Especially in the case where the image data is displayed on the display screen, if the original data has been visualized, the original no longer exists; therefore, processing that the data is copied internally and the computer data is subjected to processing of visualization will be performed generally. In the case of data transmission to external equipment, when transmission is done leaving the original inside (the case where duplicated data is transmitted), naturally duplicated data is visualized. Incidentally, when transmitting the original itself, visualization is performed on the original data and transmission processing is performed.

Third Embodiment

A third embodiment of this invention relates to processing of, when data with a copy-forgery-inhibited pattern added is stored in a hard disk (box) of the multi-function combined machine 200, inhibiting partial duplication, page deletion, page insertion, etc except for deletion of all data in order to inhibit any operation for altering the data. Moreover, in the third embodiment, when the image data with no copy-forgery-inhibited pattern added is stored in a box, if this data is duplicated, the image data is subjected to processing of combining a copy-forgery-inhibited pattern image whose latent mark is a character string to indicate that it is the duplication or the like into the image to be duplicated.

Before explaining inhibition processing of duplication etc. according to this embodiment, operations of the control panel at the time of performing a page operation of a document in a box, combination of documents, and movement and duplication of a document will be explained. FIG. 15 and FIGS. 50 to 54 are diagrams explaining these operations.

First, the case where an operation of document duplication is performed on the display screen of the control panel shown in FIG. 15 described above will be explained. As an example, a procedure of duplicating a document named "Meeting Material 1-1" in a box named "Meeting Material 1" shown in the figure into a box named "Meeting Material 2" will be explained.

In FIG. 15, a button 3501 is pressed to select a document named "Meeting Material 1-1," and subsequently a "Movement/Duplication" button 3510 is pressed. These operations effect a change of display of the operation portion to a screen shown in FIG. 50. Here, since the box 3601 is originally a document named "Meeting Material 1-1" and cannot be selected as a duplication destination, the box is shown with a dot-meshing display indicating that it cannot be selected. The numeral 3602 indicates "Meeting Material 2" that is another box currently registered. There numeral 3604 indicates the amount used of the whole HDD like the numeral 3402. The numeral 3605 indicates a button for directing duplication of a document, and if the button is not pressed, movement of the document will be directed. The numeral 3603 indicates a cancel button, and by pressing it, the display returns to the screen shown in FIG. 15. The numeral 3606 indicates a button for executing movement and duplication.

Figure 50:
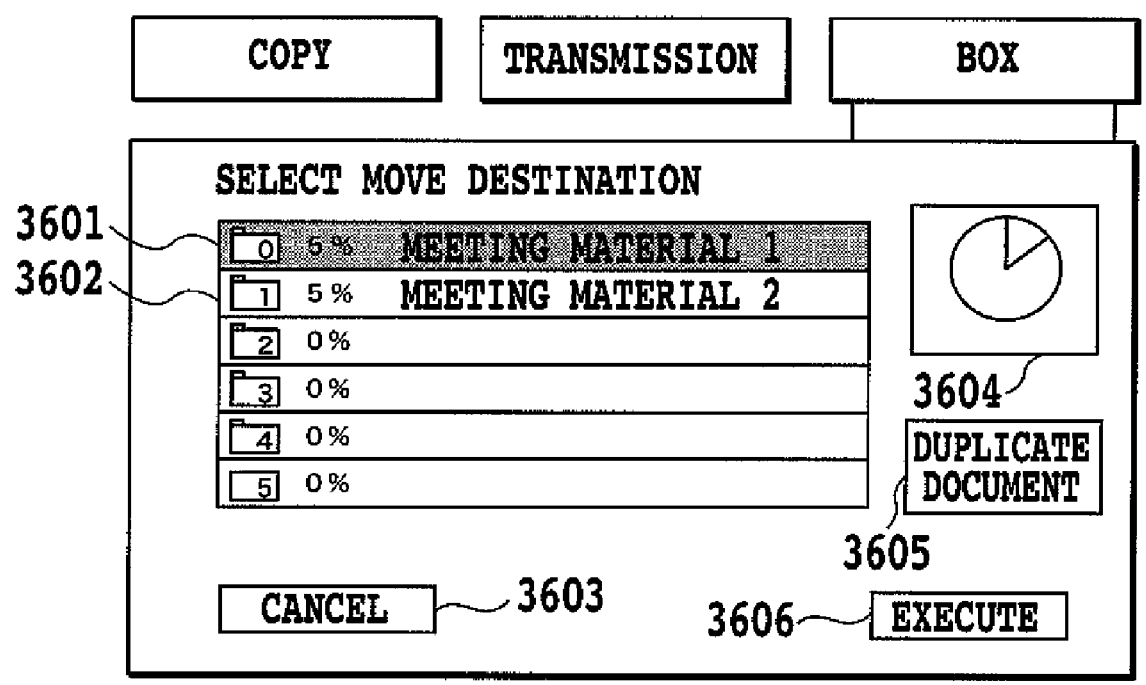
FIG. 50 is a diagram showing an operation screen for duplication of a box document.

In FIG. 50, after pressing a button 3602 to select the "Meeting material 2" that is a box of duplication destination, a button 3605 for directing duplication of document is pressed, and a button 3606 is pressed further to execute duplication of a document.

Figure 51:
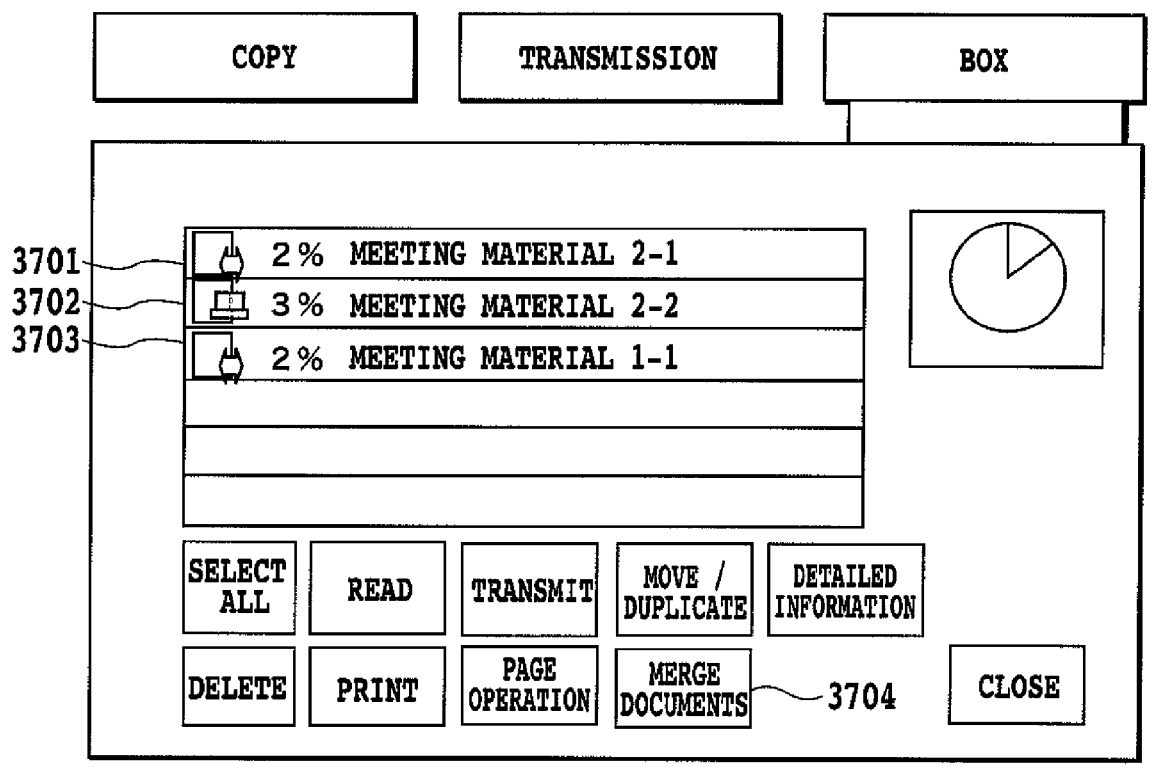
FIG. 51 is a view showing a screen that displays contents of the box document.

FIG. 51 is a view showing a screen that displays contents of the box "Meeting Material 2." In the figure, the numerals 3701, 3702 indicate documents "Meeting Material 2-1" and "Meeting Material 2-2" that originally exist in this box, and the numeral 3703 indicates a document "Meeting Material 1-1" duplicated by the above-mentioned operation. The above-mentioned operation shows that the document "Meeting material 1-1" is duplicated in the box "Meeting Material 2."

Next, in the display screen of the control panel shown in FIG. 51, an operation to merge the document "Meeting Material 2-1" and "Meeting Material 1-1" in a box named "Meeting Material 2" will be explained.

In FIG. 51, the two documents "Meeting material 2-1" and "Meeting material 1-1" that need to be combined are selected by pressing their boxes 3701, 3703, respectively. Subsequently, a "Document Merging" button 3704 is pressed. In response to this, the display of the operation portion shifts to a screen shown in FIG. 52. Here, the numeral 3801 indicates a document after the document merging operation. In this embodiment, since a document name in higher position in the list display is prioritized, a document name after the merging becomes "Meeting Material 2-1." It can be checked that the amount used of the HDD is increased by 4%, indicating an increase by the merging.

Next, in the control panel display shown in FIG. 52, an operation of deleting one page of the document "Meeting Material 2-1" in the box named "Meeting Material 2" will be explained.

Figure 52:
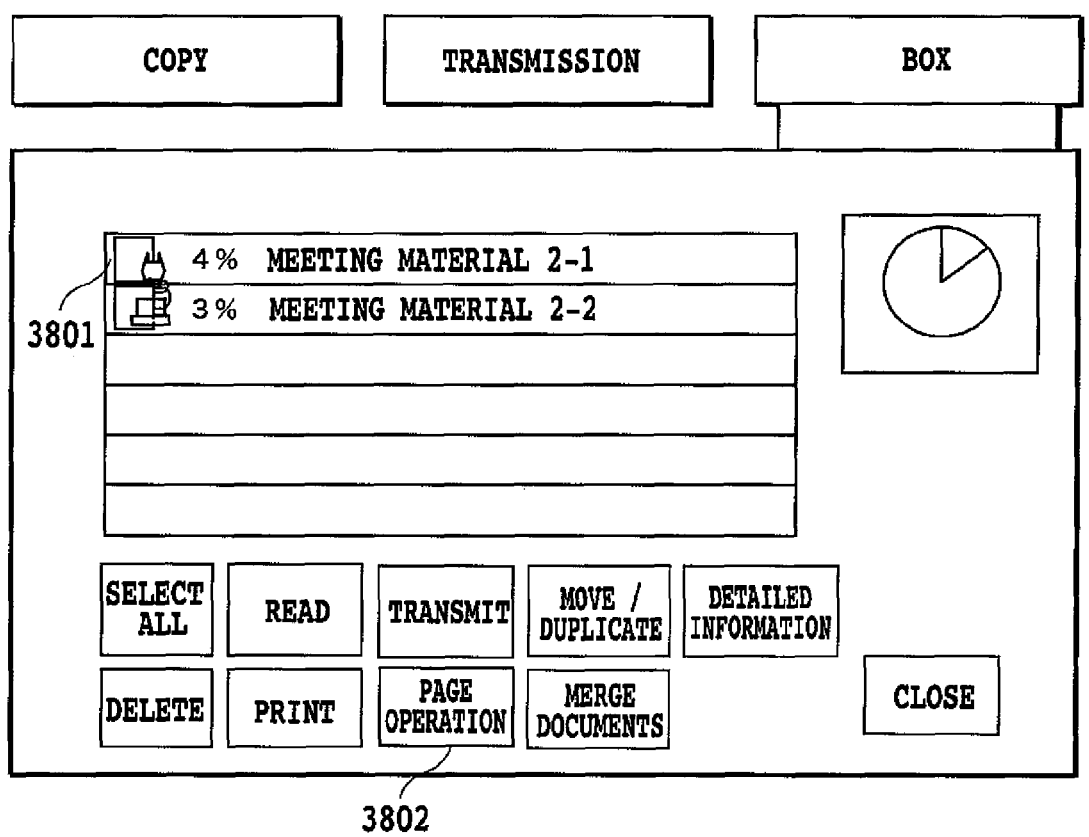
FIG. 52 is a view showing a screen whereby the user directs an operation of page in the box document.

In FIG. 52, after pressing a box 3801 to select the document "Meeting Material 2-1," a button 3802 is pressed to direct an operation of pages. In response to this, display of the control panel shifts to a screen shown in FIG. 53. Here, the numeral 3901 indicates a button corresponding to display showing the first page of the document "Meeting Material 2-1." In the example shown in FIG. 53, the document "Meeting Material 2-1" consists of four pages.

Figure 53:
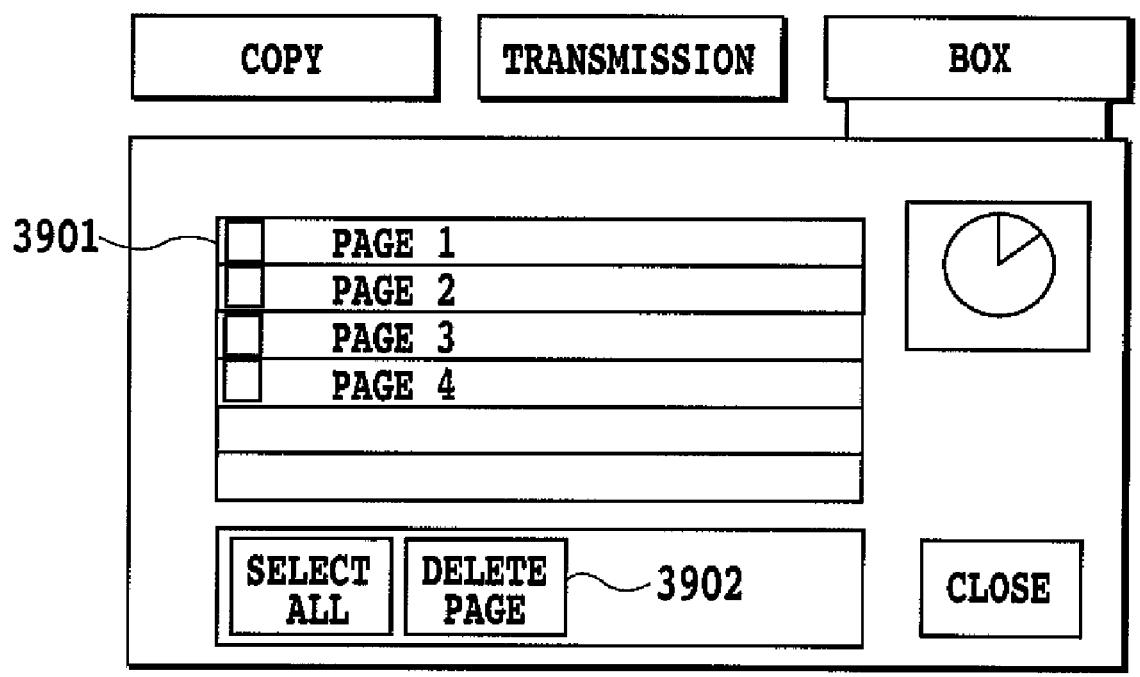
FIG. 53 is a view showing a screen whereby the user directs a page to be deleted of a box document.

In FIG. 53, after selecting the first page that is intended to be deleted by pressing the button 3901, a button 3902 for directing page deletion is pressed. In response to this, the display of the control panel shifts to a screen shown in FIG. 54. This screen shows that the first page of the document "Meeting Material 2-1" is deleted and the number of its pages becomes three pages.

Figure 55:
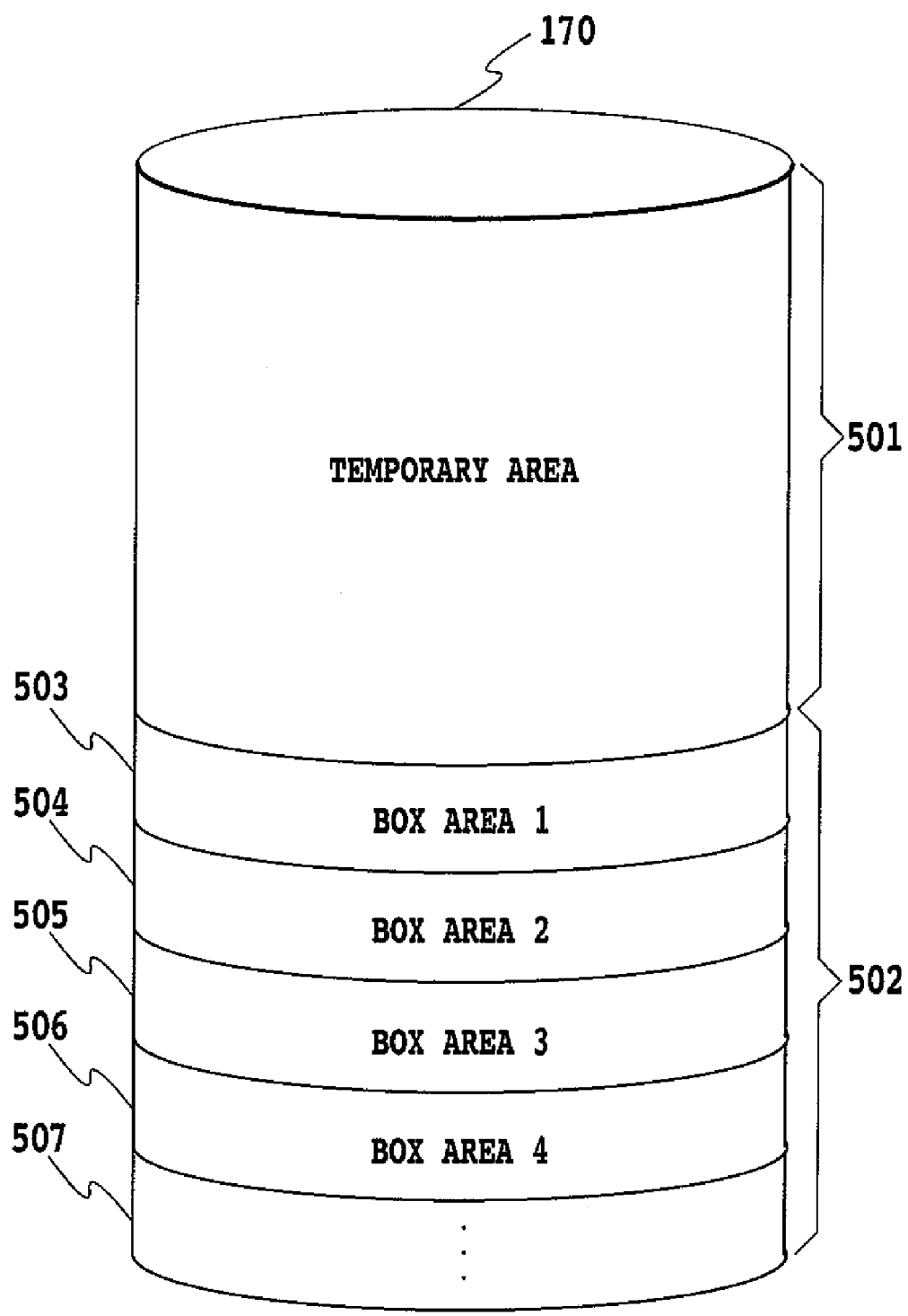
FIG. 55 is a diagram showing a method of logically using a hard disk drive according to the embodiment of this invention.

FIG. 55 is a diagram showing a method for logically using the hard disk of this embodiment for storing a box document. In this embodiment, a storage area of the image memory in the hard disk is logically divided into a temporary area 501 and a box area 502 according to usage. The temporary area 501 is a storage area for temporarily storing data described in PDL and the image data from a scanner in order to be able to change an output order of the image data and produce a plurality of outputs even with a single scanning. The box area 502 is a storage area to use a box function, and is divided into a registered number of small storage areas, like boxes 503 to 507. For example, a box 503 corresponds to the box with a box number no. 0 named "Meeting Material 1" shown in FIG. 14. By specifying a box, the user is allowed to enter a PDL job and a scan job into that box, and also allowed to see the inside of a box, perform setting alteration, and execute printing out.

Figure 56:
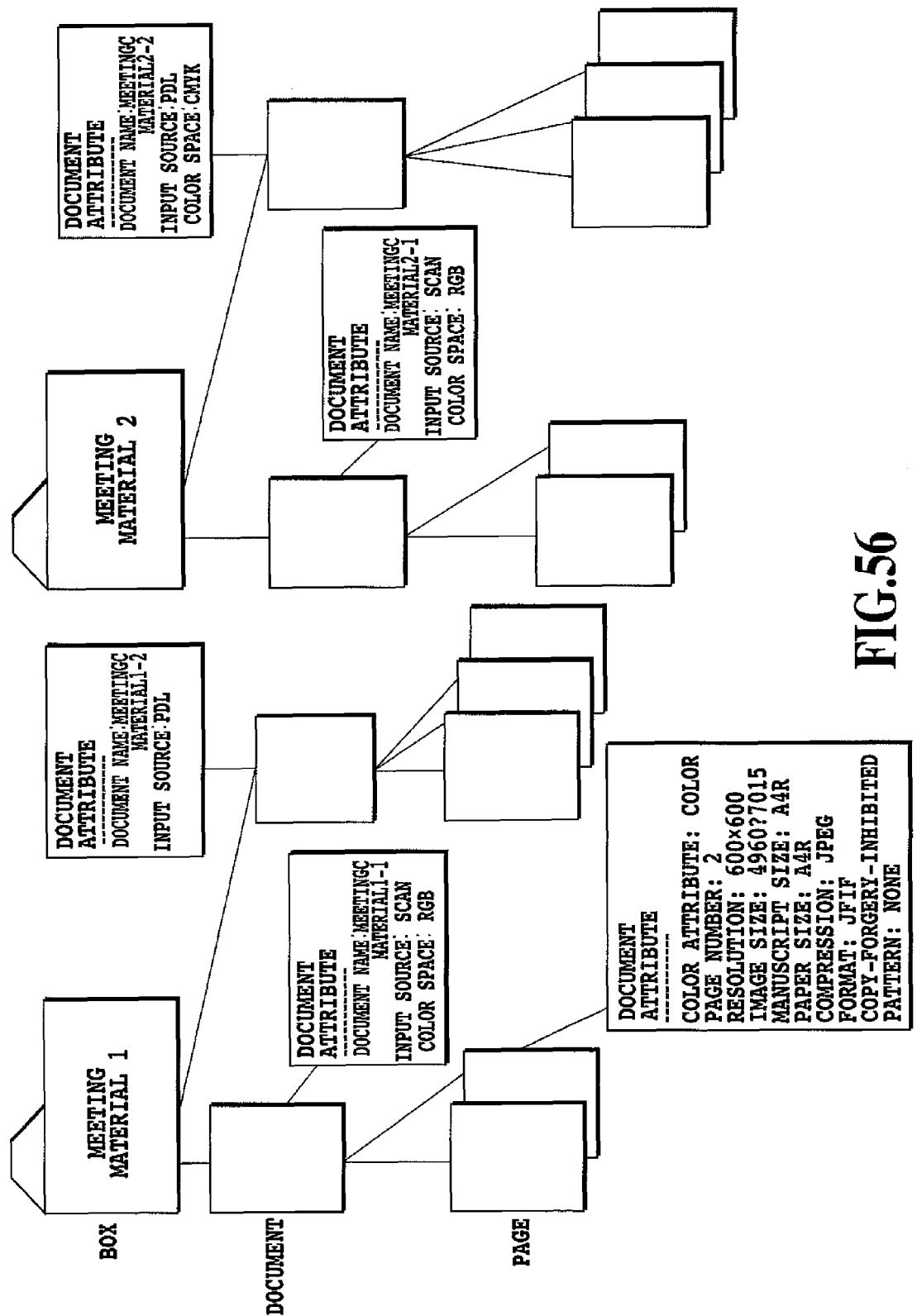
FIG. 56 is a diagram showing in detail a logical configuration of an image stored in the hard disk drive according to the embodiment of this invention.
Figure 57:
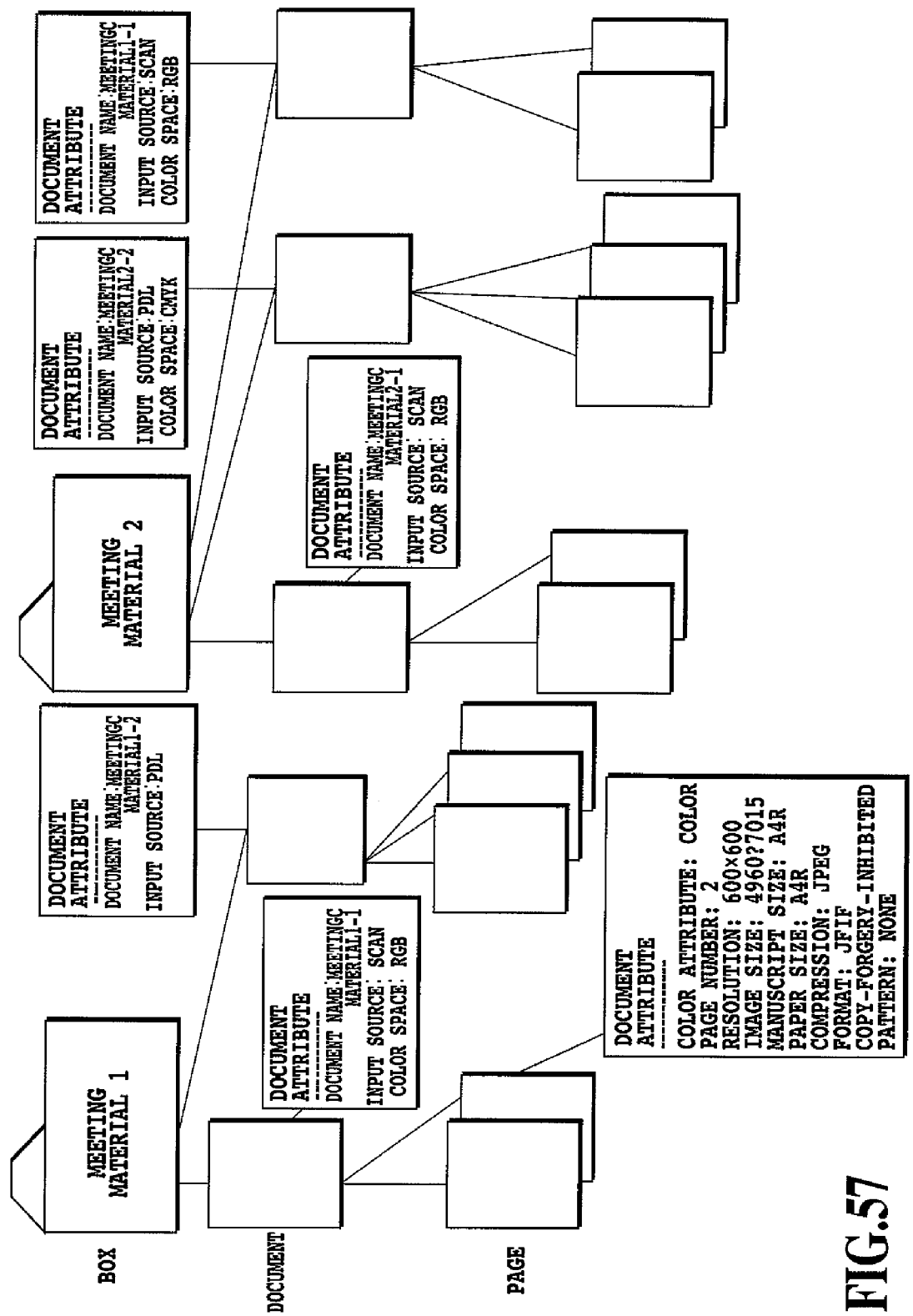
FIG. 57 is a diagram showing in detail a logical configuration of an image stored in the hard disk drive according to the embodiment of this invention.
Figure 58:
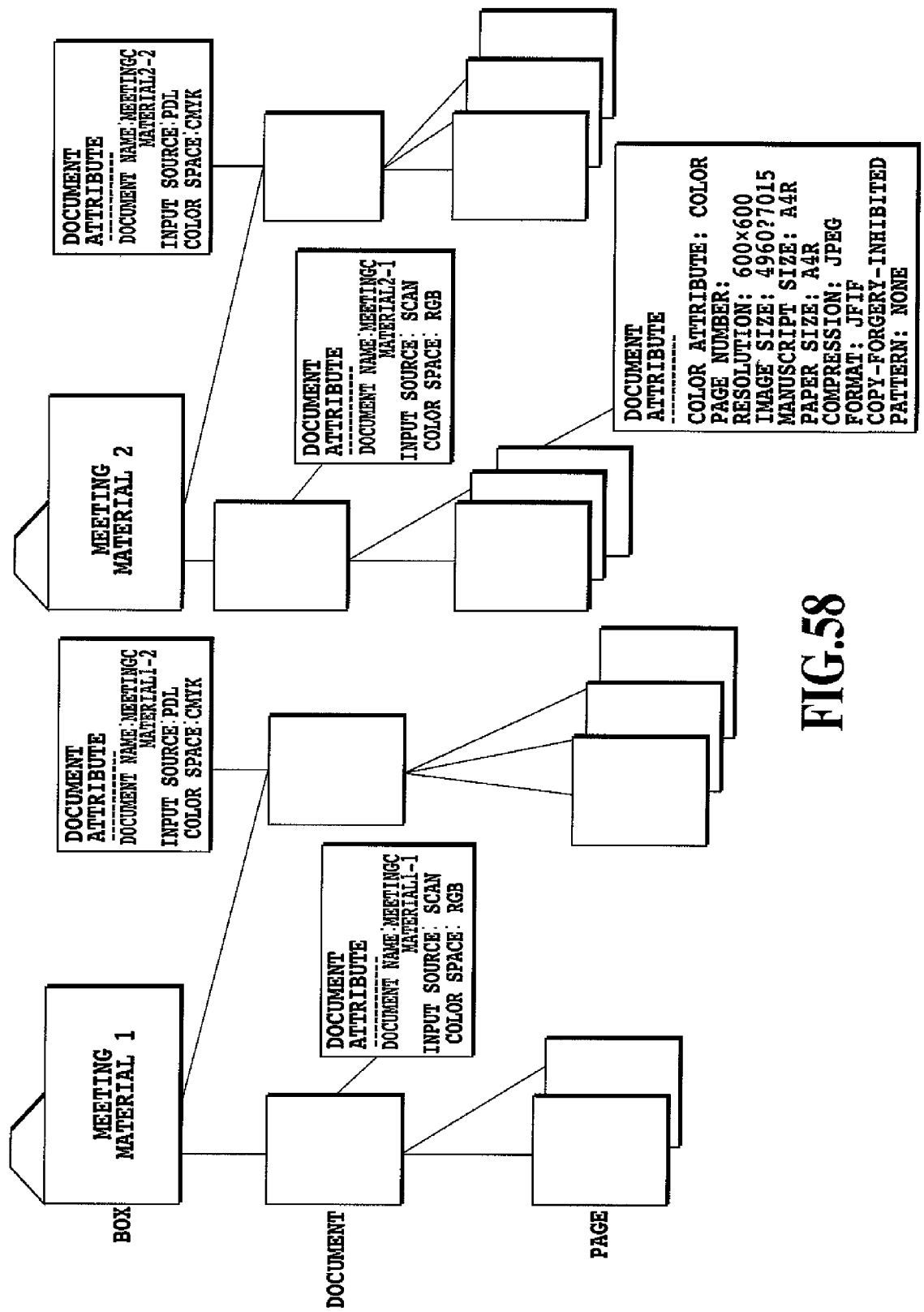
FIG. 58 is a diagram showing in detail a logical configuration of an image stored in the hard disk drive according to the embodiment of this invention.

FIGS. 56, 57, and 58 are diagrams showing in detail a logical configuration of an image stored in the hard disk operated by the HDD 2004, respectively. The box functions a logical partition in which a plurality of scan documents and PDL documents can be stored collectively. The documents consist of two kinds of data, scan data and PDL data. The document includes a plurality of pages (image file). Each document has a document attribute, in which information of a document name, an input source, and color space are stored. Moreover, each page has a page attribute, in which a color attribute, a page number, resolution, an image size, a manuscript size, a paper size, a compression method, a file format, and existence/non-existence of a copy-forgery-inhibited pattern are stored as information.

Figure 54:
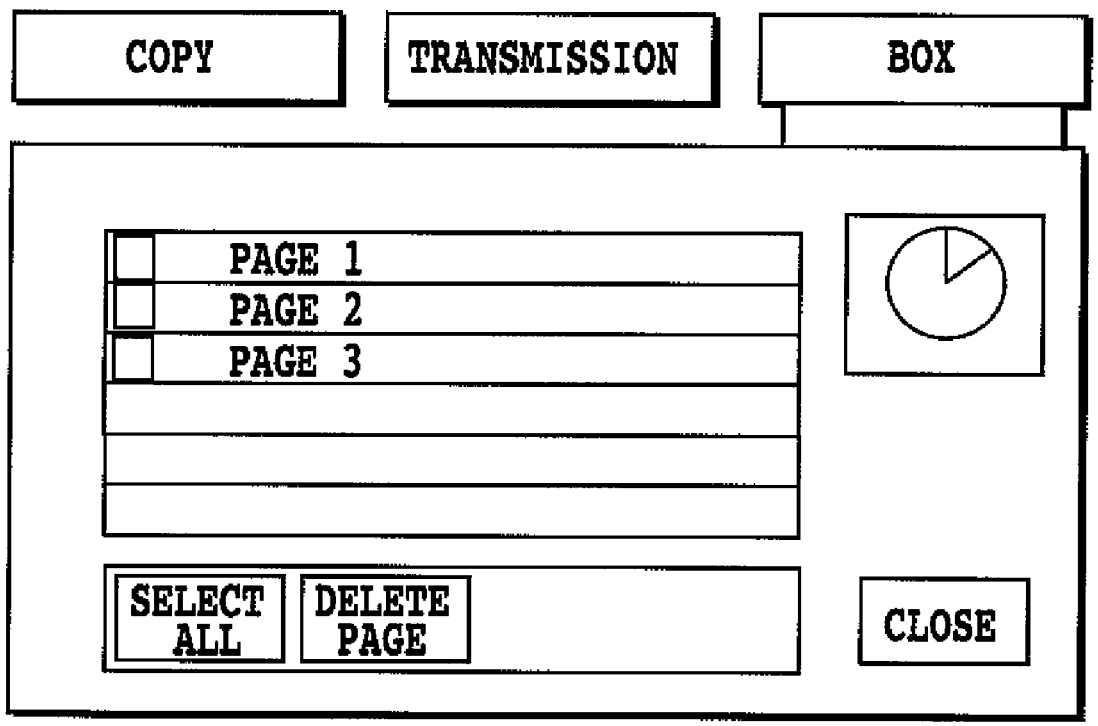
FIG. 54 is a view showing a screen that displays the number of pages after the page is deleted.

FIGS. 56, 57, and 58 correspond to displays shown in FIGS. 14, 51, and 54, respectively. FIG. 56 shows that there are two boxes in the hard disk, and there are two documents in each box. FIG. 57 shows that there are three documents in the box named "Meeting Material 2" by a duplication operation of the document. FIG. 58 shows the hard disk after merging of the documents and page deletion of the document after the merging, showing that there are two documents in the box named "Meeting Material 2" and the number of pages of the document "Meeting Material 2-1" has become three pages.

A third embodiment of the present invention that, in the case where an image with a copy-forgery-inhibited pattern added is stored in the hard disk as a box document as explained above, if it is used for a job other than printing, such as duplication and alteration, inhibits its processing will be described below. Together with this, in the third embodiment, the following processing is performed. In the case where the image data with no copy-forgery-inhibited pattern added is stored, for data obtained by duplicating this data, a copy-forgery-inhibited pattern image such that a character string indicating that it is copied is rendered as a latent mark is created and is combined into the duplicated image.

Figure 59:
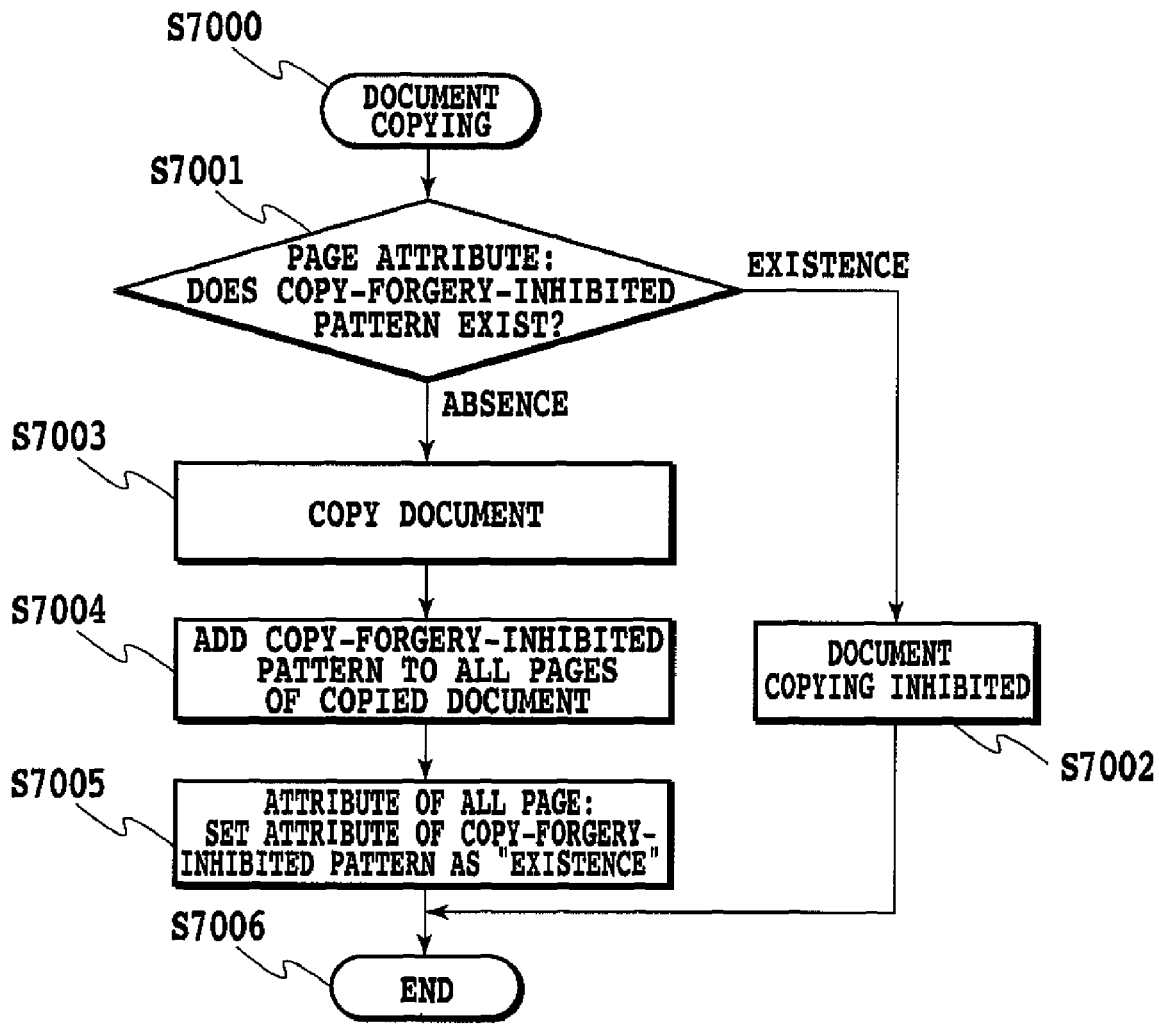
FIG. 59 is a flowchart showing processing that corresponds to an operation of a box document according to the third embodiment of this invention.

FIG. 59 is a flowchart showing processing of the third embodiment corresponding to an operation of the document in the box explained using a series of diagrams in FIG. 15, FIG. 50, etc.

Figure 61:
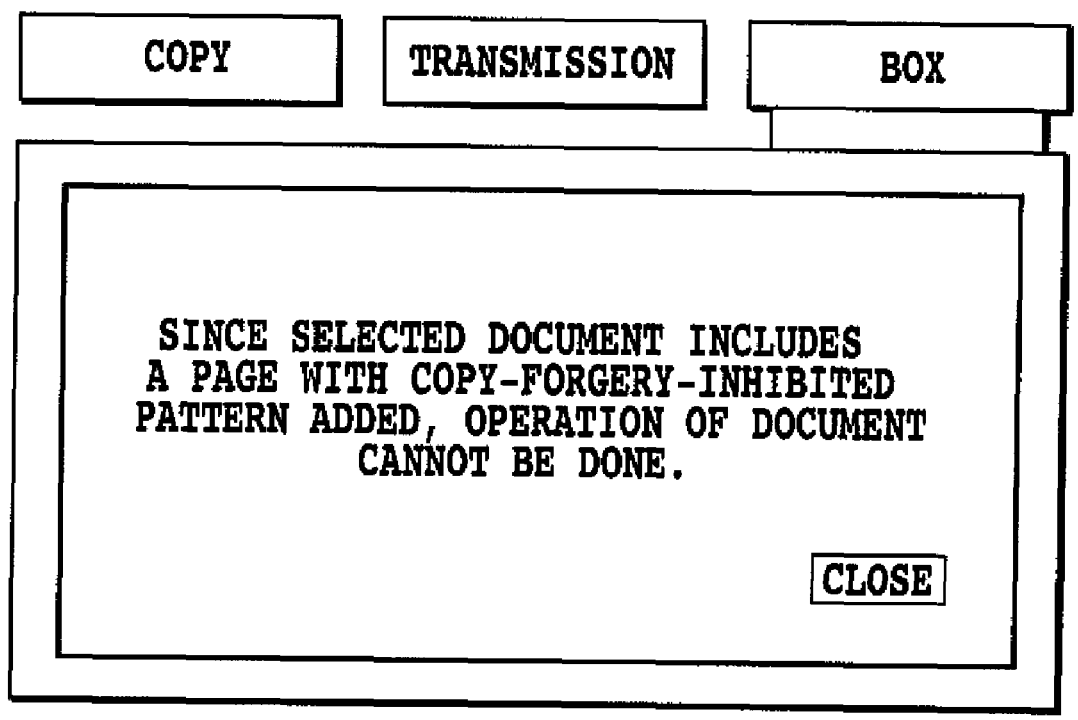
FIG. 61 is a diagram showing an alarm display for announcing that copying of the document with a copy-forgery-inhibited pattern added is forbidden.

When duplication of a document in a box is directed by the operation described above in FIG. 15, FIG. 50, etc. (Step S7000), first, page attributes of all the pages of a document to be duplicated are checked (Step S7001). Here, if the document has at least one page such that an item of copy-forgery-inhibited pattern of its page attribute is "Existence," duplication of the document is inhibited (Step S7002). In that case, an alarm display shown in FIG. 61 is popped up in the operation portion, indicating that copying of the document with a copy-forgery-inhibited pattern added is inhibited.

On the other hand, if the document does not have even one page such that the copy-forgery-inhibited pattern of its page attribute is "Existence," the document is duplicated and stored in a directed box (Step S7003). Then, a copy-forgery-inhibited pattern is added to the duplicated document (Step S7004). The processing of adding this copy-forgery-inhibited pattern is the same as the processing of copy-forgery-inhibited pattern addition performed at the time of the printing processing of local copy corresponding to Step S4804 of FIG. 23. More specifically, the same processing as the processing of creating the image with a copy-forgery-inhibited pattern added described above in FIG. 42 is performed, where by the copy-forgery-inhibited pattern will be added. In this embodiment, the copy-forgery-inhibited pattern to be added here is a character string "FILE COPY." However, the system may be configured to enable the user to set up in advance the copy-forgery-inhibited pattern information to be added.

After the copy-forgery-inhibited pattern is added, the image data is duplicated, and the item of copy-forgery-inhibited pattern of the page attribute of the document with the copy-forgery-inhibited pattern added is set as "Existence" for all the pages (Step S7005).

By the above control, it can be determined by Existence/Absence of a copy-forgery-inhibited pattern image whether the document in a box is duplicated from an original document. Moreover, since a once duplicated document is added with the copy-forgery-inhibited pattern, it will not be able to be duplicated again (Step S7002).

Incidentally, although the above explanation was given taking duplication of a box document as an example, naturally application of the present invention is not restricted to this form. It is obvious that the present invention is applicable to processing that alters contents of a document, such as page merging, page insertion, page deletion, alteration in a page.

Figure 60:
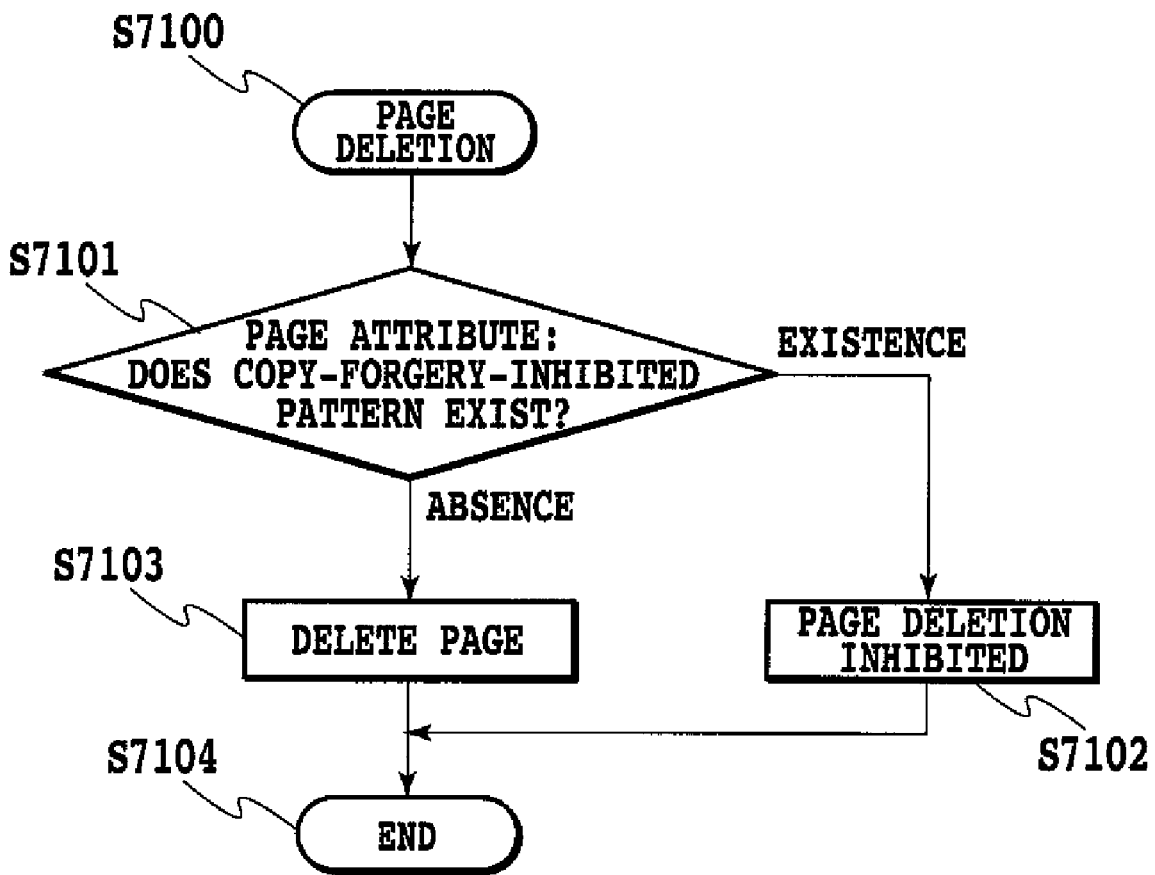
FIG. 60 is a flowchart showing processing that corresponds to page deletion of the box document according to the third embodiment of this invention.

Similarly, FIG. 60 is a flowchart showing processing of switching permission/non-permission of deletion according to "Existence/Absence" of the copy-forgery-inhibited pattern in page deletion processing for a document in a box that was explained using a series of drawings, i.e., FIG. 15, FIG. 50, etc.

When deletion of a certain page of a document in a box is directed by the above-mentioned operation (Step S7100), first, a page attribute of a page to be deleted is checked (Step S7101). Here, if the item of copy-forgery-inhibited pattern of the page attribute of the page to be deleted is "Existence", deletion of the page is inhibited (Step S7102). In that case, alarm display shown in FIG. 61 is popped up in the control panel similarly. On the other hand, if the item of copy-forgery-inhibited pattern of the page attribute of the page to be deleted is "Absence," the page is deleted (Step S7103).

By this control, in the case where the document in a box is an image with a copy-forgery-inhibited pattern added, deletion of the page can be made unpermitted and thus falsification of deleting the page with a copy-forgery-inhibited pattern added can be prevented. Incidentally, if the item of copy-forgery-inhibited pattern is "Absence" for all the pages, naturally deletion of all the pages will be permitted.

Note that in the above-mentioned embodiments, each page of a document is checked in terms of attribute and deletion permitted/unpermitted of the page is changed over. However, the following alteration may be adopted: If a document has at least one page with an attribute of copy-forgery-inhibited pattern of "Existence, and" even if an attribute of copy-forgery-inhibited pattern of a page to be deleted is "Absence," the system may be configured to inhibit page deletion. By this setting, falsification can be prevented in the unit of document.

Modification of Third Embodiment

In the third embodiment described above, creation of an image with a copy-forgery-inhibited pattern added is performed in the image formation apparatus 200. However, not being restricted to this example, an image with a copy-forgery-inhibited pattern added may be created in the PC 240 at the time of PDL printing. This processing is as already described above.

Figure 62:
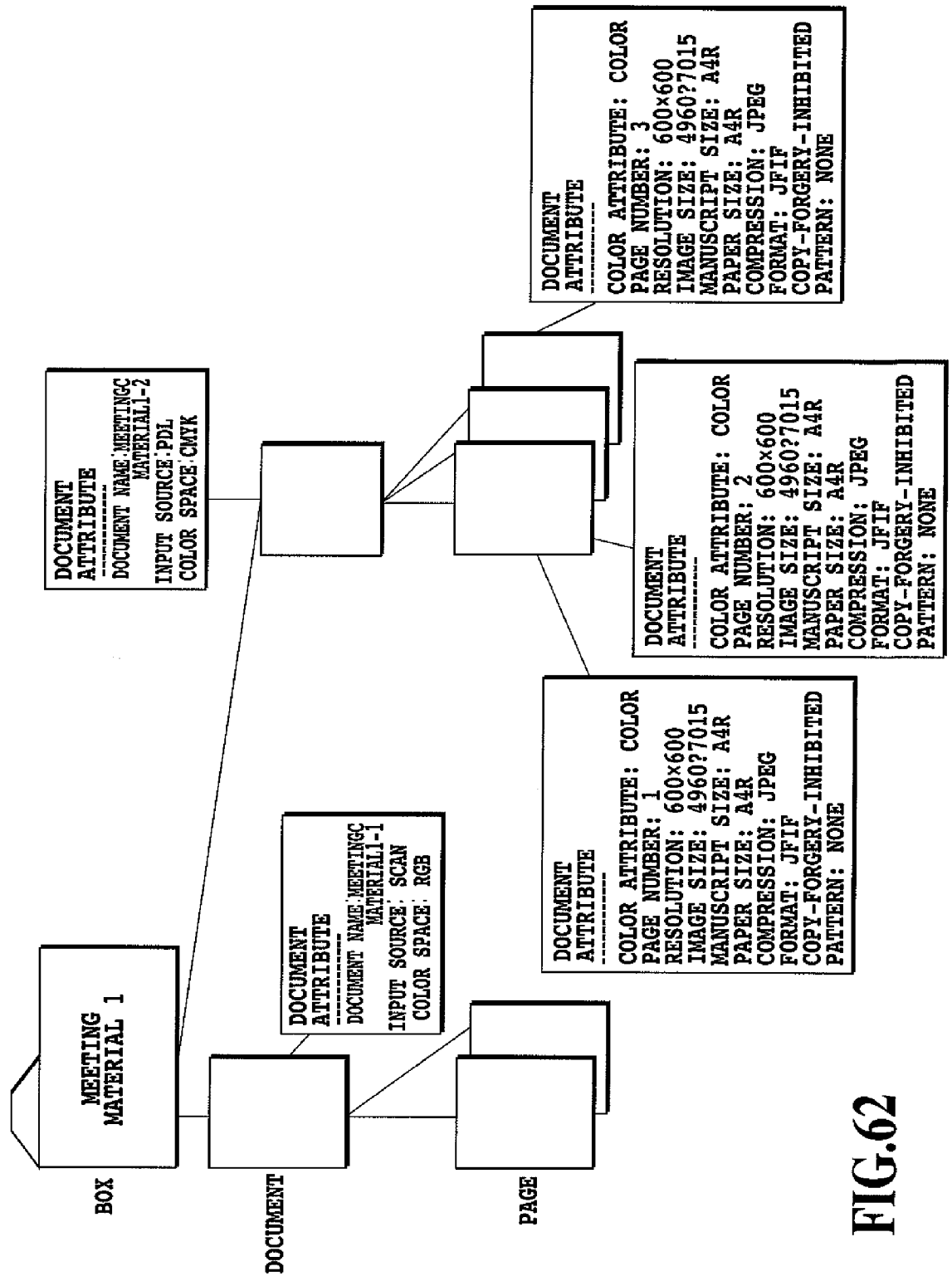
FIG. 62 is a diagram showing a page attribute when an image with a copy-forgery-inhibited pattern added being described in PDL regarding a third embodiment is saved as a document "Meeting materials 1-2" in a box of "Meeting material 2."

FIG. 62 is a diagram showing a page attribute when the image with a copy-forgery-inhibited pattern added that is described in PDL by the PC 240 is saved in the box "Meeting Material 1" of the image formation apparatus 200 as a document "Meeting Material 1-2." This example shows that the image described in PDL was three pages, all of the three pages are added with a copy-forgery-inhibited pattern, and the item of copy-forgery-inhibited pattern of the page attribute of every page is specified to be "Existence."

Moreover, in the case where an image of an editing object document is an image with a copy-forgery-inhibited pattern added or an image to which a copy-forgery-inhibited pattern is to be added, the system may be configured to alter the display on the operation portion so that any direction itself, such as duplication and partial deletion, is inhibited on the operation portion of the image formation equipment.

By this processing, duplication of a document can be restricted as in the case of the image with a copy-forgery-inhibited pattern added by a document operation that was explained in the third embodiment. Moreover, permission/non-permission of page deletion is switched over depending on existence/absence of a copy-forgery-inhibited pattern of a document existing in a box, and accordingly falsification of the document can be prevented.

Other Embodiments

The first embodiment to the third embodiment including the modification were explained assuming that each processing of making a copy-forgery-inhibited pattern emerge and other processing were performed automatically. In stead of this method, a setting as to whether processing of making the latent mark emerge etc. may be established in advance. That is, the following method can also be adopted: Respective processing according to the first embodiment to the third embodiment including the modification is performed on a condition that execution of the processing is set up in advance; if the setting is not established, the normal image data is transmitted, as it is, or used for other jobs. This setup can be made, for example, by the user via a setup screen of copy-forgery-inhibited pattern printing. On the other hand, in the transmission job, for example, related to the first embodiment, this determination of setting can be done in the transmit image conversion processing in Step S4903 of FIG. 24. Then, the system is configured to perform the processing explained in the first embodiment only when setting that directs processing of making the latent-mark part emerge is established.

In each of the embodiments described above, a form in which the latent-mark part was made to emerge for the image data added with a copy-forgery-inhibited pattern was explained. This invention is not restricted to such image data added with a copy-forgery-inhibited pattern, but can be applied to different image data. For example, this invention is also applicable to the image data added with information indicating that "Copy-forgery-inhibited pattern image must be combined at the time of printing out."

Application of this invention to the image data added with such information will be as follows. That is, if it is detected that the image data is added with information indicating that "Copy-forgery-inhibited pattern image must be combined at the time of printing out," when specific processing, such as transmission, is performed on that image data, it is possible to perform processing of combining the latent-mark part in the copy-forgery-inhibited pattern image into the image data. Therefore, for example, at the time of printing image data temporarily stored in a box, if it is detected that the image data is added with information indicating that the copy-forgery-inhibited pattern image must be combined at the time of printing," when it is intended to be used for other job than printing (for example, a transmission job, a duplication job, and an alteration job), it is possible to combine the latent mark in a state where the latent mark of the copy-forgery-inhibited pattern is made to emerge. As a result, like each of the embodiments described above, when the data is handled (for example, when being handled at the transmission destination after transmission, when data after duplication is handled, when data after alteration is handled), it is possible to make its handler recognize that it is not the original. By this processing, for example, illegal use of the data can also be restrained.

Processing according to one embodiment in the case where the present invention is applied to the image data added with the above-mentioned information indicating that "At the time of printing out, copy-forgery-inhibited pattern image is combined" will be explained below.

Figure 63:
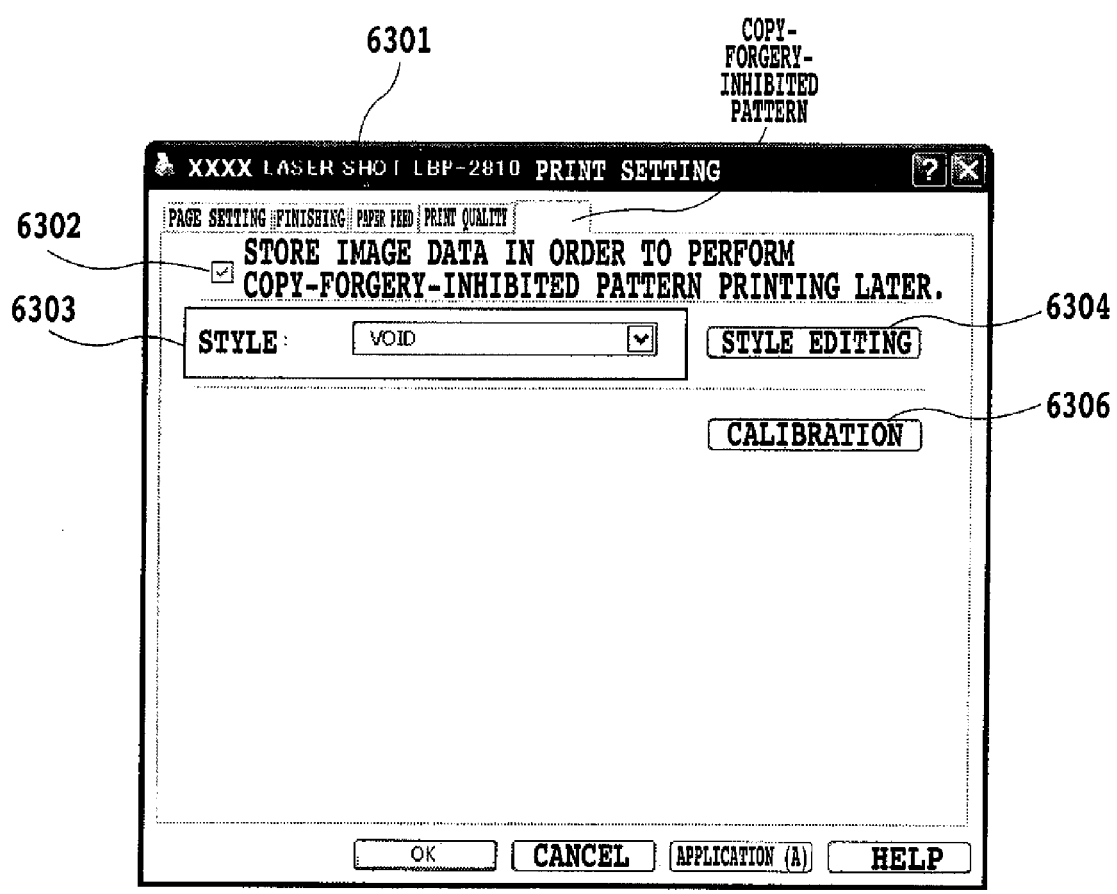
FIG. 63 is a diagram showing anther example of an initial screen of the user interface regarding copy-forgery-inhibited pattern printing by a printer driver of the PC.

On the display screen of the PC 240, a user interface shown in FIG. 63 is displayed. In this state, when the user checks "Store image data in order to perform copy-forgery-inhibited pattern printing later," the following processing will be performed.

The PC 240 transmits to the printer 200 in advance information being set up by the user using a user interface shown in FIG. 28 (information for creating a copy-forgery-inhibited pattern image), information indicating that the copy-forgery-inhibited pattern image is combined, the image data, and information on the user having generated the image data. Here, the above-mentioned information being set up by the user includes the character string (2207), the character font (2208), the character size (2209), the character color (2212), and the character angle (2211).

The printer 200 receives the above-mentioned three pieces of information and the above-mentioned image data, associates the three pieces of information to the image data, and stores them in the HDD 2004. Moreover, the user is allowed to issue a printing-out direction of the image data stored in the HDD 2004 and a direction of outputting other than printing out (for example, a duplication direction, a transmission outputting direction and an alteration outputting direction) on a display screen of this printer 200.

Figure 64:
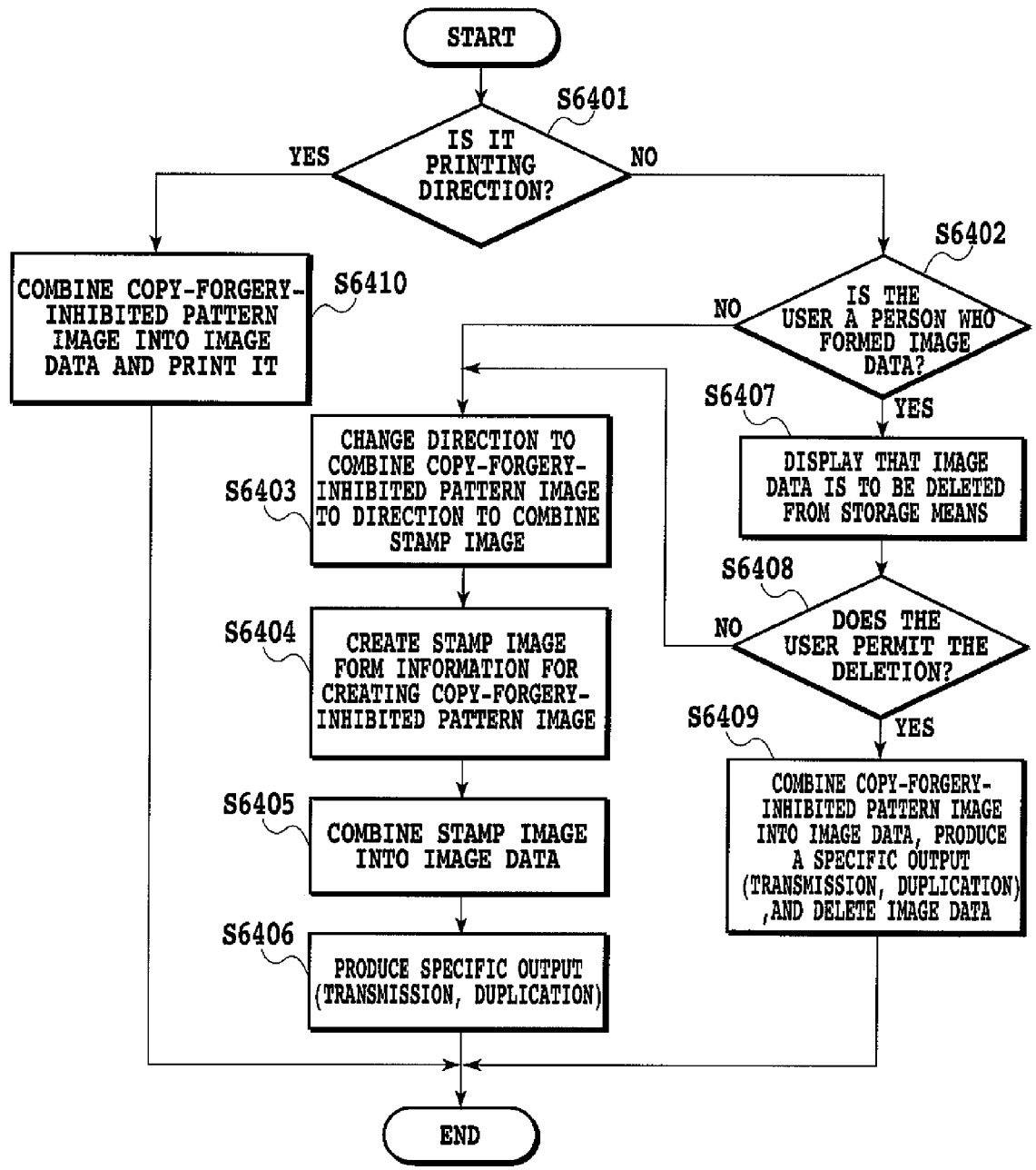
FIG. 64 is a flowchart showing processing when an outputting direction of the image data that is stored being associated with information for generating a copy-forgery-inhibited pattern image.

Processing in the case where an outputting direction of the image data stored being associated with information for creating a copy-forgery-inhibited pattern is given will be explained with reference to FIG. 64. The following processing is controlled totally by the CPU 2001 in the printer 200.

In Step S6401, it is determined whether the outputting direction is either a printing-out direction or a direction of outputting other than printing out. If as a result of the determination, it is the printing-out direction, the flow proceeds to Step S6410, where the copy-forgery-inhibited pattern image is combined into the image data and the combined image data is printed out (outputting the image data on a sheet). On the other hand, if it is a direction of outputting other than printing out, the flow proceeds to Step S6402.

In Step S6402, it is determined whether the user who gave the outputting direction is identical to the user who generates the image data. The result of the determination indicates that the both are not identical, the flow proceeds to Step S6403, where processing of combining a stamp image in place of the copy-forgery-inhibited pattern image into the image data and outputting it is started. This procedure is taken in order to prevent the user other than a person who gave the direction to generate the image data from sending the original needlessly.

On the other hand, the result of the determination in Step S3402 indicates that the user is the person who gave the direction to generate the image data, the flow proceeds to Step S6407. In Step S6407, the user is asked yes or no regarding deletion of the image data by displaying, for example, "Is it OK if image data is deleted from storage means?" on the display screen. Then, in Step S6408, it is determined whether there is an entry of a selection indicating that deletion is permitted by the user." If it is determined that the user selected permission of deletion, the flow moves to Step S6409, where the image data with the copy-forgery-inhibited pattern image is combined with the image data and a specific output of the combined image data according to the determination in Step S6401 is performed.

On the other hand, as a result of the determination, if it is determined that the user selected non-permission of deletion (the user wishes to keep the image data in the storage means), the flow moves to Step S6409, where processing of combining the stamp image in place of the copy-forgery-inhibited pattern image into the image data and outputting it is started.

In the processing of combining the stamp image into the image data and outputting it, first, in Step S6403, information for combining the copy-forgery-inhibited pattern image is changed to information for combining the character string image. Then in Step S6404, in this embodiment, the stamp image is generated from information for generating the above-mentioned copy-forgery-inhibited pattern image (a character string, a character font, a character size, a character color, and character angle). To be concrete, a character string image, in which a font is defined by the character font, a size is defined by the character size, an angle is defined by the character angle, a color of an area (latent mark area) whose shape is defined by the character string has a character string color, and a color of the surrounding of the latent mark area has a color other than the above-mentioned character string color (for example, white), is generated. Note that the copy-forgery-inhibited pattern image is an image such that an area of a character string has substantially the same density as a surrounding of the area of the character string when the copy-forgery-inhibited pattern image is printed out, whereas the stamp image is an image such that an area of a character string after being printed has a different density from that of the surrounding area of the said area.

Next, in Step S6405, the above-mentioned created character string image is combined into the image data. Then, in Step S6406, a specific output (transmitting, duplication and the like) of the image data after combination, which is determined in Step S6401, is performed.

In the foregoing, processing in which a character string image in place of the copy-forgery-inhibited pattern image is combined into the image data before producing a specific output of the image data added with information indicating that "At the time of printing out, copy-forgery-inhibited pattern image must be combined" is explained in detail. In this way, at the time of printing out, a printed-out matter showing that it is the original is formed; at the time of outputting a matter other than printing out, an outputted matter showing that is not the original will be formed. Therefore, this scheme produces an effect that the original is not appearing needlessly.

Moreover, in this embodiment, the above-mentioned character string image is created using information for creating the copy-forgery-inhibited pattern image. By this, when the image data with the above-mentioned character string image added is printed at an output site, an image of the character string that must be originally embedded in the copy-forgery-inhibited pattern image will be combined into the original image and printed out. Therefore, a printed matter will be formed in a state of clear emergence of the character string that is set up so as to discourage the user who is intended to makes the duplication of the original from doing so. It is needless to say that the character string being set up so as to discourage the user from copying it has a large effect of inhibiting the user who intends to make a printed matter at the output site from doing so, as compared to a normal character string bearing no meaning. Aiming at such an effect, in this embodiment, outputting is performed after the above-mentioned character string image is created at the destination site of the output using information for creating the copy-forgery-inhibited pattern image and the said created character string image is combined into the image data.

Furthermore, in this embodiment, it is determined whether the user permits deletion of the image data from the storage means in Step S6408, and only when the user permits, the copy-forgery-inhibited pattern image and the image data are combined together and outputted. Thus, the original is prevented from being scattered by performing outputting (transmitting) after the image data is deleted from a site where information that can be said to be the original exists at first.

As described above, the system can executes any one of plural kinds of specific outputting processing, such as network transmission processing, FAX transmission processing, display processing, duplication processing, on the image data with a copy-forgery-inhibited pattern image added or the image data having identification information indicating that the copy-forgery-inhibited pattern image must be added. Further, image processing can be so performed that the latent-mark part becomes more remarkable than the vanishing part (background part) even if outputting processing is different by applying different image processing to the copy-forgery-inhibited pattern image according to a kind of specific outputting processing that is directed.

Further Embodiment

This invention may be applied to a system constructed with a plurality of devices (for example, a computer, an interface device, a reader, a printer) or to equipment made up of a single device (copier, printer, facsimile apparatus, etc.).

Alternatively, the object of this invention is attained also by a computer of a system or equipment reading and executing a stored program code from a storage medium that stores a program code for realizing a procedure of a flowchart shown in the above-mentioned embodiments described above.

In this case, a program code itself read from the storage medium will realize a function of the above-mentioned embodiments, and accordingly the storage medium for storing the program code will constitute this invention.

As storage media for supplying a program code, for example, a floppy (registered trademark) disk, a hard disk, an optical disk, a magneto-optic disk, CD-ROM, CD-R, magnetic tape, a nonvolatile memory card, ROM, etc. can be used.

Moreover, this invention includes the case where based on directions of the program code that the computer read, an OS (operating system) working on the computer performs a part or whole of processing and that processing realizes the above-mentioned function of the embodiments.

Furthermore, this invention also include the case where a program code read from a storage medium is written in memory that is provided in a function extension board inserted in a computer or a function extension unit connected to a computer and subsequently based on directions of the program code actual processing is performed. That is, this invention also includes the case where a function extension board, a CPU provided in a function extension unit, or the like performs a part or whole of actual processing based on directions of a program code and that processing realizes a function of the above-mentioned embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2005-362420, filed Dec. 15, 2005, and 2006-325801, filed Dec. 1, 2006, which are hereby incorporated by reference herein in its entirety.

What is claimed is:

1. An image processing apparatus comprising:
   a storage unit that stores an image data, which is to be combined with a copy-forgery-inhibited pattern image before being printed out;
   a determining unit that, when a transmission outputting direction is made for the image data stored in the storage unit, determines whether or not a user who directed to generate the image data gave the transmission outputting direction;
   a first transmission outputting unit that combines the copy-forgery-inhibited pattern image with the image data stored in said storage unit and executes transmission outputting of the combined image data, when the determining unit determines that the user who directed to generate the image data gave the transmission outputting direction; and
   a second transmission outputting unit that combines a stamp image with the image data and executes transmission outputting of the combined image data, when the determining unit determines that the user who directed to generate the image data did not give the transmission outputting direction.

2. An image processing apparatus as claimed in claim 1, wherein:
   when the determining unit determines that the user who directed to generate the image data gave the transmission outputting direction, and when deletion of the image data, which is to be combined with the copy-forgery-inhibited pattern image for being printed out at the time of the printing-out direction being made, from the storage unit is permitted, the first transmission outputting unit combines the copy-forgery-inhibited pattern image with the image data and executes transmission outputting of the combined image data, and
   when the determining unit determines that the user who directed to generate the image data gave the transmission outputting direction, and when deletion of the image data, which is to be combined with the copy-forgery-inhibited pattern image for being printed out at the time of the printing-out direction being made, from said storage unit is not permitted, the first transmission outputting unit combines the stamp image with the image data and executes transmission outputting of the combined image data.

3. An image processing method comprising:
   a storing step of storing an image data, which is to be combined with a copy-forgery-inhibited pattern image for being printed out at the time of a printing-out direction being made, into a storage unit;
   a determining step of, when a transmission outputting direction is made for the image data stored in the storing step, determining whether or not a user who directed to generate the image data gave the transmission outputting direction;
   a first transmission outputting step of combining the copy-forgery-inhibited pattern image with the image data stored in the storage unit and executing transmission outputting of the combined image data, when the determining step determines that the user who directed to generate the image data gave the transmission outputting direction; and a second transmission outputting step of combining a stamp image with the image data and executing transmission outputting of the combined image data, when the determining step determines that the user who directed to generate the image data did not give the transmission outputting direction.

4. An image processing method as claimed in claim 3, wherein:

when the determining step determines that the user who directed to generate the image data gave the transmission outputting direction, and when deletion of the image data, which is to be combined with the copy-forgery-inhibited pattern image for being printed out at the time of the printing-out direction being made, from the storage unit is permitted, the first transmission outputting step combines the copy-forgery-inhibited pattern image with the image data and executes transmission outputting of the combined image data, and when the determining step determines that the user who directed to generate the image data gave the transmission outputting direction, and when deletion of the image data, which is to be combined with the copy-forgery-inhibited pattern image for being printed out at the time of the printing-out direction being made, from the storage unit is not permitted, the first transmission outputting step combines the stamp image with the image data and executes transmission outputting of the combined image data.

5. A computer-readable storage medium storing a computer program executable by an image processing apparatus having a storage unit for carrying out an image processing method comprising:

a storing step of storing an image data, which is to be combined with a copy-forgery-inhibited pattern image for being printed out at the time of a printing-out direction being made, into a storage unit;

a determining step of, when a transmission outputting direction is made for the image data stored in the storage unit, determining whether or not a user who directed to generate the image data gave the transmission outputting direction;

a first transmission outputting step of combining the copy-forgery-inhibited pattern image with the image data stored in the storage unit and executing transmission outputting of the combined image data, when the determining step determines that the user who directed to generate the image data gave the transmission outputting direction; and a second transmission outputting step of combining a stamp image with the image data and executing transmission outputting of the combined image data, when the determining step determines that the user who directed to generate the image data did not give the transmission outputting direction.

6. A computer-readable storage medium as claimed in claim 5, wherein:

when the determining step determines that the user who directed to generate the image data gave the transmission outputting direction, and when deletion of the image data, which is to be combined with the copy-forgery-inhibited pattern image for being printed out at the time of the printing-out direction being made, from the storage unit is permitted, the first transmission outputting step combines the copy-forgery-inhibited pattern image with the image data and executes transmission outputting of the combined image data, and when the determining step determines that the user who directed to generate the image data gave the transmission outputting direction, and when deletion of the image data, which is to be combined with the copy-forgery-inhibited pattern image for being printed out at the time of the printing-out direction being made, from the storage unit is not permitted, the first transmission outputting step combines the stamp image with the image data and executes transmission outputting of the combined image data.

* * * * *